(12) United States Patent
Chiang et al.

(10) Patent No.: US 8,187,735 B2
(45) Date of Patent: May 29, 2012

(54) MULTIFUNCTIONAL MIXED METAL OLIVINES FOR LITHIUM ION BATTERIES

(75) Inventors: Yet-Ming Chiang, Framingham, MA (US); Andrew C. Chu, Cambridge, MA (US); Young-Il Jang, Newtonville, MA (US); Nonglak Meethong, Cambridge, MA (US); Yu-Hua Kao, Cambridge, MA (US); Gilbert N. Riley, Jr., Marlborough, MA (US); Anthony E. Pullen, Belmont, MA (US); Karen E. Thomas-Alyea, Arlington, MA (US)

(73) Assignee: A123 Systems, Inc., Waltham, MA (US)

( * ) Notice: Subject to any disclaimer, the term of this patent is extended or adjusted under 35 U.S.C. 154(b) by 991 days.

(21) Appl. No.: 12/172,050

(22) Filed: Jul. 11, 2008

(65) Prior Publication Data

US 2009/0123813 A1 May 14, 2009

Related U.S. Application Data

(60) Provisional application No. 60/949,410, filed on Jul. 12, 2007, provisional application No. 61/026,665, filed on Feb. 6, 2008, provisional application No. 61/037,122, filed on Mar. 17, 2008.

(51) Int. Cl.
*H01M 10/44* (2006.01)
*H01M 4/50* (2010.01)
*H01M 4/52* (2010.01)
*H01M 4/58* (2006.01)

(52) U.S. Cl. ....... 429/50; 429/221; 429/224; 429/231.1; 429/231.95; 320/132

(58) Field of Classification Search .......... None
See application file for complete search history.

(56) References Cited

U.S. PATENT DOCUMENTS

| | | | |
|---|---|---|---|
| 5,053,297 A | 10/1991 | Yamahira et al. | |
| 5,278,000 A | 1/1994 | Huang et al. | |
| 5,691,083 A | 11/1997 | Bolster | |
| 5,910,382 A | 6/1999 | Goodenough et al. | |
| 6,514,640 B1 | 2/2003 | Armand et al. | |
| 6,723,470 B2 | 4/2004 | Barker et al. | |
| 6,749,967 B2 | 6/2004 | Li et al. | |
| 6,884,544 B2 | 4/2005 | Barker et al. | |
| 7,001,690 B2 | 2/2006 | Barker et al. | |
| 7,026,072 B2 | 4/2006 | Barker et al. | |
| 7,190,171 B2 | 3/2007 | Kawakami et al. | |
| 7,233,128 B2* | 6/2007 | Brost et al. | 320/132 |
| 7,282,300 B2 | 10/2007 | Goh et al. | |
| 2002/0004169 A1 | 1/2002 | Yamada et al. | |
| 2004/0005265 A1 | 1/2004 | Chiang et al. | |
| 2004/0257045 A1 | 12/2004 | Sada et al. | |
| 2005/0233219 A1 | 10/2005 | Gozdz et al. | |
| 2005/0266303 A1* | 12/2005 | Kadouchi et al. | 429/92 |
| 2007/0015055 A1 | 1/2007 | Lee et al. | |

FOREIGN PATENT DOCUMENTS

JP 2007128723 A 5/2007

OTHER PUBLICATIONS

Berbenni, et al., "Thermogravimetry and X-ray Diffraction Study of the Thermal Decomposition Processes in $Li_2CO_3$-$MnCO_3$ Mixtures", Journal of Analytical and Applied Pyrolysis, 60:45-62 (2002), 19 pages.

Jang, et al., "Electrochemical Cycling-Induced Spinel Formation in High-Charge-Capacity Orthorhombic $LiMnO_2$", Journal of The Electrochemical Society, 146(9):3217-3223 (1999), 8 pages.

Jang, et al., "Stability of the Monoclinic and Orthorhombic Phases of $LiMnO_2$ with Temperature, Oxygen Partial Pressure, and Al Doping", Solid State Ionics, 130:53-59 (2000), 8 pages.

Lee, et al., "$Li_2NiO_2$ as a Novel Cathode Additive for Overdischarge Protection of Li-Ion Batteries", Chem. Matter, 20:5-7 (2008), 4 pages.

Meethong, et al., "Strain Accommodation during Phase Transformations in Olivine-Based Cathodes as a Materials Selection Criterion for High-Power Rechargeable Batteries", Advanced Functional Materials, 17:1115-1123 (2007), 9 pages.

Meethong, Size-Dependent Lithium Miscibility Gap in Nanoscale $Li_{1-x}FePO_4$, Electrochemical and Solid State Letters, 10(5):A134-A138 (2007), 5 pages.

Yamada, et al., Phase Diagram of $Li_x(MN_yFE1_{-y})PO4(0≦x,y≦1)$, Journal of The Electrochemical Society, 148(10):A1153-A1158 (2001), 7 pages.

International Search Report and Written Opinion for PCT Application No. PCT/US08/69858 mailed Jan. 20, 2009. 11 pages.

* cited by examiner

*Primary Examiner* — John S Maples
(74) *Attorney, Agent, or Firm* — Wilmer Cutler Pickering Hale and Dorr LLP

(57) ABSTRACT

Electroactive compositions are disclosed for use in lithium ion battery electrodes. The compositions, such as multifunctional mixed metal olivines, provide an electrochemical cell having a plurality of open circuit voltages at different states of charge. The compositions afford improved state-of-charge monitoring, overcharge protection and/or overdischarge protection for lithium ion batteries.

28 Claims, 48 Drawing Sheets

MULTIFUNCTIONAL MIXED METAL OLIVINES FOR LITHIUM ION BATTERIES

RELATED APPLICATIONS

This application claims priority to U.S. Provisional Application Nos. 60/949,410, filed on Jul. 12, 2007, 61/026,665, filed on Feb. 6, 2008, and 61/037,122, filed on Mar. 17, 2008, all of which are incorporated herein by reference.

BACKGROUND

This disclosure concerns ion storage materials for batteries of disposable (primary) or rechargeable (secondary) type, battery electrodes, battery cells, battery packs, and methods of using said batteries or battery packs so as to allow improved functionality as described herein. For many battery applications, it is desirable to know the state of charge of the battery while it is in use. The state of charge (SOC) is defined as a percentage of the capacity that the battery exhibits between a lower voltage limit at which the battery is fully discharged at equilibrium, and an upper voltage limit at which the battery is fully charged at equilibrium. Thus a 0% SOC corresponds to the fully discharged state and 100% SOC corresponds to the fully charged state. A battery, or string of batteries forming a battery pack, may be used over a limited range of SOC or over a wide range including the entire ion storage capacity available from the battery.

SOC monitoring is desirable or necessary in many battery applications, including portable electronics products such as wireless communications devices and laptop computers, power tools, electric vehicles (including hybrid, plug-in hybrid, and all-electric vehicles), backup power systems, energy storage for power generation devices such as solar or wind collectors or fuel cells or conventional fuel-burning power sources, and the like. In hybrid electric vehicles (HEVs) as one example, it is desirable to monitor the state of charge of the battery since operation does not typically use the whole range of SOC. For example, the SOC range used may be 10-90%, or 20-80%, or 30-70%, or 40-60% of SOC. Since the next pulse applied to the battery may be charge or discharge, most HEV packs are maintained at mid-SOC (40-60% SOC) where both the discharge and charge power capability are relatively high. It is very common to hold the battery at about 50% SOC since a battery operated in this manner can capture braking energy and, therefore, charge the battery further, or discharge energy in an acceleration step and, therefore, discharge the battery. Therefore, by sitting at a state of charge that is intermediate to a fully charged or discharged battery, the battery is able to meet the power requirements either for charge or for discharge at all times.

Another reason to monitor SOC accurately is to improve the life and/or safety of the battery. Some battery chemistries become unsafe at too high a charge voltage, and many chemistries degrade faster at very high or very low SOC. An accurate SOC estimate is therefore useful for improving system safety and/or long life.

The range over which a battery desirably operates is referred to as the state-of-charge swing. In addition to maintaining responsiveness to either a charge or discharge event, keeping the battery within its state of charge swing avoids the risk of degradation reactions during high power recharge, such as during rapid braking in a battery system used in HEVs. The risk of the occurrence of such degradation reactions increases as the state of charge increases. Therefore, limiting the maximum state of charge can extend the life of the battery. The stress and strain of deep charge and discharge can be detrimental to the battery resulting in reduced life leading to higher maintenance/operating costs of the HEV or plug-in HEV. Reducing the state-of-charge swing may also reduce the mechanical strain within either the positive or negative electroactive material, which improves battery longevity.

The quantities that can be easily measured during operation of most battery packs are: voltage, current, time, and temperature. Therefore, methods of estimating SOC usually take advantage of these inputs.

In some battery chemistries, e.g., lead-acid or lithium-ion batteries employing metal-oxide positive electrode materials, the voltage vs. capacity curve is not flat; that is, the voltage changes with respect to a change of capacity. These batteries therefore have a correlative relationship between voltage and capacity so that measurement of the battery voltage gives an approximation of the battery state-of-charge. Many SOC algorithms therefore use some voltage-based method to estimate SOC or to re-calibrate the SOC estimation. This, however, generally requires the battery chemistry to exhibit significant changes in open-circuit voltage with SOC, since that allows the SOC to be estimated based on the voltage change. A battery that exhibits a significant variation in impedance with SOC can also use the voltage change during a current pulse to determine SOC. Temperature is usually taken into account, as the impedance and open circuit voltage (OCV) may be a function of temperature.

The effectiveness of voltage-based methods is dependent upon there being some variation in voltage with capacity. Voltage or impedance-based algorithms are more difficult to implement in battery chemistries that demonstrate little or no change in impedance or OCV over a large range of SOC, and large errors in the SOC estimation may result. One example is a battery having a lithium iron phosphate positive electrode and a graphite negative electrode, because the voltage profiles of both the positive and negative electrodes are relatively flat so that only small changes in voltages are demonstrated over a wide capacity range.

Voltage-based methods are also subject to errors introduced by hysteresis. Hysteresis includes variations in the voltage vs. capacity or impedance characteristics of the battery that depend on its preceding charge or discharge history. For example, the voltage exhibited by the battery at a given fixed SOC may depend on whether the battery was last subjected to a charging or discharging event. The variation in voltage or impedance at given SOC can also depend on the rate of preceding charge or discharge events, the time elapsed reaching said SOC, and temperature. Lithium iron phosphate exhibits hysteresis during charge and discharge so that the recent history of the cell affects the voltage. Thus, the voltage measurement of a lithium iron phosphate cell does not provide a precise and accurate correlation to the battery capacity.

Coulomb counting is another commonly-used method of monitoring SOC, in which the current is integrated over time to determine how many amp-hours have been charged or discharged. The problem with coulomb counting, however, is that SOC estimation relies on accurate measurements at high and low current, as well as frequent data sampling. The hardware used for accurate SOC estimation is expensive, and coulomb counting alone can lead to errors which may accumulate over time. In order to reduce the accumulated errors, most SOC estimations also use methods of periodically re-calibrating the SOC estimate. Thus there is a need for simpler and more accurate methods of monitoring the SOC of batteries, and using less expensive equipment that can lower the overall cost of the system that is being powered.

SUMMARY

Electrode-active materials, batteries, battery packs, and methods for determining the state of charge of a battery are described. The method provides a measure of determining when the state of charge or capacity of a battery is approaching a desirable upper or lower limit so that the battery can initiate a process that will bring the battery pack into its desired operating range.

In certain embodiments, a method is provided for monitoring and maintaining the performance of an electrochemical cell. The method includes providing an electrochemical cell having a negative electrode and a positive electrode separated by an electrolyte, the composition of the electroactive materials of the positive electrode, negative electrode or both selected to provide a cell having a plurality of open circuit voltages at different states of charge. The composition of one or both electrodes is selected to provide a change in voltage of the cell at a pre-selected state of charge. The cell is monitored to detect a change in cell voltage, and a current or power into or out of the cell is adjusted in response to the detected change in voltage.

As a non-limiting example, providing a large voltage signal when the cell drops below 20% or above 80% SOC allows the SOC estimation to be re-calibrated at those points, where the battery can still deliver the required charge and discharge power pulses. This would then allow the system to bring the battery pack back into a mid-SOC operating range before operating demands drive the SOC range beyond that desired for improved safety or longevity.

In some embodiments, the positive electrode electroactive materials are selected to provide a cell having a plurality of open circuit voltages at different states of charge. In some embodiments, the negative electrode electroactive materials are selected to provide a cell having a plurality of open circuit voltages at different states of charge. Accordingly, while some embodiments described herein refer to the positive electrode containing a primary electroactive material and a high and/or low voltage indicator, in some embodiments, the negative electrode may include a high and/or low voltage indicator. Moreover, in some embodiments, the positive and negative electrode each contain a primary electroactive material and a voltage indicator. Where both the positive and negative electrodes include a voltage indicator, the voltage indicator for each electrode is independently selected and need not have the same identity or be present in the same amount. As will be recognized by those of skill in the art, some of the materials described herein as being useful for use as positive electrode voltage indicators are also useful as negative electrode voltage indicators.

In one or more embodiments, materials and batteries are disclosed having voltage steps that lie close to but above or below pre-selected voltage thresholds. For example, materials and batteries are disclosed having a higher voltage step that lies close to but below the upper limiting voltage of operation, and/or a lower voltage step that lies close to but above the lower limiting voltage of operation, for example, within about 0.1-10V of the limiting voltages, in order to mitigate the impact of rapid overcharge or discharge on a battery. Upper and lower limiting voltages are, respectively, voltages above and below which a cell experiences significant degradation in performance, composition or safety. For example, it is well known to those skilled in the art that the cycle life and calendar life of a lithium ion battery depends on the upper voltage to which it is charged, due to oxidation of the electrolyte or structural and chemical changes in the active materials, amongst other reasons. It is also known that overdischarge of a lithium ion battery can reduce performance or life, due to dissolution of a negative current collector such as copper foil, amongst other reasons. The safety of a lithium ion battery is also dependent on the SOC in many cases, since SOC determines the state of oxidation of the cathode material, and the instability against thermal runaway or oxygen release of many positive electrode active compounds is closely tied to the state of oxidation.

A battery that is being charged at a high current rate may experience a sharp voltage rise as the battery approaches a limiting SOC, if little or no ion storage capacity exists at higher voltage. By "limiting SOC" is meant a state of charge that equals or approaches the upper or lower limit of capacity of the battery or electrochemical cell. The limiting SOC is associated with an upper or lower limiting voltage. High voltage excursions can degrade the battery by oxidizing the electrolyte solvent, amongst other mechanisms. By designing the electrode-active material so as to provide some capacity at an intermediate or higher voltage, e.g., by adding an additive to the positive electrode that provides for ion storage or release at a higher OCV than the primary electroactive material, the voltage "spikes" are reduced, and time is provided for the battery management system to better respond to the impending overcharge condition.

Similarly, upon discharge, sharp voltage excursions downward may degrade the cell, for example, by causing dissolution of the negative current collector by forcing it to too high an absolute potential. By providing some capacity at a lower voltage that is still above the voltage at which degradation occurs, e.g., by adding an additive to the positive electrode that provides ion storage at a lower OCV than the primary electroactive material, the state of charge of the cell can be better monitored to avoid discharging below states of charge at which there is risk of unwanted degradation reactions. These protective measures can be particularly useful for batteries having a relatively flat voltage vs. capacity response up to the end of charge or discharge, including batteries using positive electrodes comprising certain metal phosphates, and negative electrodes based on carbon or lithium titanate spinel or compositionally modified lithium titanate spinels, as discussed later.

Another useful function that can be provided by the introduction of capacity at a lower voltage is overdischarge protection. When an electrochemical cell having particular thermodynamic potentials at the positive and negative electrodes, respectively, and therefore an equilibrium or thermodynamic voltage that is the difference between those potentials, is discharged below that voltage, including being forced to zero voltage by imposing a short circuit, the potentials at the positive and negative electrode deviate from their thermodynamic potentials to compensate. The positive electrode is forced to a lower potential than its thermodynamic value and the negative electrode to a higher potential than its thermodynamic value, typically by an amount that depends on capacity ratio, lithium inventory in each electrode, the OCV profile for each electrode, and the impedance of each electrode. During overdischarge, the increase in potential at the negative electrode can cause cell failure or degradation by oxidizing and dissolving the current collector material. For example, many lithium-ion batteries use copper as the negative current collector, in which case an oxidizing potential of greater than about 3.3V at the negative electrode, measured with respect to $Li/Li^+$ (e.g., a lithium metal electrode) will cause dissolution of the copper. According to one or more embodiments, overdischarge protection is provided to the battery by introducing capacity of at least 5 mAh per gram of total active material in the positive electrode over a voltage range that lies below the oxidizing potential of the negative current collector. Specifically, in the instance of copper current collectors, the positive electrode material possesses a voltage step at a potential of less than about 3.3V, measured with respect to Li/Li$^+$.

In some embodiments, overdischarge protection is also provided to the battery by introducing capacity in the negative electrode over a voltage range that lies between the OCV of the primary negative electrode material and the oxidizing potential of the negative current collector (measured with respect to Li/Li$^+$). Specifically, in the instance of copper current collectors, overdischarge protection in the negative electrode is implemented by mixing the primary negative electrode material with a lithiated compound with an OCV less than 3.3V, measured with respect to Li/Li$^+$, but greater than the average OCV of the primary negative electrode material. In certain embodiments, overdischarge protection provided by the addition of lithium storage compounds to the negative electrode can provide certain advantages over additives to the positive electrode. An additive compound added to the positive electrode will become active each time the cell voltage is discharged to a value lower than the potential difference between the additive and the negative electrode active material. An additive compound added to the negative electrode will become active each time the cell is discharged to a voltage lower than the potential difference between the additive and the positive electrode active material. Numerous compounds that could be used as the additive have a potential that is closer to that of the positive electrode, e.g. in the range 2.5-3V with respect to lithium metal, than the negative electrode. Therefore, for typical values of the lower discharge voltage of lithium ion cells in normal use, the overdischarge additive may be cycled each time the cell is cycled if it is added to the positive electrode. However, if it is added to the negative electrode, a lower value of the lower discharge voltage is permitted without cycling the additive. If the overdischarge compound is to be effective over the life of the cell, an additive compound that is not electrochemically cycled except when overdischarge protection is needed can provide advantages compared to one which is cycled during normal operation. Amongst other advantages, the amount required may be smaller than for additive compounds that are added to the negative electrode than those added to the positive electrode. In some embodiments, overdischarge protection is provided to the battery by introducing a capacity of at least 1 mAh/g or at least 5 mAh/g or at least 10 mAh/g or at least 20 mAh/g.

One or more embodiments provide an electroactive composition for use as a positive electrode material in an electrochemical cell, including about 60-95 molar % of a first primary electroactive material, wherein the first primary electroactive material is a lithium metal phosphate; about 0-50 molar %, for example, about 0-20%, or about 5-20%, of a second primary electroactive material; about 1-40 molar %, for example, about 1-35%, about 1-30% or about 1-20%, of a high voltage indicator material having an open-circuit potential greater than each of the first and second primary electroactive materials; and about 1-40 molar %, for example, about 1-35%, about 1-30% or about 1-20%, of a low voltage indicator material having an open-circuit potential less than each of the first and second primary electroactive materials. In certain embodiments, the composition is a single phase material. In other embodiments, the composition is a multi-phase material, or a physical mixture. An electrochemical cell containing a positive electrode including such a composition is also provided.

One or more embodiments provide an electroactive composition for use as a positive electrode material in an electrochemical cell, including an olivine lithium metal phosphate material having the formula $Li_xM'_yM''_zM'''_wPO_4$, wherein
M' is one or more of Mn and Fe;
M'' is one or more of Mn, Co and Ni;
M''' is one or more of Ti, Zr and Mg;
M' is not the same as M'';
$0 \leq x \leq 1.2$; $0.5 \leq y \leq 0.95$; $0.025 \leq z \leq 0.5$; $0.025 \leq w \leq 0.25$; and $0.8 \leq y+z+w \leq 1.2$.
In certain embodiments, $0.6 \leq y \leq 0.9$. In some embodiments, $0.05 \leq z \leq 0.2$. In some embodiments, $0.05 \leq w \leq 0.2$. An electrochemical cell containing a positive electrode including such a composition is also provided.

One or more embodiments provide an electrochemical cell including a positive electrode including a positive electrode electroactive material, a negative electrode separated from the positive electrode by an electrolyte, and a negative current collector in electrical communication with the negative electrode, where the negative electrode includes a negative electrode electroactive material and an additive having an open circuit voltage less than the dissolution potential of the current collector. In certain embodiments, the additive provides about 0.5-20%, for example, about 5-10%, of the lithium storage capacity of the positive electrode at a reduction-oxidation potential for lithium intercalation that is between 0.2 V and 3.3V with respect to Li/Li$^+$.

One or more embodiments provide an electroactive composition for use as a positive electrode material in an electrochemical cell, including an olivine lithium metal phosphate material having the formula $Li_xM'_yM''_zPO_4$, wherein
M' is one or more of Mn and Fe;
M'' is one or more of Mn, Co and Ni;
M' is not the same as M'';
$0 \leq x \leq 1.2$; $0.7 \leq y \leq 0.95$; $0.02 \leq z \leq 0.3$; and $0.8 \leq y+z \leq 1.2$.
In certain embodiments, $0.8 \leq y+z<1$ or $1<y+z \leq 1.2$ or $y+z=1$. In some embodiments, $0.02 \leq z \leq 0.1$. In some embodiments, M' is Fe. An electrochemical cell containing a positive electrode including such a composition is also provided.

BRIEF DESCRIPTION OF THE DRAWINGS

The following figures are provided for the purpose of illustration only and are not intended to be limiting.

FIGS. 20A-E, respectively, show results for z=0.02, 0.05, 0.1, 0.2, and 0.3.

DETAILED DESCRIPTION

Figure 1:
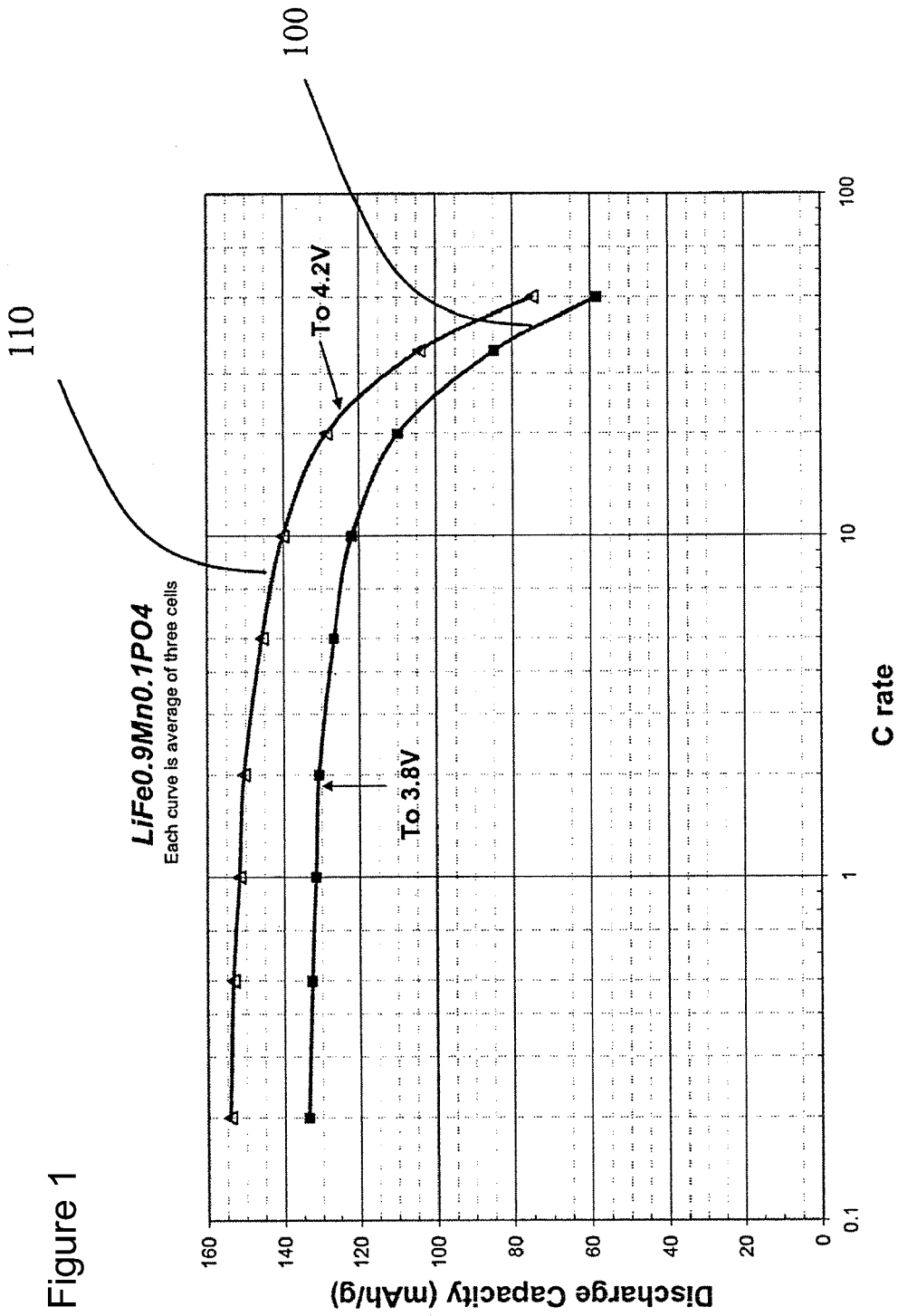
FIG. 1 is a plot of discharge capacity (mAh/g) vs. C-rate for $LiFe_{0.9}Mn_{0.1}PO_4$ cell cycled between 2.0 V and 3.8 (curve 100) and 4.2V (curve 110).

Electrode materials, or combinations of electrode materials, and methods, cells and systems employing such electrode materials are disclosed that can promote improved battery performance, safety and/or longevity. These materials, methods and systems are beneficial in a variety of battery applications. For example, they may be particularly useful for electrochemical cells having a substantially flat voltage vs. capacity curve, which tends to complicate SOC monitoring, and for electrode materials that experience hysteresis in the voltage.

In one or more embodiments, an electrochemical cell, or collection of cells to form a battery system, includes an electrode active composition that permits the monitoring and control of various battery functions. The cell includes a primary composition from which energy storage or release is obtained by the oxidation and reduction of transition metal ions upon lithium insertion and removal. In some embodiments, the primary composition is a mixture of electroactive materials and the materials are selected to produce a voltage "step" that allows ready detection of the battery's SOC during active charging and discharging over a voltage range that includes the SOC at which the voltage "step" appears. In other embodiments, additives are included in the electrode-active material that possesses higher or lower voltages than the primary composition. The additives produce a different and non-overlapping working voltage from that of the primary composition providing energy storage. In some embodiments, the additive will provide a change in the open circuit voltage of the cell as the battery approaches the end of the desired state of charge or state of discharge (SOD). In some embodiments, the change in voltage is sharp, while in others the change in voltage is more gradual or "sloping; in some embodiments, the change results in an inflection point on a capacity vs. voltage plot. In certain embodiments, an additive is included having a higher voltage step that lies close to but below the upper limiting voltage of operation, and/or a lower voltage step that lies close to but above the lower limiting voltage of operation, in order to mitigate the impact of rapid overcharge or discharge on a battery.

Without being limited to any particular composition or family of compositions, in some embodiments lithium metal polyanion electrode materials are employed, including those having a general composition $Li_xM_yXO_4Z_z$, where M is one or more metals and includes at least a transition metal, X is P, S, Si, Ge, As, W, or Mo, and Z is a halogen. Some such compositions crystallize in the ordered olivine, disordered olivine, or modified olivine structure types. Other compositions include materials that crystallize in a NASICON structure type. Also included are electrode-active compositions based on lithium titanate of the spinel or modified spinel structure, including compositionally modified spinels and forms of titanium oxide that transform upon electrochemical cycling into a spinel or modified spinel structure. Such electrode-active materials can be of a single phase or a combination of phases or compounds.

Certain such compositions can exist as an ordered or partially ordered olivine structure, or as a disordered or amorphous material. Such compositions if crystalline can include the ideal stoichiometric olivine $Li_xMPO_4$, where $0 \leq x \geq 1$ and M is one or more of Fe, Mn, Co and Ni. Exemplary materials for both the main energy storage function, as well as a voltage increasing additive, include lithium iron phosphate (LiFePO4) having an open circuit voltage (OCV, herein measured with respect to a lithium metal electrode) of about 3.45V, lithium manganese phosphate ($LiMnPO_4$) having an OCV of about 4.0 volts, lithium cobalt phosphate ($LiCoPO_4$) having an OCV of about 4.8 volts, and lithium nickel phosphate ($LiNiPO_4$) having an OCV of about 5.4 volts.

In some embodiments, a positive electrode includes an operating amount of lithium iron phosphate sufficient to provide a desired operating capacity, and a selected amount of a high voltage indicator having an OCV different from and higher than that of lithium iron phosphate. The two materials can be a physical mixture or, as is discussed in further detail below, can be a solid solution of lithium metal phosphates containing iron and an additional metal selected to provide an indicator having an open circuit potential higher than lithium iron phosphate. The higher voltage indicator can be present in any amount, for example, from about 5 to about 30 molar %, about 5 to about 20 molar %, or about 10 to about 15 molar %. As one skilled in the art will appreciate, use of a high voltage indicator may result in a loss of capacity at the operating voltage, and selection of the amount of the indicator is made accordingly.

Figure 11:
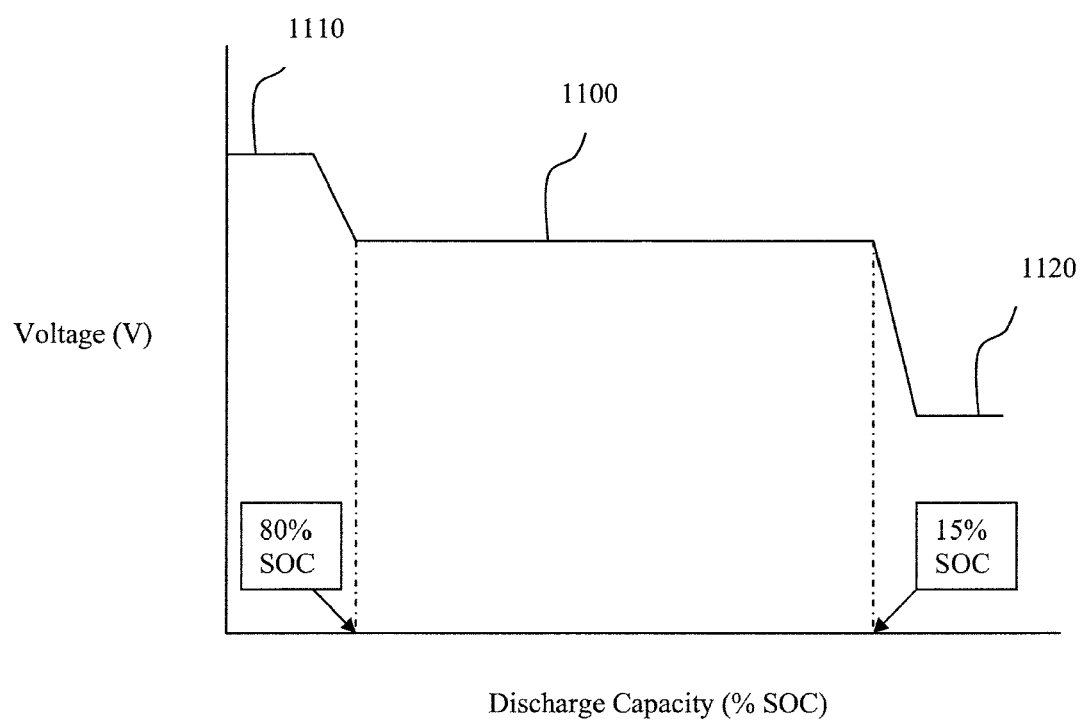
FIG. 11 is an idealized plot of voltage (V) vs. discharge capacity (depicted as % state of charge).
Figure 12A:
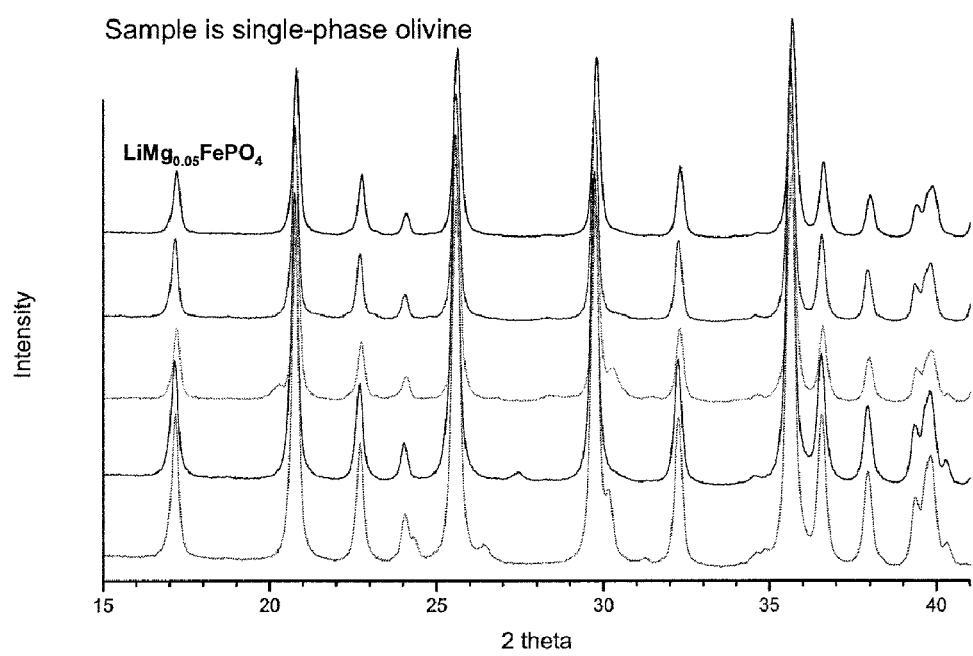
FIGS. 12A-12H are x-ray diffraction patterns for samples with the compositions (12A, 12B) $LiMg_{0.05}FePO_4$, (12C, 12D) $LiZr_{0.05}Fe_{0.90}PO_4$ and $LiTi_{0.05}Fe_{0.90}PO_4$, (12E, 12F) $Li_{0.95}Ti_{0.05}Fe_{0.925}PO_4$, and (12G, 12H) $Li_{0.90}Ti_{0.05}Fe_{0.95}PO_4$.
Figure 12B:
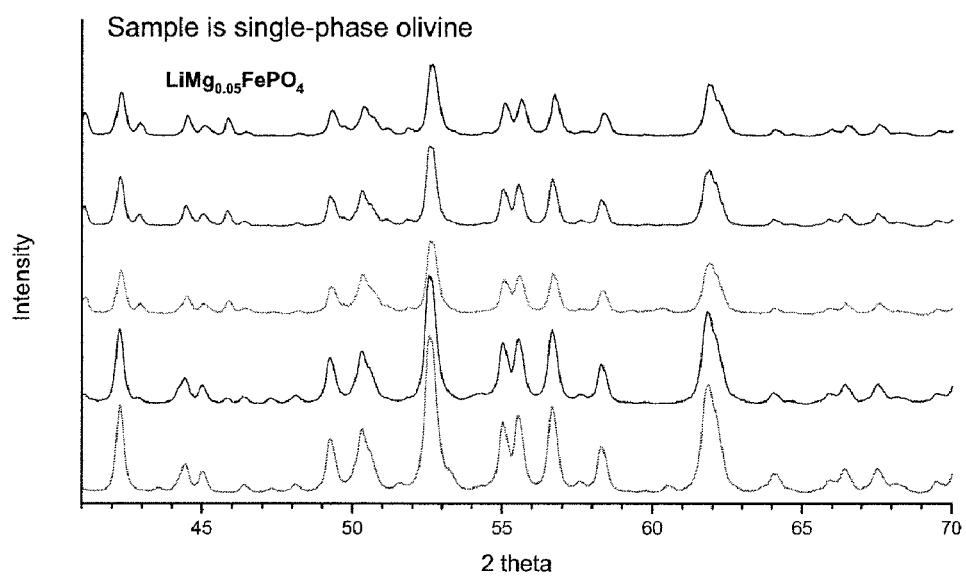
Figure 12C:
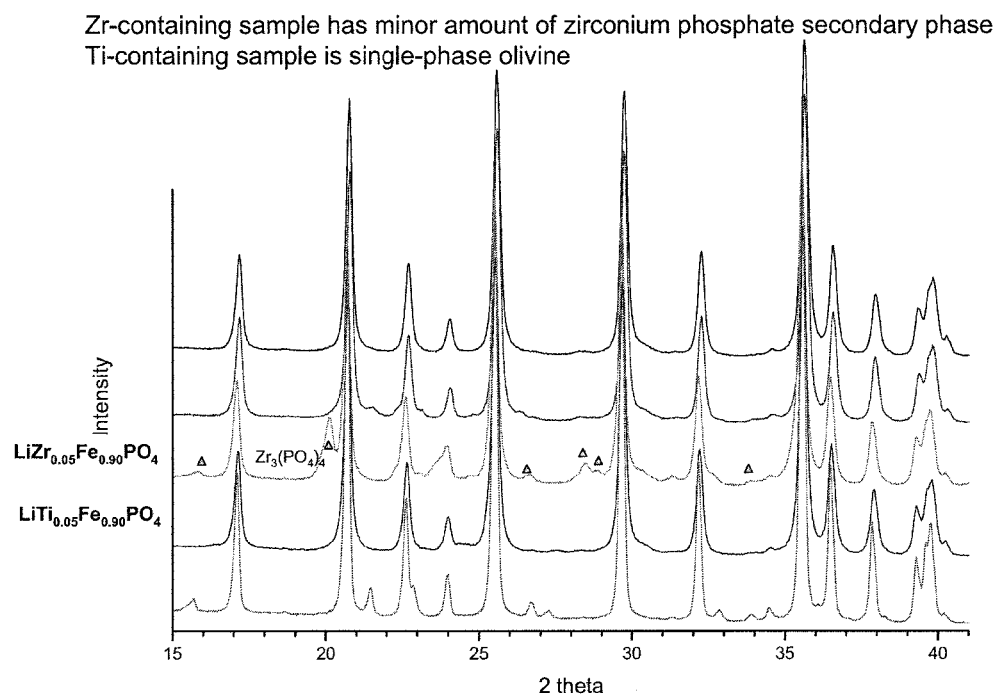
Figure 12D:
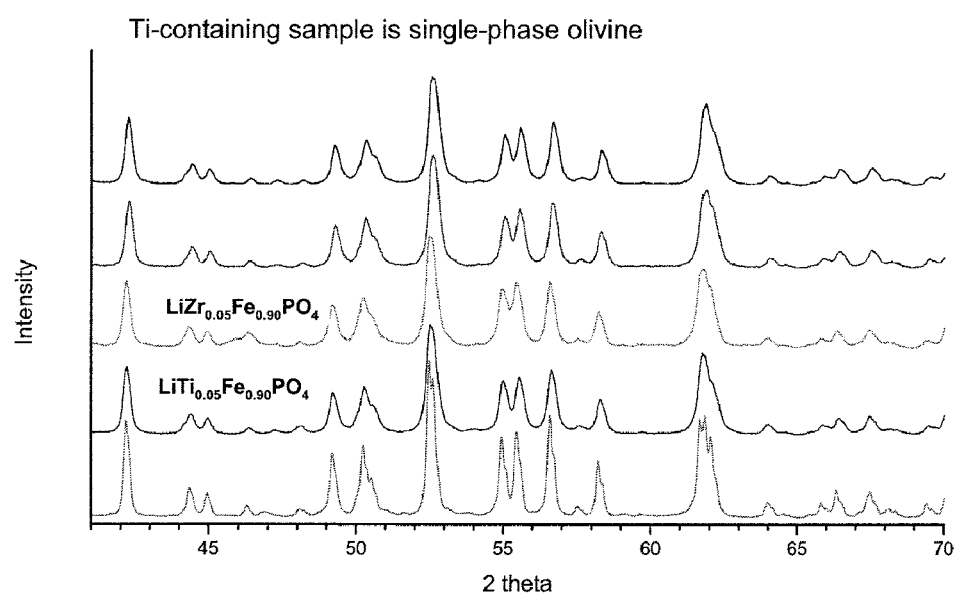
Figure 12E:
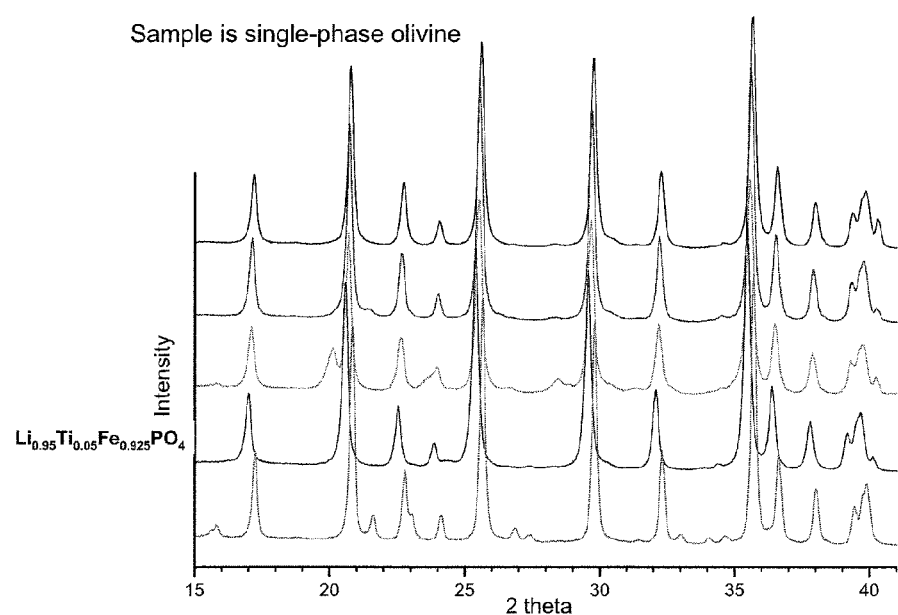
Figure 12F:
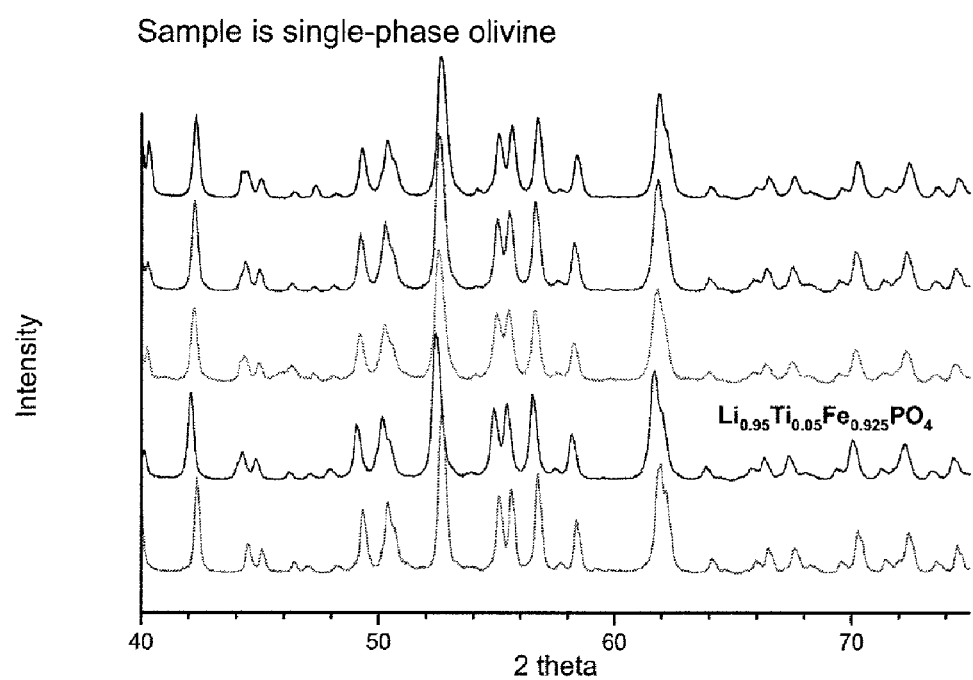
Figure 12G:
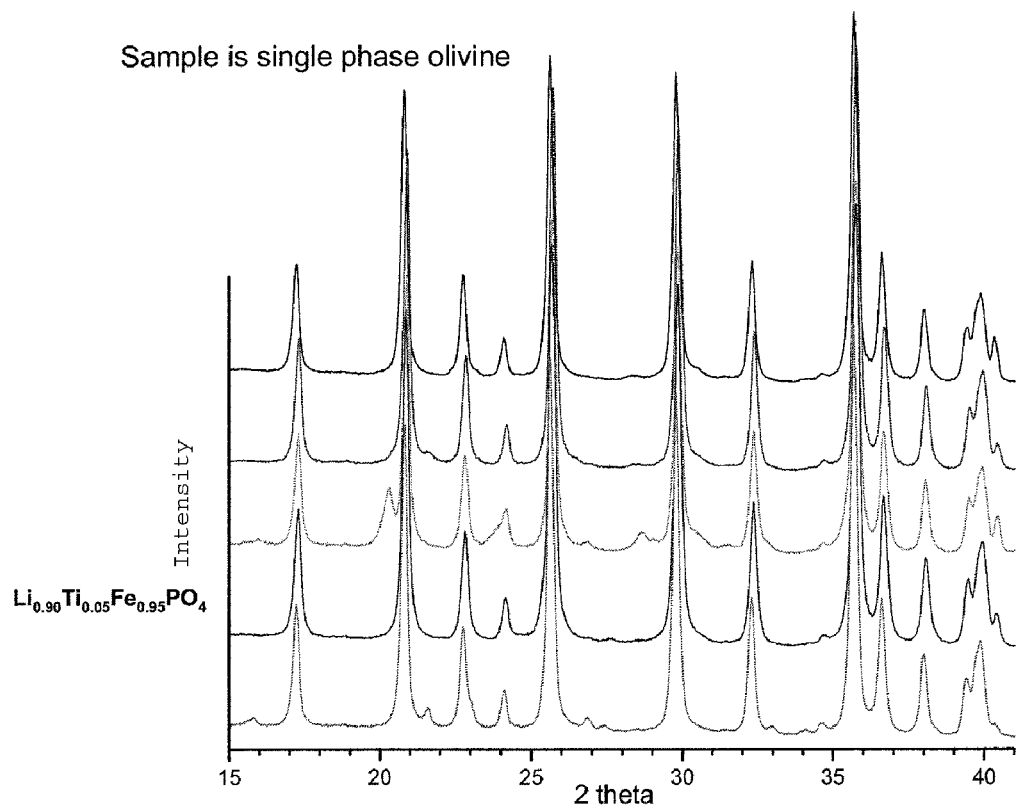
Figure 12H:
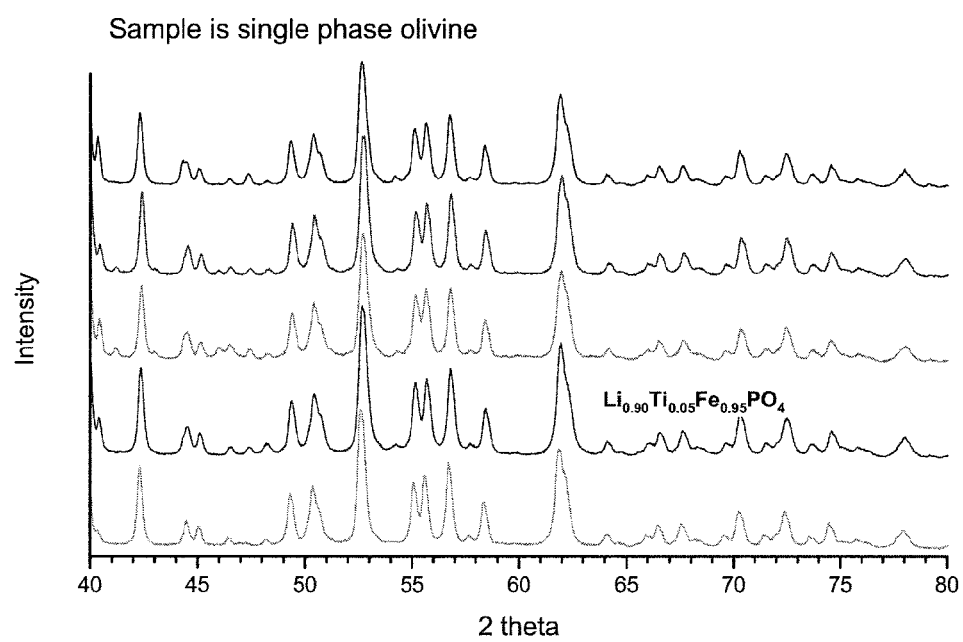
Figure 13A:
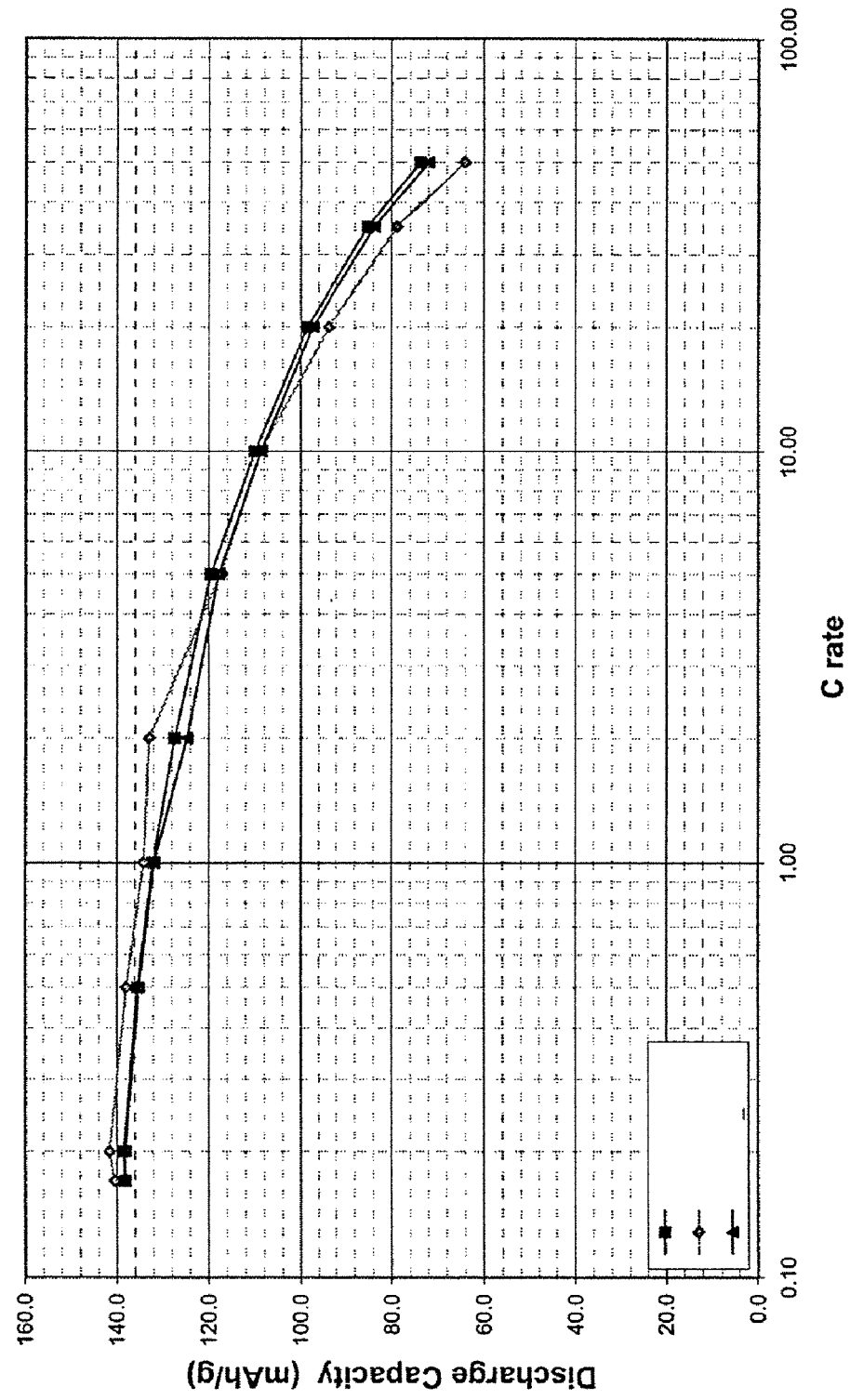
FIGS. 13A-13E are plots of discharge capacity (mAh/g) vs. C-rate for cells with (13A) $LiMg_{0.05}FePO_4$, (13B) $LiZr_{0.05}Fe_{0.90}PO_4$, (13C) $LiTi_{0.05}Fe_{0.90}P_4$, (13D) $Li_{0.95}Ti_{0.05}Fe_{0.925}PO_4$, and (13E) $Li_{0.90}Ti_{0.05}Fe_{0.95}PO_4$.
Figure 13B:
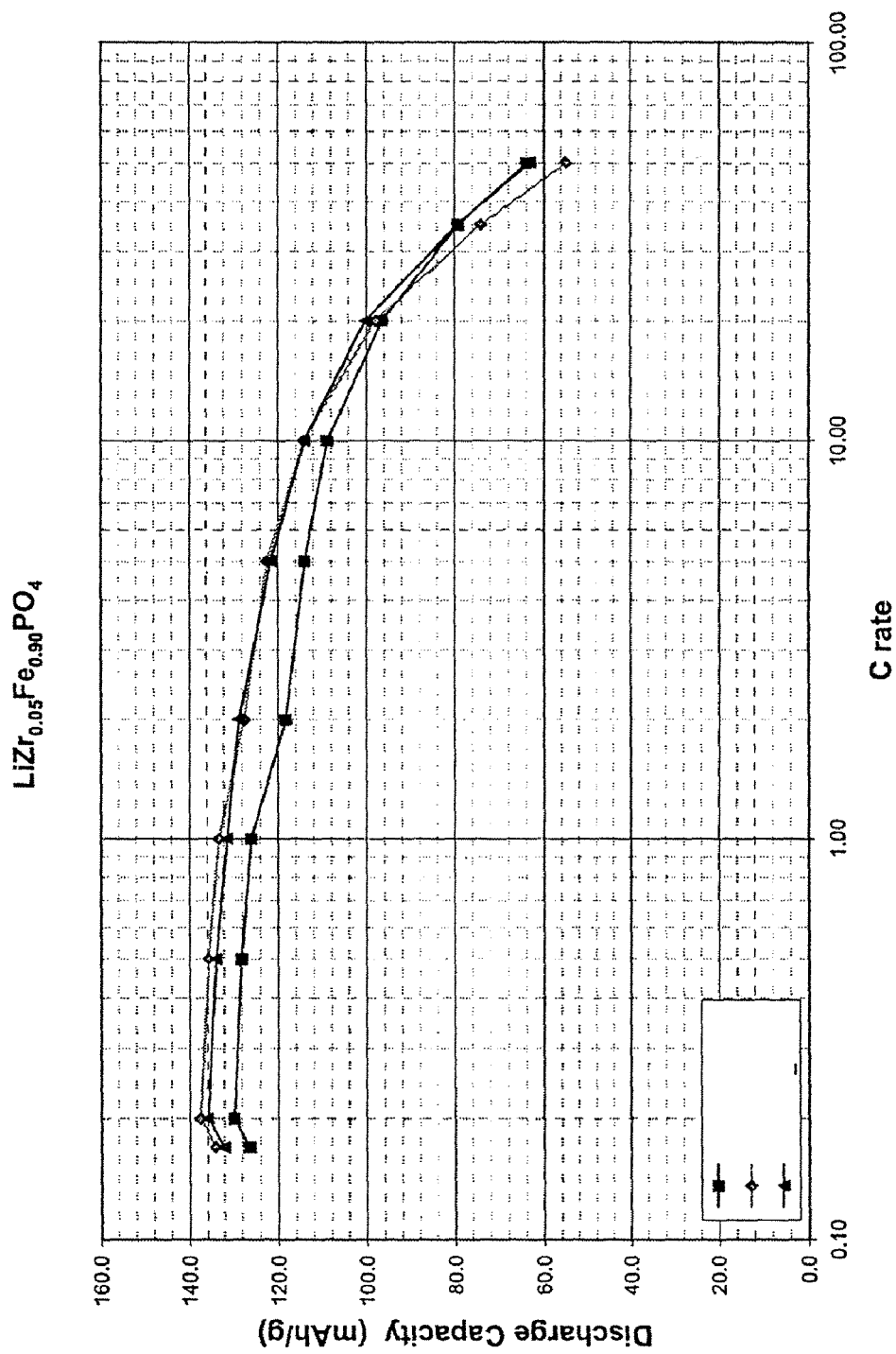
Figure 13C:
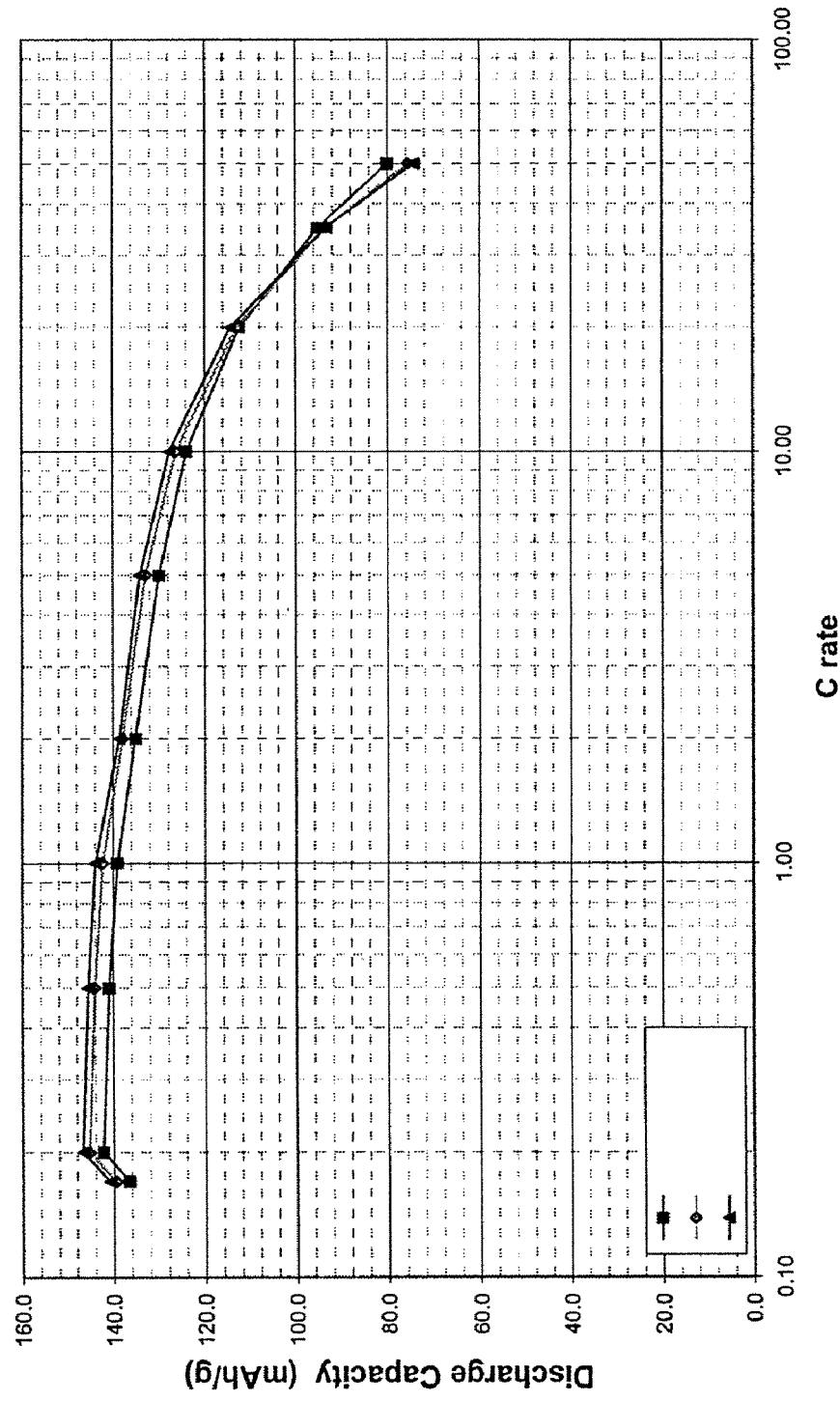
Figure 13D:
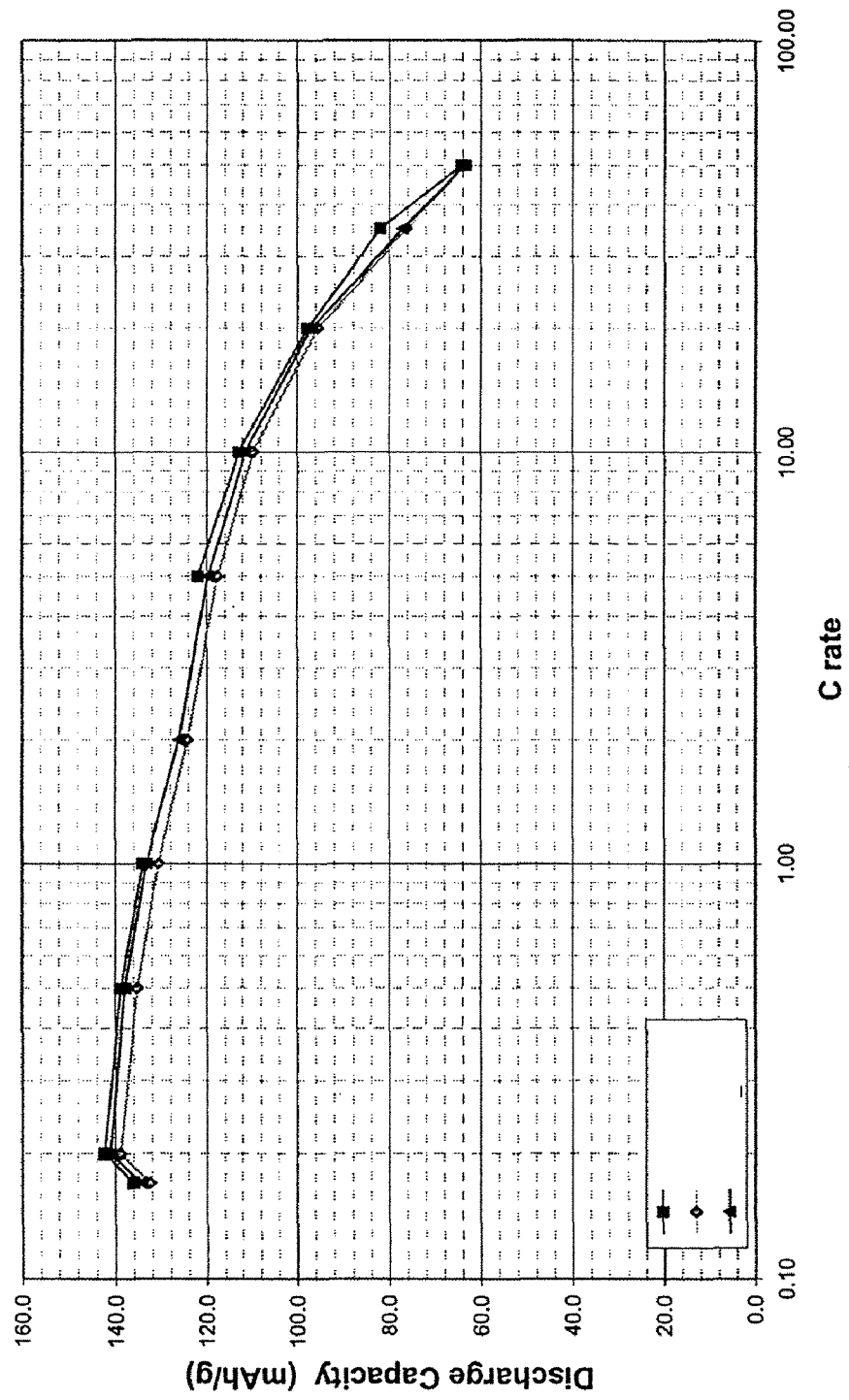
Figure 13E:
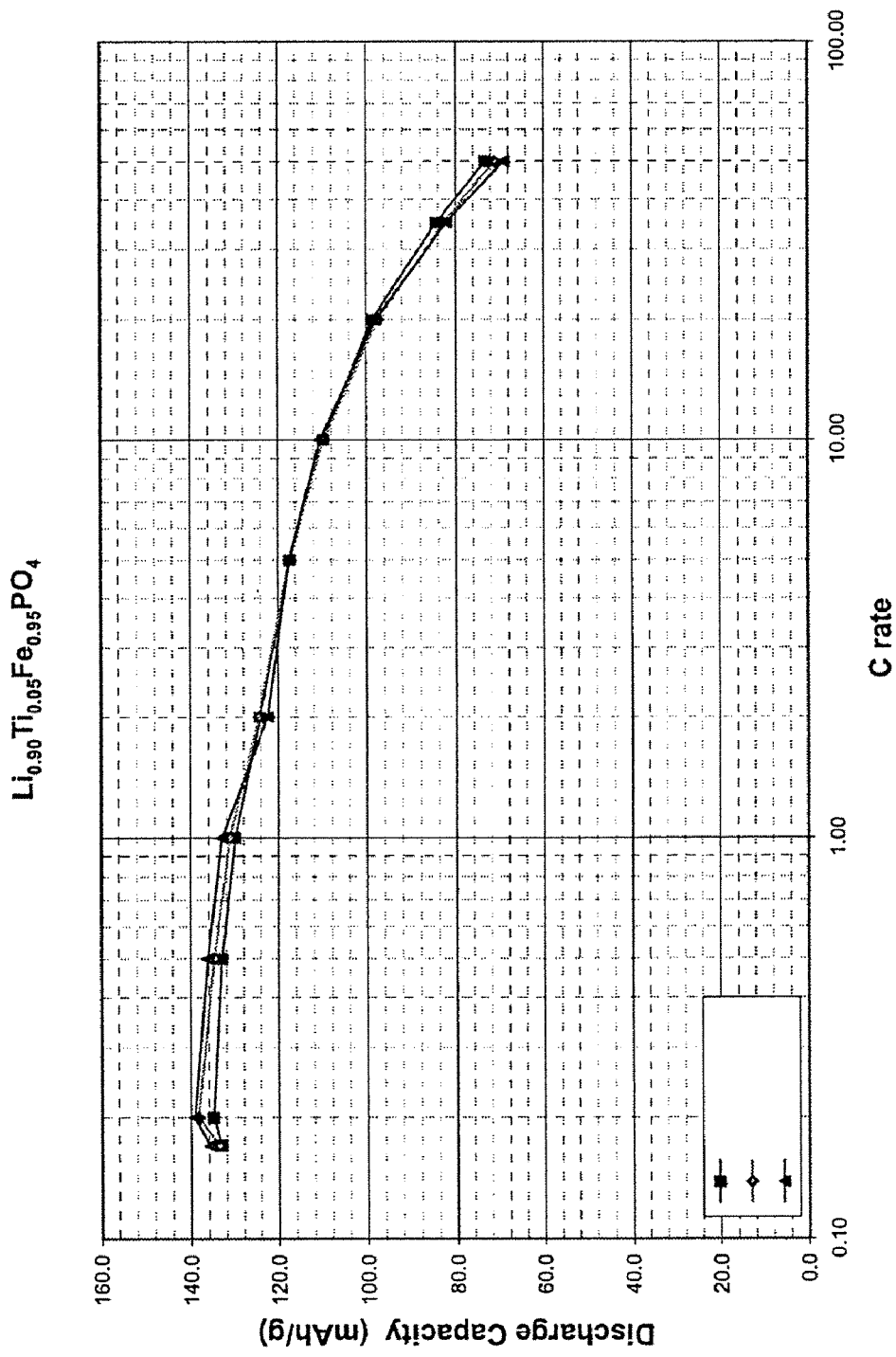
Figure 14A:
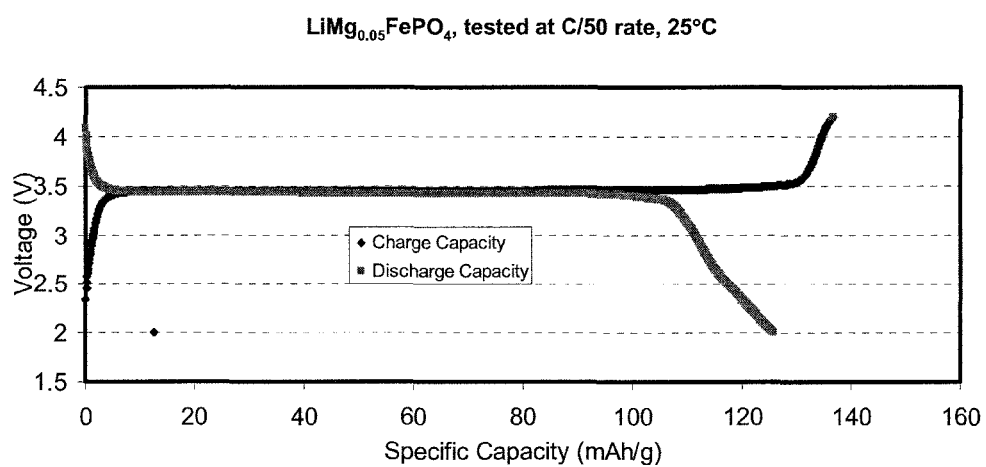
FIGS. 14A-14E are plots of voltage vs. specific capacity (mAh/g) for cells with (14A) $LiMg_{0.05}FePO_4$, (14B) $LiZr_{0.05}Fe_{0.90}PO_4$, (14C) $LiTi_{0.05}Fe_{0.90}PO_4$, (14D) $Li_{0.95}Ti_{0.05}Fe_{0.925}PO_4$, and (14E) $Li_{0.90}Ti_{0.05}Fe_{0.95}PO_4$, tested at C/50 rate and 25° C.
Figure 14B:
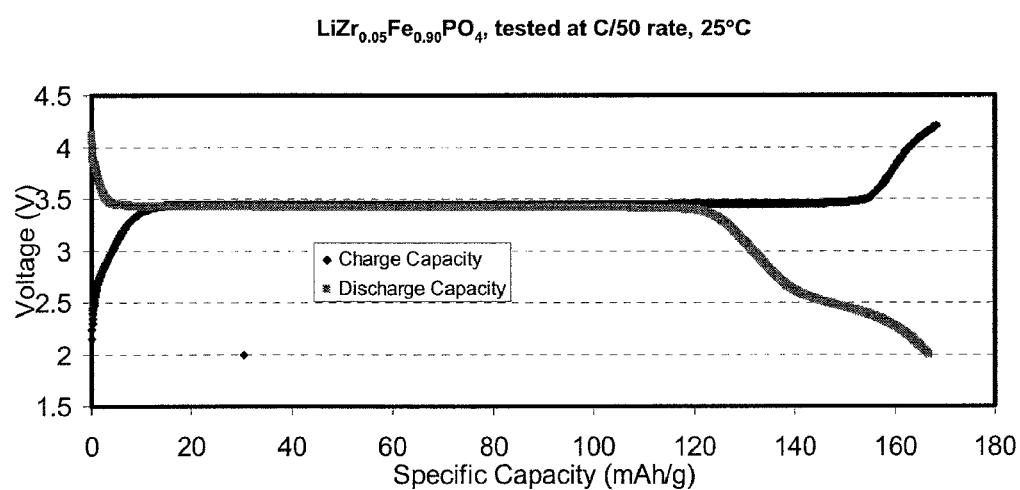
Figure 14C:
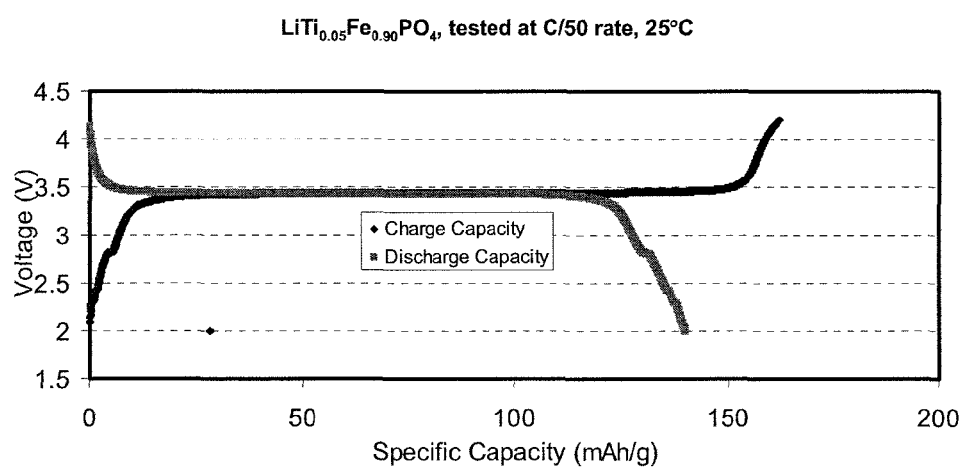
Figure 14D:
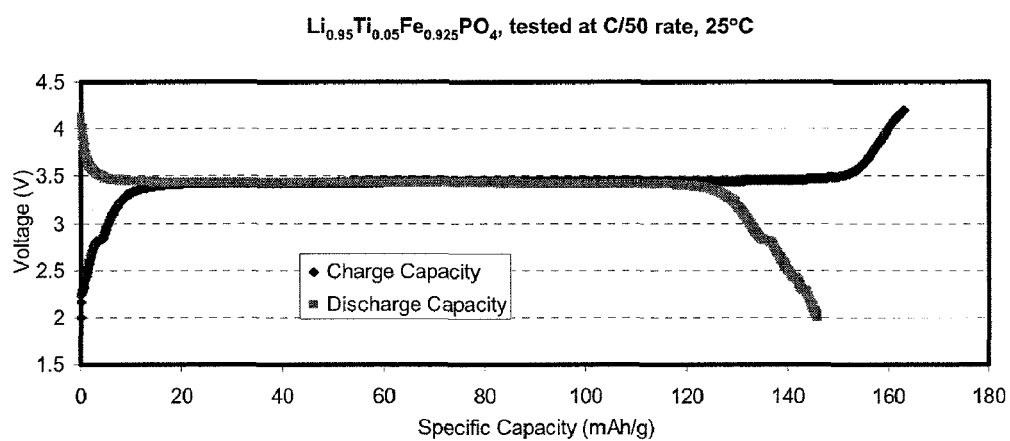
Figure 14E:
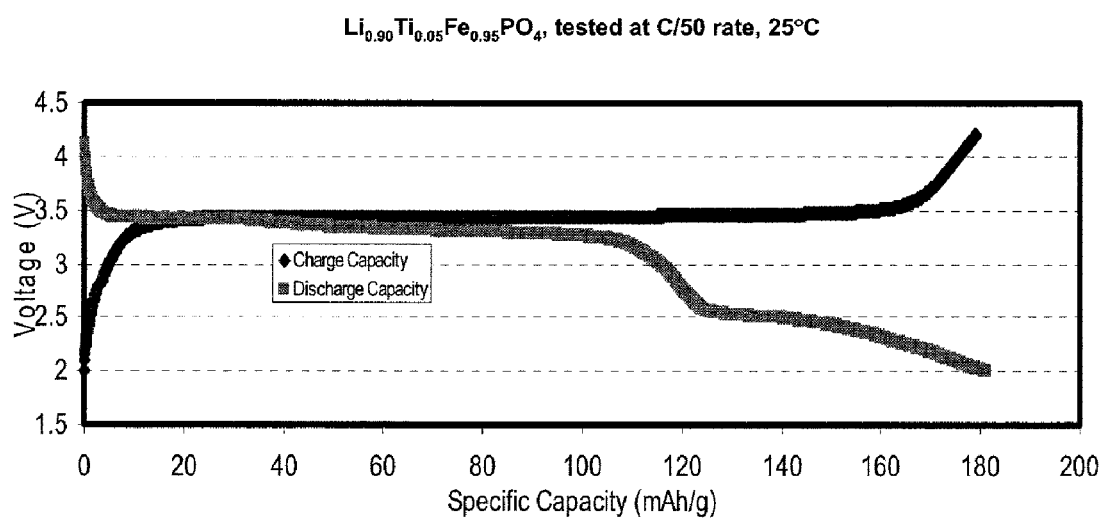

In operation, a battery containing a cathode having a lithium iron phosphate material and a high voltage indicator operates as illustrated in FIG. 11, which is an exemplary plot of voltage vs. discharge capacity (% SOC) for an electrochemical cell including a primary electroactive material and a high voltage additive. The voltage curve exhibits distinct plateaus at different voltages. The large plateau 1100 correlates to the open circuit voltage, e.g., for lithium iron phosphate at about 3.45 volts, and provides at least some of the operating capacity of the cell. The high voltage indicator, e.g., lithium nickel phosphate having an open circuit at about 5.4 V, lithium cobalt phosphate having an open circuit voltage at about 4.8 V, or lithium manganese phosphate having an OCV of about 4.0 volts, forms a plateau 1110 at a higher state of charge (designated arbitrarily at 80% SOC). Even though an electrode may have an intimate mixture of the different materials, or a solid solution of the different materials, with increasing charge voltage (lithium extraction) the iron is first oxidized, then the manganese, then the cobalt and then the nickel, in each case the oxidation being from the 2+ to the 3+ state and producing a capacity approximately equal to the amount of each metal, and a constant voltage, such that the voltage vs. capacity curve shows a plateau. This results in a curve having distinct inflection points (S-shaped curve) between relatively flat voltage plateaus. In a charging operation, a change in the cell potential from that at plateau 1100 to that of plateau 1110 indicates that the primary electroactive material has been substantially fully delithiated and that the cell is approaching a fully charged state. In some embodiments, a monitoring system uses this change in voltage to initiate a series of actions, such as slowing down the rate of charge or stopping charging to avoid damaging overcharge in the cell.

One skilled in the art will appreciate that behavior as illustrated in FIG. 11 is not observed uniformly in all positive electrode materials. For example, the presence of mixed metal oxides often results in a voltage curve that varies continuously, even linearly, between the OCVs due to the pure oxides. Two examples of compositions behaving in this manner are lithium nickel cobalt oxide ($Li(Ni,Co)O_2$) and lithium cobalt aluminum oxide ($Li(Co,Al)O_2$). By contrast, in the disclosed phosphate materials, when a transition to higher voltage is observed in the cell, there is typically an inflection in the voltage-capacity curve. By varying the relative amounts of the primary material and the higher voltage metal containing material, it is possible to tailor the capacity or the state of charge at which such a transition will occur. Thus, by way of example, a composition having iron and manganese as the transition metals, of which 80% by molar concentration is iron and 20% is manganese, will show a voltage transition at about 80% SOC. The voltage step appearing at this SOC can therefore be used as an indication of SOC. In certain embodiments, a composition includes lithium iron phosphate in a range of, for example, up to about 80, up to about 90, or up to about 95 molar %, with the balance being a high voltage indicator.

In some embodiments, the primary electroactive material that provides operating capacity is a single material, for example, a lithium iron phosphate material, or lithium manganese phosphate material. In other embodiments, the primary electroactive material is a mixed material, such as a single phase $Li(Mn,Fe)PO_4$. The material containing a mixture of Fe and Mn can be operated over a voltage range such that the capacity provided by both the $Fe^{2+}/Fe^{3+}$ and $Mn^{2+}/Mn^{3+}$ electrochemical couples is utilized for energy storage. In some instances, the electrochemical cells include a further additive, for example, a Co- or Ni-based lithium metal phosphate, to produce a sharply increasing voltage as the Mn couple is exhausted upon charging. In some such instances, the voltage step between 3.45V and 4.0V is used as an SOC indicator, indicating an intermediate state of charge, while the larger step between 4.0V and 4.8V or 5.4V is used to avoid overcharge of the positive electrode material beyond a desired SOC. In certain embodiments, the relative molar amounts of Fe and Mn are selected so that the voltage transition between that of $LiFePO_4$ and $LiMnPO_4$ occurs at about 60-90% SOC or at about 5-20% SOC, thus demarcating a desired capacity range for HEVs of about 5-90% SOC or about 20-70% SOC. In certain embodiments, the relative molar amounts of Fe and Mn are selected so that the voltage transition between that of $LiFePO_4$ and $LiMnPO_4$ occurs at about 40-60% SOC, which lies within a commonly desired capacity range for HEVs. A voltage transition in the pre-selected voltage range indicates where the SOC of the battery lies compared to the desired SOC range, and informs the battery monitoring system to allow subsequent control of the charging or discharging protocol. The use of Fe and Mn together, or Mn alone, also provides a higher average voltage in the main energy storage voltage range, and therefore higher energy, than when Fe alone is used. In some embodiments, Fe is included to improve the electrical conductivity and rate capability, and reduce the polarization, of a high Mn composition or a composition containing Mn alone as the transition metal.

In certain embodiments, the properties of an SOC indicator material are selected dependent upon the function it is to serve in the cell. For example, the appearance of an abrupt and large increase in voltage at a selected SOC is desirable in certain applications, such as in HEV applications where it is often desirable to limit the SOC swing.

Nickel, including nickel as a component of a single-phase olivine composition, is useful for providing a sharply increasing voltage "wall" at the end of the desired SOC swing, because it tends to have a higher OCV than other transition metal phosphate compounds. For example, during typical HEV operation, the sharp rise in voltage exhibited by LiFePO$_4$ or LiMnPO$_4$ at ~95% SOC is too late to prevent Li plating on the negative electrode, which can be a cause of capacity fade in cells under HEV cycling. A sharp rise in voltage at ~70 to 80% SOC informs the battery monitor that the SOC is getting high enough to be at risk of Li plating. In this particular example, the concern thus is not that the cell voltage necessarily spikes too high, but that within an allowable voltage range there still exists a risk of Li plating.

On the other hand, in some instances it is desirable to avoid a sharp voltage rise, and therefore to dissipate the energy in the battery more gradually upon overcharge, so that a lower voltage step is desirable. For some batteries, when energy cannot be dissipated, resulting in a sudden rise to high voltage, the positive electrode can undergo various chemical reactions that could damage the cell, in particular oxidative or gas-generating reactions. Upon discharge, in some instances it is desirable to avoid a sudden decrease in cell voltage to values where dissolution of the negative current collector by oxidation can occur. By providing a voltage step closer to the upper or lower voltage limits, energy can be dissipated when the overcharge or overdischarge voltage strays into the charge/discharge regime of the respective voltage indicators, limiting the extent of the voltage rise or depression when the capacity limit of the cell is reached at a relatively constant power, and mitigating these negative consequences.

Many compounds are known that exhibit an open cell voltage higher than lithium iron phosphate. In addition to the Mn, Co and Ni containing olivines described earlier, these include fluorophosphate compounds such as LiVPO$_4$F, lithium transition metal oxides of various structure types including rocksalt structure type and spinel structure type compounds LiNi$_x$Co$_y$Mn$_z$M$_w$O$_2$, where $0 \leq x \leq 1.2$, $0 \leq y \leq 1.2$, $0 \leq z \leq 1.2$, $0.5 \leq x+y+z+w \leq 1.2$, $0 \leq w \leq 0.5$, and M is a main group metal including but not limited to Mg, Al, Zr, and Ti. For example, an additive compound has $0.2 < x < 0.4$, $0.2 < y < 0.4$, and $0.2 < z < 0.4$, or $x=0.5$, $y=0=w$, and $z=0.5$. Spinel structure compounds such as LiMn$_2$O$_4$ and its compositionally modified derivatives are also included. One skilled in the art can select which compound to use for a given application from the published or measured voltage vs. capacity curve of the compound, amongst other features such as the rate capability of the material, stability in extended electrochemical cycling, and cost of raw materials.

In some embodiments, a low voltage indicator additive is included to produce a lower voltage step, and is used during discharge in the same manner as the high voltage additive is used during charge. A low voltage indicator can be selected in a similar manner. For example, a number of suitable metal phosphate compositions have been discovered which exhibit a voltage step upon discharge at voltages in the range of 2.8 to 3.3V vs. Li, depending on the discharge current rate. Exemplary materials include lithium metal phosphate compositions containing magnesium (Mg), zirconium (Zr) or titanium (Ti). These lower voltage materials can be single phase materials or include a combination of phases or compounds. They can form crystalline olivine solid solutions, or can be disordered or amorphous materials.

In operation, a battery containing a positive electrode having a lithium iron phosphate material and a low voltage indicator operates illustrated in FIG. 11, which is an exemplary plot of voltage vs. discharge capacity (% SOC) for an electrochemical cell including a primary electroactive material and a low (and high) voltage additive. The voltage curve exhibits distinct plateaus at different voltages. As noted above, the large plateau 1100 correlates to the open circuit voltage, e.g., for lithium iron phosphate at about 3.45 volts, and provides operating capacity of the cell. The low voltage indicator, e.g., a lithium titanium (magnesium, or zirconium) iron phosphate composition, having an open circuit voltage less than that of the primary electroactive composition forms a plateau 1120 at a lower voltage and lower state of charge (designated arbitrarily at 15% SOC). In a discharging operation, a change in the cell potential from that at plateau 1100 to that of plateau 1120 indicates that the primary electroactive material has been substantially fully lithiated and that the cell is approaching a fully discharged state. A monitoring system can use this change in voltage to initiate a series of actions, such as slowing down the rate of discharge or stopping discharging, to enjoy the benefits or avoid the damage described hereinabove.

As a non-limiting example of an embodiment employing a protective additive, a method is provided to prevent a cell from catastrophic failure in the event of accidental overcharge. Often cells are made with a current-interrupt device (CID). The CID is designed so that it conducts current from the cell terminal to the cell electrodes during normal operation. If the pressure in the cell exceeds a certain threshold, the CID deforms, breaking the electrical connection and thus interrupting the current, thereby protecting the cell against further overcharge, which could generate dangerous amounts of gas.

The cell generates gas during overcharge because the electrolyte or electrode materials are oxidized at potentials beyond the normal operating voltages to produce gaseous products. It is these gaseous products that create the increased pressure that trips the CID. However, in some situations, the species produced during the period of overcharge may continue to react after the current is interrupted. This continuing reaction may further generate heat and gas, leading to popping of safety vents or even bursting of the cell cap or case. The risk of cell venting is particularly acute if the rate of gas generation is very rapid, in which case the pressure of the cell may rise somewhat above the CID trip pressure in the time that it takes for the CID to activate.

In certain embodiments herein, the composition of the positive electrode is designed to reduce the amount of reaction that occurs after interruption of the current during overcharge. Several other methods of enabling safe tripping of a CID have been discussed. Getter additives such as Li$_2$CO$_3$ may be mixed into the positive electrode to inhibit unwanted reactions during overcharge. Gassing additives such as biphenyl may be mixed into the electrolyte to generate gas at a potential lower than that at which undesirable reactions begin to occur. However, these additives do not contribute to, and may negatively impact, cell energy or power during normal operation of the cell.

Battery chargers generally operate at a fixed current or at a fixed power. Consider the case of a fixed current. The total current leaving each electrode is the sum of all the electrochemical reactions occurring in that electrode. The reactions that may be occurring at the positive electrode during overcharge include 1) extraction of lithium ions from the active positive electrode material, 2) side reactions which generate only inert gaseous species, and 3) side reactions which generate gas and/or species which may continue to react after interruption of the current. The relative rates of the reactions depends on the difference between the local electrochemical potential and the redox potential for the particular reaction, which is a function of the local reactant and product concentrations. For the case of lithium iron phosphate, the redox potential occurs entirely below about 3.9V vs. Li. Once all of the lithium has been extracted, no further oxidation of the active material itself is possible. Continued application of a charging current will then drive up the cell voltage to potentials at which the side reactions occur at rates sufficient to meet the applied current. That high voltage may lead to unwanted side reactions which generate species that continue to react after the current is interrupted or which generate gas at too rapid a rate.

In one or more embodiments herein, small quantities are added (e.g., <5% of the mass of the primary positive electrode active material) of secondary positive electrode materials which have redox potentials between 3.7 and 4.4 V vs. Li, to positive electrodes in which the primary active material is lithium iron phosphate. During normal operation, these materials will not be active. If the positive electrode is charged above the redox potential of the secondary positive electrode material, it will be oxidized. As a result, the cell potential will rise more slowly during overcharge than it would without the secondary active material. The lower cell potential means that gas is generated at a slower rate, giving the CID time to trip, and that fewer species are generated that would continue to generate heat and gas after tripping of the CID. Examples of secondary positive electrode materials include but are not limited to $LiMnPO_4$ Solid solutions of $LiMnPO_4$ with $LiFePO_4$, $LiNi_xCo_yMn_zM_wO_2$, where $0 \leq x \leq 1.2$, $0 \leq y \leq 1.2$, $0 \leq z \leq 1.2$, $0.5 < x+y+z+w \leq 1.2$, $0 \leq w \leq 0.5$, and M is a main group metal including but not limited to Mg, Al, Zr, and Ti, for example, where $0.2 < x < 0.4$, $0.2 < y < 0.4$, and $0.2 < z < 0.4$, or $x=0.5$, $y=0=w$, and $z=0.5$, or M=Al, $x=0$, $y=0$, $z=0.95$, $w=0.05$.

Many compounds are known that exhibit an OCV lower than that of lithium iron phosphate or other olivines, and which are therefore useful for lower-voltage indication with such positive electrode materials. Furthermore, many compounds are known that exhibit an OCV lower than 3.3V with respect to $Li/Li^+$, above which corrosion of a copper negative current collector occurs. Such compounds with an OCV lower than 3.3V are useful for both lower-voltage indication and overdischarge protection. The compounds that exhibit an OCV lower than 3.3V include without limitation lithium transition metal oxides of various structure types including rocksalt, spinel, rutile, and non-close-packed structures, having a general formula $Li_xM_yO_z$ where M is typically Fe, V, or Ti. The lithiated vanadium oxides $LiV_xO_y$ and the lithiated titanium oxides $LiTi_xO_y$ including the spinel $Li_4Ti_5O_{12}$ and its derivatives, which has an OCV of about 1.5V, are specific non-limiting examples. Lithiated lithium manganese oxide spinel $Li_{1+x}Mn_2O_4$ has an OCV of about 3.0V in the composition range of $0 < x < 1$. Furthermore, polymorphs of $LiMnO_2$ that have monoclinic and orthorhombic symmetries (both in ordered rocksalt structure) are known to irreversibly transform to $Li_xMn_2O_4$ spinel-like structures upon extraction of lithium, and have an OCV of about 3.0V in the composition range of $1 < x < 2$. Thus, the $Li_2Mn_2O_4$ and $LiMnO_2$ compounds (with or without dopants such as Al and Cr) can be implemented for both lower voltage indication and overdischarge protection. Many anhydrous and partially hydrated lithium metal polyanion compounds of lower potential are also known, and are employed in certain embodiments, including lithium metal phosphates, silicates, and sulfates having the olivine or NASICON structure types, amongst others. Specific non-limiting examples include the NASICON structure compounds $Li_xM_2(PO_4)_3$ where M=Fe, V, or Ti, selected to have values x giving OCV below 3.3V.

Materials that initially have an OCV higher than 3.3V vs. Li can also be utilized as the additive for overdischarge protection if such materials develop a capacity at a voltage lower than 3.3V upon subsequent Li insertion. Orthorhombic and monoclinic $LiMnO_2$ are examples of such materials. The initial Li extraction from $LiMnO_2$ occurs at about 3.7V, but the subsequent Li insertion occurs mainly at about 3.0V, accompanying a phase transformation from an ordered rocksalt structure to a spinel-like structure. With further Li extraction and insertion, both 4.0V and 3.0V capacities develop. Therefore, when $LiMnO_2$ is physically mixed with the primary positive electrode material, the 3.0V redox potential can be utilized for overdischarge protection.

In one or more embodiments, compounds as identified above are implemented for the above described purposes by co-synthesizing or physically mixing an amount of the lower OCV material with the higher voltage positive electrode material in a molar proportion that is consistent with the state of charge for which one is seeking indication, or in order to provide the desired capacity and voltage for overdischarge protection. In one or more embodiments, physical mixtures of these compounds are used for overdischarge protection.

In at least some instances involving physical mixing of the primary positive electrode material with lower voltage materials as positive electrode additives, the additive material is added in a form from which lithium can initially be extracted at the desired low voltages to function as a low voltage indicator or an overdischarge protection agent. In certain lithium ion cells, the cell is assembled in a discharged state, and the lithium that is inserted into the positive electrode during discharge is typically the lithium that was initially extracted from the positive electrode during charge. In such an instance, typically all of the lithium that is cycled during use of the battery originates from the starting positive electrode. If the lower voltage positive electrode additive is in the lithiated state in the original mixture, lithium extraction during charge occurs first from the lower OCV positive electrode additive, and then from the primary positive electrode material. Taking lithium iron phosphate as an example of a primary positive electrode material, during discharge, lithium insertion occurs first into the lithium iron phosphate, and then into the lower voltage positive electrode additive. If the lower voltage positive electrode additive material is added in a state from which lithium cannot be extracted, lithium extraction and insertion occur only in the lithium iron phosphate during charge and discharge, respectively. In such case, the lower voltage positive electrode additive does not participate in the lithium insertion during discharge, and thus does not function either as a lower voltage indicator or as an overdischarge protection agent.

Lower voltage positive electrode additive materials provided in a lithiated state can be obtained by solid state synthesis or by chemical or electrochemical lithiation of compounds that are initially in a more delithiated form. $LiMnO_2$ is a non-limiting example of a low voltage positive electrode additive material that exists in the lithiated state as synthesized by solid state reaction. The NASICON compound $Li_3Ti_2(PO_4)_3$ is a non-limiting example of a low voltage positive electrode additive material that can be prepared in the lithiated state through chemical lithiation of $LiTi_2(PO_4)_3$. The spinel compound $Li_4Ti_5O_{12}$ is usually prepared with the Ti in the 4+ state, such that the Li is not extractable, but this compound can also be chemically lithiated to provide a lithiated spinel $Li_{4+x}Ti_5O_{12}$ for use as described above. Methods for chemical lithiation are well-known to those skilled in the art; one example is the use of butyllithium as the lithium source. Lower voltage positive electrode additive materials prepared in the lithiated state can also be obtained by solid state lithiation of a more delithiated form. In one embodiment, the lithiated (tetragonal) spinel $Li_2Mn_2O_4$ is made by the solid-state reaction of the cubic spinel $LiMn_2O_4$ with a lithium salt such as $Li_2O$ or $Li_2CO_3$ in a controlled atmosphere, the starting $LiMn_2O_4$ being used as a seeding compound to obtain the tetragonal spinel rather than the orthorhombic or monoclinic forms of $LiMnO_2$. The desired phases can also be made by solid state reaction of a manganese salt such as $MnCO_3$ or $MnO$ or $Mn_3O_4$ with a lithium salt such as $Li_2O$ or $Li_2CO_3$. Materials produced by other lithiation methods known to those of skill in the art (e.g., Berbenni et al., *J. Anal. Appl. Pyrolysis* 62:45-62 (2002)) also are useful as electroactive additives.

However, low voltage phases have also been observed in olivine systems. As demonstrated in the examples below (see, e.g., Examples 4-6) in discharge or cycling of lithium iron phosphate material with a low voltage indicator additive, a small low-voltage plateau appeared on first discharge at a range of about 2.3-2.8V vs. Li. While not to be bound by any particular theory, this new voltage plateau may be an indication of a structural modification within the bulk olivine phase, demonstrating a lithium iron phosphate material that includes a crystallographic modification or phase change providing ion storage at a lower voltage step.

In some embodiments, overdischarge protection is implemented by mixing the primary negative electrode material, for example carbon, with the compounds with an OCV lower than 3.3V but higher than the OCV of the primary negative electrode material to provide the desired capacity and voltage. The negative electrode additive materials are provided in an initially lithiated state in the mixture in order to function as overdischarge protection. If the negative electrode additive is in the lithiated state in the original mixture, lithium insertion during charge of the lithium ion cell occurs only in the primary negative electrode material. Under normal discharge conditions, lithium extraction in the negative electrode occurs only in the primary negative electrode material. Under overdischarge conditions, lithium extraction occurs in the negative electrode additive material as the primary negative electrode material is completely out of lithium. Furthermore, to provide overdischarge protection, the capacity from the negative electrode is large enough to fully lithiate the positive electrode material. If the negative electrode additive is not initially lithiated, when the cell is overdischarged to 0V, the positive electrode will remain partially delithiated while the negative electrode (both the primary materials and the additive) will be fully delithiated. In such case, the negative electrode potential will rise to the OCV of the partially delithiated positive electrode, and overdischarge protection is not achieved.

In various embodiments, monitoring of the cell performance is carried out in a number of ways. Consider two modes of operation: on load, and on rest. On load, the discharge rate is high, it is changing frequently, and in vehicles discharge alternates with charge. This means many features of the voltage profile tend to get convoluted, in the convolution integral sense of convoluted, i.e., smoothed out. It is possible to detect dV/dSOC as a function of SOC (also dependent on current and impedance). A sharp slope or "hard wall" in the voltage profile can be used as a signal that the cell has reached the end of the designed SOC range.

On rest, it is possible to relate OCV to SOC. Adding slopes to the OCV profile helps to improve accuracy of SOC estimation. In addition, the fact that the second derivative of OCV vs. SOC changes sign is a mathematical characteristic of at least some OCV profiles that have useful characteristics for SOC monitoring. It is possible to monitor either the second derivative changing sign and/or the magnitude of the first derivative increasing (on load), or simply use a lookup table for SOC (on rest). Second derivatives may be more useful for applications like cell phones that have low discharge rates.

As shown in the examples below, embodiments described herein provide for voltage vs. time or voltage vs. capacity profiles where the curvature goes from negative to positive, namely the second derivative of voltage $d^2V/dt^2$ or $d^2V/dC^2$ changes sign. In some embodiments, the change in second derivative of voltage with respect to time or capacity is used by the battery management system.

Voltage sensors are typically used to record the instantaneous voltage. When these measurements are taken sequentially over time, these values can be analyzed by relatively simple microprocessors. The rate of change of voltage over time dV/dt, or with respect to capacity (dV/dC), can be calculated. Similarly, if the voltage data are smooth and "well-behaved" over time, such as with a constant current charging method, the second derivative of voltage $d^2V/dt^2$ or $d^2V/dC^2$ can also be calculated. This rate of change of voltage and the second derivative both give information about the cell's relative state of charge and how close the cell is to being fully charged. In some electrochemical systems, the voltage will rise rapidly as the cell approaches full state of charge. Thus, dV/dt or dV/dC will increase as the cell reaches higher SOC. It is possible to use the second derivative ($d^2V/dt^2$ or $d^2V/dC^2$) in a similar fashion, but as a more sensitive indicator of change in voltage.

It is also possible to correct the voltage of the cell for the impedance, to estimate the open-circuit potential if the current were to be interrupted. This is done by subtracting current times impedance from the cell voltage. The current is measured. The impedance can be recorded as a lookup table as a function of state of charge and/or temperature. Additionally, the dependence of impedance on time may be estimated via a model, such as an equivalent circuit model or more complicated cell model. Correcting the cell voltage for cell impedance can enable one to better track changes in the open-circuit voltage, particularly if the current is changing over time.

When the system detects a significant change in dV/dt, dV/dC, $d^2V/dt^2$, or $d^2V/dC^2$ several actions can be taken. One is to indicate to the battery management system that the particular cell being measured is approaching a known SOC, usually the fully-charged state. This cell can be compared to other cells in a battery pack to determine whether this cell is at a higher SOC than the others. If so, a cell balancing circuit can be activated to shunt some of the charging current away from the cell that is at higher SOC. Other cell balancing schemes can also be implemented, based on the change in dV/dt, dV/dC, $d^2V/dt^2$, or $d^2V/dC^2$. If no cell balancing circuit is implemented in the system, the charging parameters can be modified, for example, by lowering the charging current to improve the overall battery SOC, while reducing the chance of overcharging the system. For example, in automotive applications, the vehicle can activate mechanical breaks, thereby reducing the amount of charge going into the battery via the electric motor from regenerative braking. Or, the controls of the HEV can allow the battery to assume a larger burden of the next discharge event, by reducing the power from the internal combustion engine, to bring down the cell state of charge. If enough cells have dV/dt, dV/dC, $d^2V/dt^2$, or $d^2V/dC^2$ values that exceed the target, a signal can be sent to stop charging, since the battery is at the desired SOC, usually fully-charged.

Since the system detects a significant change in dV/dt, dV/dC, $d^2V/dt^2$, or $d^2V/dC^2$ it is possible to design an electrochemical system that adds features in the voltage profile curve to introduce voltage indicators, for example, related to SOC. As described in detail herein, SOC indicating voltage steps can be introduced by adding materials to the positive and/or negative electrode. The additive materials have voltage profiles or plateaus that are different, thus introducing new features to the overall voltage profile curve. In one example, an electrochemical system has a relatively flat voltage profile curve at 3.3V. However, introduction of an additional material to the positive electrode might introduce another voltage plateau at 3.7V. Depending on how much of this second material is used, the SOC indicator can be "tuned" to the desired value. For example, if 20% of the positive electrode uses this second material, the overall cell voltage will rise from 3.3 to 3.7V around 80% SOC, then flatten around 3.7V between 80 and 100% SOC. The presence of the second, higher voltage plateau also can be used to prevent the cell from being overcharged, for example, where the voltage profile curve rises rapidly after reaching the end of the first, lower voltage plateau. Given the rapid rise in voltage (high dV/dt or dV/dC) at the end of the voltage plateau, it may be possible to extend life by creating another voltage plateau, which prevents the cell from unintentionally reaching the high voltages that can damage the electrolyte and electrodes (e.g., >4.4V). It may also be possible to extend life by operating the cell within a targeted range of SOC.

The use of additional active materials to introduce voltage steps can also be used in conjunction with other cell balancing strategies, such as electrochemical redox shuttles. In these systems an electrochemically-active compound, the redox shuttle, is able to pass, or shuttle, current during charge. The redox shuttle can allow a significant amount of current to be transferred, thus preventing the cell from being charged to a higher voltage. Although the redox shuttle will work without a second material, with a higher voltage plateau, having such a plateau offers a margin of protection in case the redox shuttle is not able to keep up with the charging current. In this case, any additional charging current that is not dissipated by the shuttle could be used in charging the cell at the second, higher voltage profile, as opposed to pushing the cell into an overcharged state.

High and low voltage additives as described herein can be present in the electrode as a homogeneous mixture, or as a separate phase or phases produced during preparation and firing of the electrode material. According to some embodiments, the use of single-phase or single-compound materials containing suitable multiple voltage steps is desirable, because it reduces the inherent crystallographic or lattice strain of a given ion storage phase or compound from the full strain that ordinarily occurs when the phase or compound is cycled across its full SOC range. The creation of SOC indicators in the voltage profile allows the SOC swing of the battery to be accurately controlled. Correspondingly, the reduced strain occurring within the ion storage electrodes, and in the electrodes and battery, increases battery rate performance and calendar life, and decreases the rate of capacity fade upon cycling and the impedance growth rate leading to power fade with or without cycling. According to one embodiment, the SOC indicating voltage steps are selected to allow easy limitation of the SOC swing of the battery to a range over which the strain is reduced to improve the above properties of the battery while permitting a high reversible storage capacity, energy and/or power.

For example, the unit cell volume difference between olivine $LiFePO_4$ and $FePO_4$ is about 6.5%, and between $LiMnPO_4$ and $MnPO_4$ is about 11%. These differences are sufficient to cause mechanical damage including fracture of active material particles, and deterioration of battery performance, if the material is cycled between 0-100% SOC. However, by introducing voltage steps that allow the state of charge swing to be limited to a smaller range, the total strain that the material undergoes during cycling is reduced, and performance characteristics such as power, retained energy at high power, cell impedance, and cycle or calendar life are improved. For example, the upper SOC can be limited by introducing a voltage step due to the addition of Co or Ni, and the lower SOC can be limited by introducing a phase or chemical constituent, such as is described in the examples below, that introduces a lower voltage step.

In some embodiments, the particles of an electrode material are very fine, even nanoscopic in their dimensions, in order to provide a high rate capability, reduced particle strain during cycling, or long cycle or calendar life. In some instances, the specific surface area is high, for example, greater than about 10 $m^2/g$, greater than about 15 $m^2/g$, greater than about 20 $m^2/g$, or even greater than about 30 or 40 $m^2/g$. Solid state materials of this kind can be made by processes known in the art and, in particular, as is described in commonly owned and co-pending published application US 2004/0005265, which is incorporated in its entirety by reference.

In some embodiments, the high and low voltage additives are added to the electrode as a physical mixture of separate powders. In such embodiments, the impedance of the electrode or battery on the separate voltage steps can be independently selected by adjusting the compositions and physical characteristics of the additive powders, including their average particle size or specific surface area, particle size distribution, and particle morphology. The physical characteristics of electroactive powder used to adjust and/or control impedance is described in commonly owned and co-pending published application US 2005/0233219, which is hereby incorporated by reference.

In one or more embodiments, a positive electrode having a high and/or low voltage indicator is incorporated into a battery, for example, an HEV or PHEV battery, for use as an indicator that the outer ranges of desired state of charge has been reached. The battery management system can then initiate an optimization procedure to return the battery to the desired state of charge.

In various embodiments, mixtures of high and low voltage indicator additives, as well as mixtures of primary electroactive material providing operational capacity are used. Composition percentages of each of the components are determined depending on the function that is desired. For example, the composition optionally includes one or more components that function as a high voltage indicator, a low voltage indicator, or both. In some embodiments, the amount of each of these additives independently ranges from about 0-20 molar %, about 1-20 molar %, about 5-15 molar %, about 5-10 molar %, or about 1-10 molar %. In some embodiments, the primary electroactive component is present in an amount of about 60-95 molar %, about 80-95 molar %, or about 70-90 molar %. The molar percentage of a constituent is herein defined as the amount of electrochemically active lithium in the constituent over its respective voltage range relative to the total amount of electrochemically active lithium from all constituents. The molar amount of each material to be used is readily determined by one of skill in the art from the voltage and capacity provided by each constituent, or from the detailed voltage-capacity relationship of a constituent. The composition can include one or more components that function as a primary electroactive material.

As a non-limiting example, a multifunctional phosphate positive electrode material includes four or more materials, each with its own nominal equilibrium potential. These are represented according to their idealized olivine composition, although it is recognized that the electroactive material may be a solid solution containing the components making up these idealized compositions:

V1=LiCoPO$_4$ (a high voltage indicator)

V2=LiMnPO$_4$ (a high energy electroactive material, which also can serve as a high voltage indicator relative to LiFePO$_4$)

V3=LiFePO$_4$ (a primary electroactive material)

V4=a dopant providing a low voltage indicator (as described in Examples 4-6 below)

In one or more embodiments, the electroactive material has the following general formula (expressed in molar %): 0-20% of V1; 60-100% of V2; 0-20% of V3; 0-20% of V4, wherein at least one of V1 and V4 are not zero. In other embodiments, the electroactive material has the following general formula (expressed in molar %): 0-20% of V1; 20-60% of V2; 20-60% of V3; 0-20% of V4, wherein at least one of V1 and V4 are not zero. Further non-limiting exemplary compositions (molar %) are shown in Table 1.

TABLE 1

|    | A   | B   | C   | D   |
|----|-----|-----|-----|-----|
| V1 | 0%  | 5%  | 5%  | 10% |
| V2 | 0%  | 95% | 85% | 40% |
| V3 | 95% | 0%  | 5%  | 40% |
| V4 | 5%  | 0%  | 5%  | 10% |

The equilibrium potentials of the compositions have the following values: V1>V2>V3>V4.

Referring to the compositions shown in Table 1, in one or more embodiments, A is a high power formulation, including a low voltage indicator. For some embodiments, B is the highest energy cell, with a high voltage indicator. For some embodiments, C is a high energy cell, with one overvoltage and two low voltage indicators. This would be useful for PHEV, consumer electronics, and other applications where the cell operates mainly on the V2 plateau. D is a moderate energy cell, with a balanced mixture of V2 and V3 plateaus. This would be useful if the cell operates near 50% SOC (or some mid-SOC) and operates on both plateaus. In this case, one would use the V2 plateau to indicate >50% SOC and the V3 plateau to indicate <50% SOC. The SOC setpoint need not be 50% SOC.

The use of two low voltage indicators would be useful in the SOC estimator as a fuel gauge. In some embodiments, on the V3 plateau, the cell is mostly discharged. Once the V4 plateau is reached, the cell is at a critically-low SOC and the battery management system could initiate graceful shutdown. In certain applications, it is important to give the system or the user advance warning that the battery is reaching a low SOC. This is to prevent catastrophic failure (e.g., in a radio-controlled airplane), data loss (e.g., in a laptop computer), or a potentially hazardous loss of functionality (e.g., in vehicles.)

Exemplary compositions providing a high and/or a low voltage indicator function are described in the examples below. As also shown in the examples, a single metal phosphate composition can be prepared that includes both a high and a low voltage indicator, providing a multifunctional composition.

Further beneficial properties of certain compositions disclosed herein relate to an extended range of solid solution. It is well-known that cathode-active compounds in the $Li_xM_yXO_4Z_z$ family, where M comprises a metal, X is P, S, Si, Ge, As, W, or Mo, and Z is a halogen, often exhibit discontinuous phase transformations as their composition x changes, for example, when they are used as the cathode-active material in a rechargeable lithium battery. This behavior is due to the limited mutual solid-solubility of the crystalline compounds in this system for each other. For example, in the $Li_xFePO_4$ system, the lithiated LiFePO$_4$ endmember and the delithiated FePO$_4$ endmember are largely insoluble in each other, such that there exists a wide range of lithium composition x over which both phases co-exist. The same is known for the system $Li_xMnPO_4$, $Li_xFe_{1-y}Mn_yPO_4$, LiCoPO$_4$, LiNiPO$_4$, and other such olivines and their solid solutions. Typically the composition difference between the coexisting phases is so large that if one forms from the other, a situation of high stress results, which causes the generation of crystal defects or even fracture of the material.

It has previously been shown (see, e.g., Meethong et al., Adv. Funct. Mater. 17:1115-1123 (2007), and Meethong et al., Electrochem. Solid State Lett., 10[5]:134-138 (2007)) that increasing the solid solubility between such co-existing phases, for instance by reducing the size of the crystallites, by adding dopants, by changing the Li to M to P stoichiometry of the compound away from the ideal composition of the compound (e.g., Li:M:P=1:1:1 in olivine phosphates), or forming amorphous phases, reduces the strain between portions of the material having different lithium concentrations. For instance, this can reduce the difference in unit cell volume including the lattice mismatch along the plane of least misfit between the two phases when they coexist in a single crystallite. This increased solid solution range is beneficial to the charge and discharge capability, stored energy, and life of batteries using such compounds. The improved performance of such materials can be observed in whole or in part by measurements of the charge capacity or discharge capacity of the materials at various currents and temperatures when used as an electrode, the rate of ion intercalation or deintercalation when charging or discharging at a constant voltage (so-called potentiostatic intermittent titration tests, PITT), by examination of the structure of the material using diffraction or electron microscopy methods, or by the retention of charge or discharge capacity when the electrode is cycled repeatedly.

We have unexpectedly discovered that by providing an olivine compound with mixed transition metals M, and simultaneously reducing the primary crystallite size to below about 500 nm, in some instances below about 100 nm, it is possible to greatly extend the solid solution limits of such compounds with respect to the lithium composition x. This can provide improved performance and added functionality of such compounds when used as lithium storage electrodes in batteries.

In some embodiments, the creation of an extended solid solution with respect to lithium concentration causes the equilibrium potential of the electrode material to vary continuously with lithium concentration, whereas in the presence of a two-phase reaction it is constant. This allows improved SOC detection and monitoring in a battery. In some embodiments, the presence of a solid solution allows more facile insertion and removal of lithium, since the nucleation or growth of a separate phase is not needed when the electrode is cycled within the solid solution range, and even when it is used over a wider range of lithium concentration, the amount of discontinuous phase transformation is reduced. Such behavior can be seen in PITT measurements, such as those described in Example 13 and shown in FIG. 20, and improves the power and energy that is obtainable at a given current rate, as well as decreasing the hysteresis of the cell. This promotes greater energy efficiency, less self-heating, and improved SOC monitoring. In some embodiments, the extended solid solution reduces the mechanical strain between regions of differing composition within the electrode as it is cycled. For example, the lattice misfit between two crystalline regions of differing lithium concentration can be reduced. This in turn promotes improved cycle life by reducing mechanical stresses that ordinarily might promote fracture, fatigue, or the generation of defects within the compound.

The lithium concentration range (SOC) over which an equilibrium solid solution is obtained is not necessarily identical to the total concentration range over which the material is used, nor the range over which fast charge and discharge kinetics are observed. A complete solid solution can be beneficial but is not required; partial solid solutions can still reduce the misfit between lithiated and delithiated phases, such that fast charge or discharge kinetics are obtained when the material is cycled over a broader lithium concentration range (SOC). Also, the composition regime over which the material has kinetic characteristics beneficial to fast charging is typically a more limited SOC regime than for fast discharging, as exemplified by the PITT results in FIG. 20. In some embodiments, in batteries based on materials as disclosed herein, improved functionality is provided through specific methods of use. In some embodiments, SOC regimes are selected that are beneficial to fast charging, as in a consumer product for which rapid recharge is beneficial. In some embodiments, SOC swing is selected to be over composition ranges where the material provides benefits in cyclic high rate charging and discharging with high power, energy and life, as in the case of a hybrid electric vehicle (HEV) battery. These SOC ranges may be identified using various electrochemical tests but are especially aided by the use of kinetic tests such as PITT (FIG. 20). In some embodiments, the charging time is reduced by, for instance, tailoring the current-voltage profile during charge to have a high current rate in solid-solution regimes and a slower current rate in regimes of two-phase reaction. The regimes of lithium solid solution and two-phase reaction can be identified using electrochemical tests and structural tests such as X-ray diffraction. This functionality can be beneficial in consumer electronics, power tool, PHEV or electric vehicle (EV) applications, amongst others.

In the examples below (see, e.g., Examples 13-14), results are provided for several specific compositions to illustrate the effects and benefits of an extended solid solution range. The principles demonstrated by these results can naturally be extended to other composition systems. Using the methods disclosed here, one of skill in the art can readily determine other compositions for which there is an extended Li solid solution, enabling better SOC monitoring due to the sloping voltage curve, faster charge or discharge kinetics, longer cycle life, lower hysteresis and/or improved cycle life due to the lower misfit strain upon cycling.

The following examples are presented for the purpose of illustration only and are not intended to be limiting.

Example 1

Preparation and Testing of $LiFe_{0.9}Mn_{0.1}PO_4$

The composition $LiFe_{0.9}Mn_{0.1}PO_4$ was prepared from accurately assayed and weighed proportions of the materials $Li_2CO_3$, iron (II) oxalate, manganese (II) carbonate, and ammonium phosphate. The dry components were weighed and mixed with a sufficient quantity of high purity acetone to create a free-flowing suspension, and the mixture was roller-milled in a sealed polypropylene jar using zirconia milling media for 24 hours, obtaining a homogeneous and finely-divided precursor suspension. The precursor was thoroughly dried and then heat treated in a tube furnace under flowing argon gas (grade 5.0), first at 350° C. for 10 h and then at 700° C. for 5 h. The fired powder was formulated into an electrode having the following composition:
- Cathode-active powder: 3.95 g
- Super P carbon: 0.50 g
- Kynar 2801 binder: 0.55 g
- γ-butyrolactone (solvent): 28.5 g and mixed to create a free flowing suspension, then cast in a uniform layer onto aluminum foil. The coating was dried in vacuum at 100-110° C., after which it was measured to have a thickness of about 100 micrometers, and punched into discs of 1-2 cm diameter as appropriate to fit Swagelok or coin cells. The electrode coatings were assembled into lithium half-cells using Swagelok or coin cell hardware, using a microporous polymer separator, lithium foil as the negative electrode (total lithium content at least ten times greater than the theoretical storage capacity of the positive electrode), and a conventional nonaqueous lithium ion battery electrolyte containing $LiPF_6$ as the lithium salt.

Figure 2:
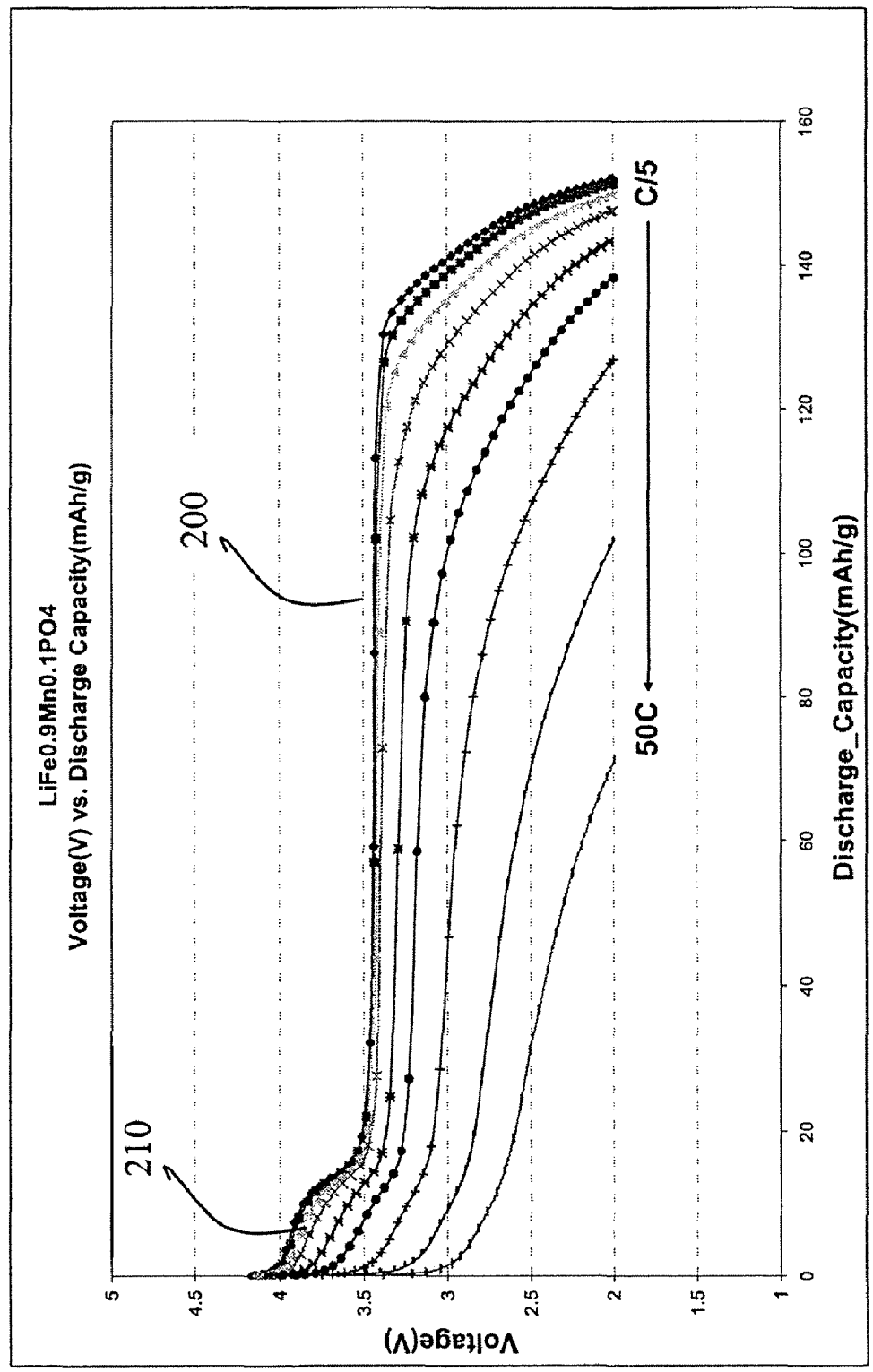
FIG. 2 is a plot of voltage vs. discharge capacity (mAh/g) for $LiFe_{0.9}Mn_{0.1}PO_4$ cell cycled at 2-4.2V.

It is envisioned in this composition that the operating voltage would be 2 to 3.6V (SOC is 0 to 90%). The voltage and discharge capacity of the material was tested over a range of C-rates in this operating range. For illustrative purposes in FIG. 1, the sample was cycled between 2.0V and 3.8V (curve 100) and 4.2V (curve 110). The discharge capacity at 10 C retained up to about 85% of its discharge capacity at 0.1 C, demonstrating stable recycling at potentials above that of $LiFePO_4$. FIG. 2 illustrates the voltage vs. discharge capacity vs. plot for $LiFe_{0.9}Mn_{0.1}PO_4$ cycled over 2-4.2V. The discharge and voltage properties of Fe and Mn together establish that the mixed metal phosphate has a higher average voltage in the main energy storage voltage range, and therefore higher energy than when Fe alone is used. The plots also indicate a plateau 200 at about 3.45 V, typical of $LiFePO_4$, and a high voltage plateau 210 that is indicative of the presence of $LiMnPO_4$.

Example 2

Synthesis and Properties of $LiFe_{0.9}Co_{0.1}PO_4$

Figure 3:
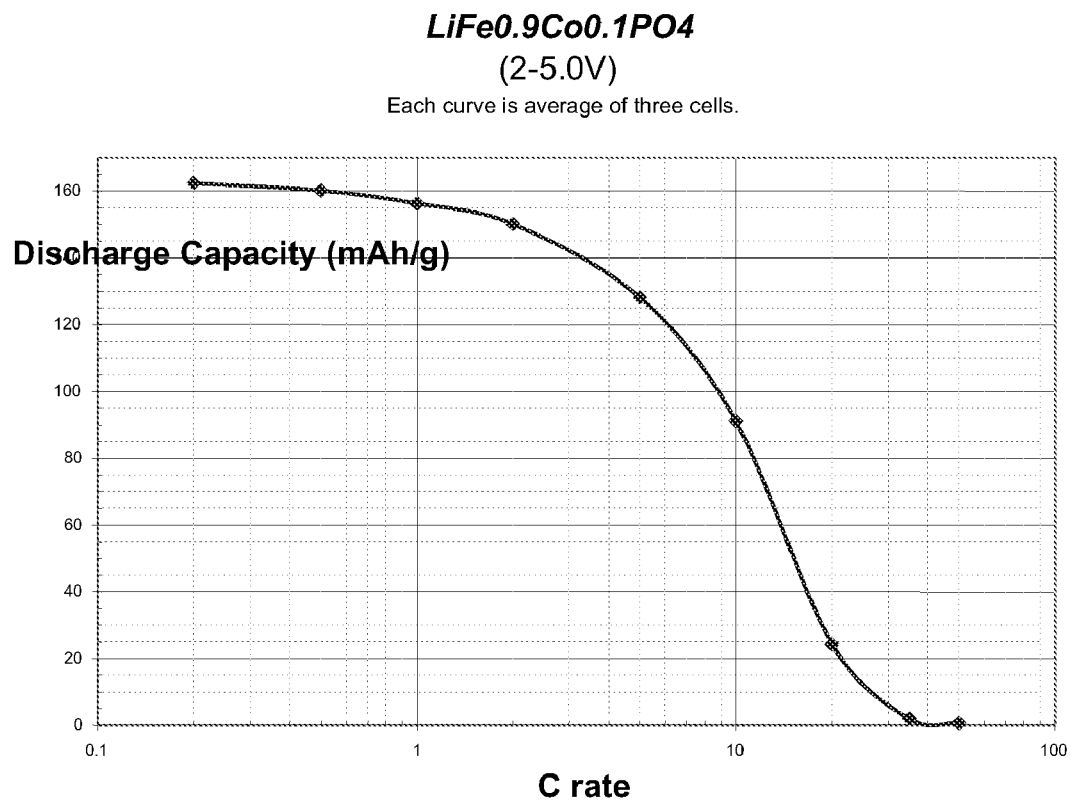
FIG. 3 is a plot of discharge capacity (mAh/g) vs. C-rate for $LiFe_{0.9}Co_{0.1}PO_4$ cell cycled at 2-5.0V.
Figure 4:
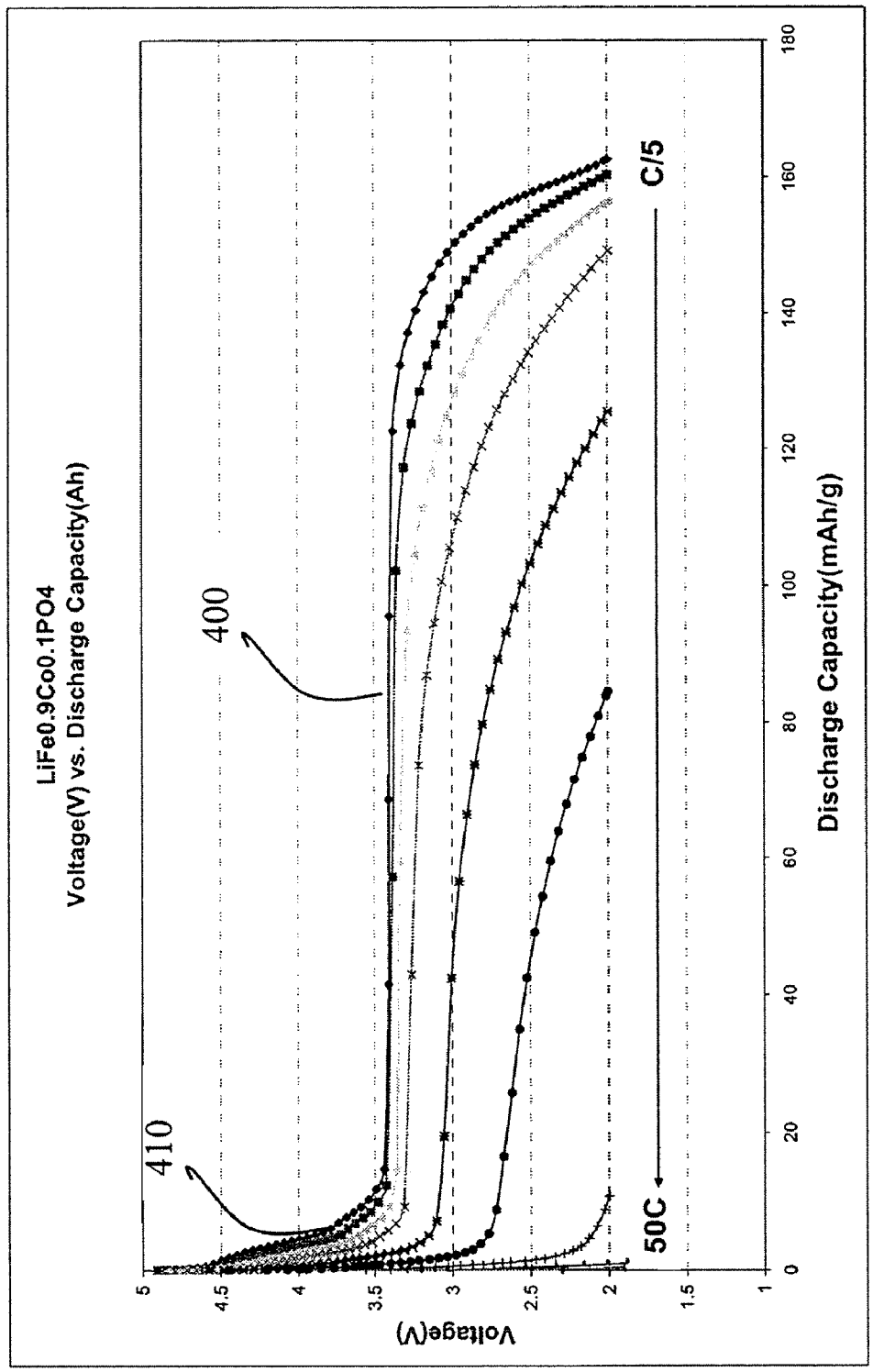
FIG. 4 is a plot of voltage vs. discharge capacity (mAh/g) for $LiFe_{0.9}Co_{0.1}PO_4$ cell cycled at 2-5.0V.

This composition was synthesized and tested according to the methods of Example 1, except that $CoC_2O_4.2H_2O$ was used as the source of cobalt. It is envisioned in this composition that the operating voltage would be 2 to 3.6V (SOC is 0 to 90%). The voltage and discharge capacity of the material was tested over a range of C-rates in this operating range. In an illustration of the material properties, FIG. 3 is a discharge capacity vs. C-rate curve for $LiFe_{0.9}Co_{0.1}PO_4$ (2 to 5.0V) illustrating charge/discharge capacity retention to high rates. FIG. 4 is a voltage vs. discharge capacity plot for $LiFe_{0.9}Co_{0.1}PO_4$ cycled 2-5.0V. The discharge plots show a plateau 400 at about 3.45 V, typical of $LiFePO_4$, and a high voltage steep rise 410 that is indicative of the presence of $LiCoPO_4$. The compound contained 10% by mole of Co in order to limit the state of charge to about 90% when the upper voltage limit is below about 4.8V (measured with respect to a lithium metal negative electrode).

Example 3

Synthesis and Testing of $LiFe_{0.6}Co_{0.2}Mn_{0.2}PO_4$

Figure 5:
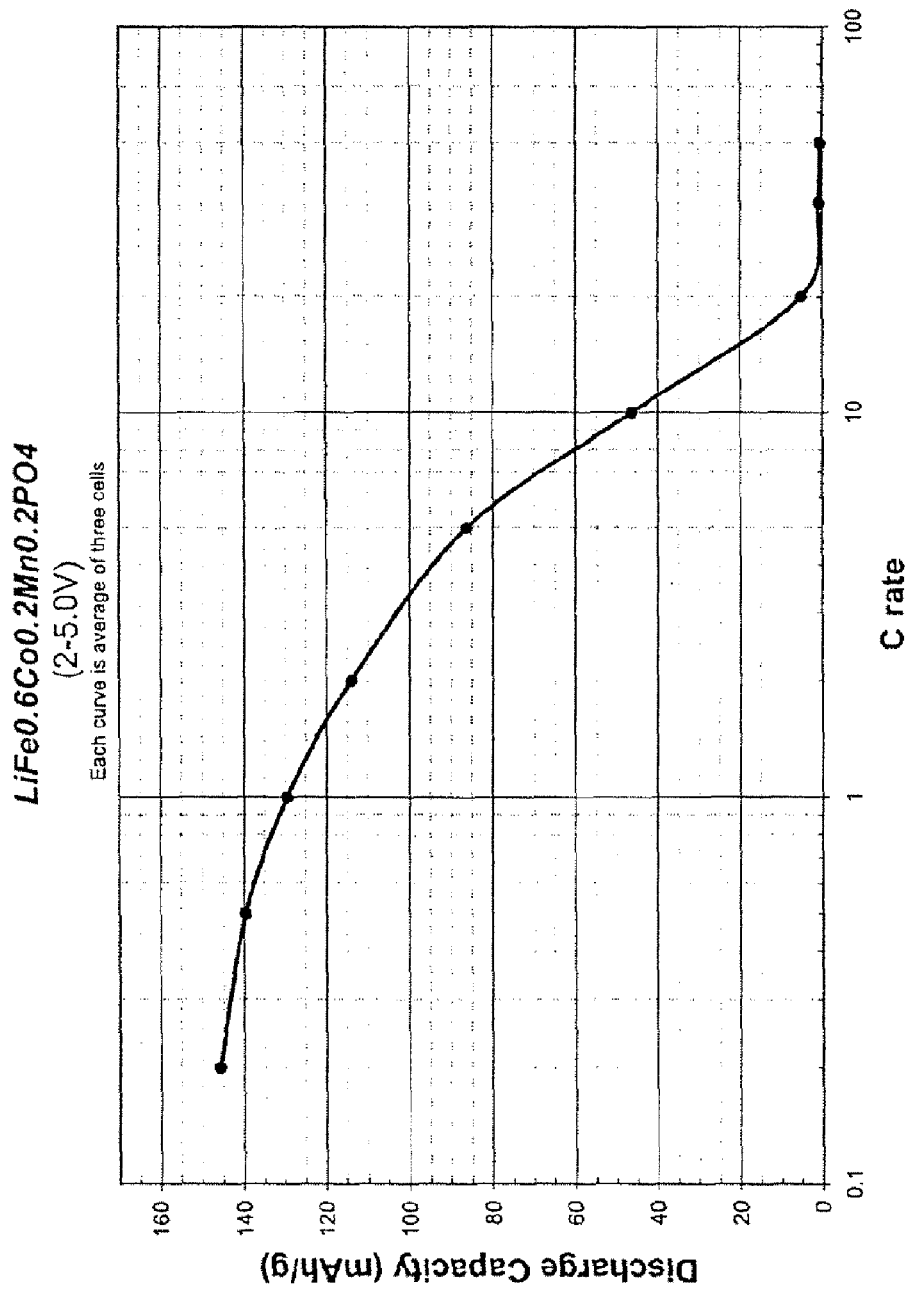
FIG. 5 is a plot of discharge capacity (mAh/g) vs. C-rate for $LiFe_{0.6}Co_{0.2}Mn_{0.2}PO_4$ cell cycled at 2-5.0V.
Figure 6:
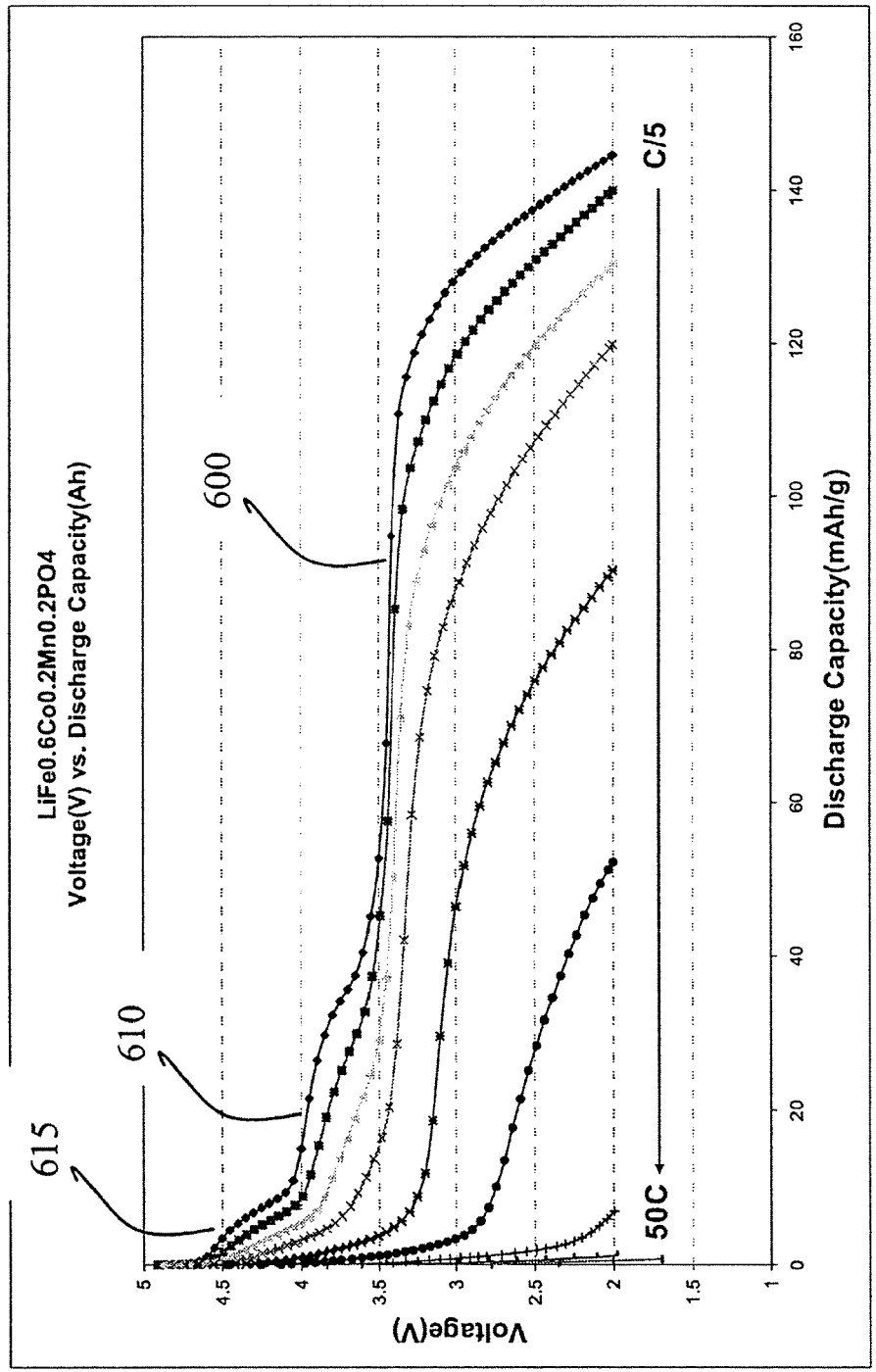
FIG. 6 is a plot of voltage vs. discharge capacity (mAh/g) for $LiFe_{0.6}CO_{0.2}Mn_{0.2}PO_4$ cell cycled at 2-5.0V.

This composition was synthesized and tested according to the methods of Examples 1 and 2. It is envisioned in this composition that the operating voltage would be 2-3.6V (0 to 60% SOC). The voltage and discharge capacity of the material was tested over a range of C-rates in this operating range. In an illustration of the material properties, FIG. 5 is a discharge capacity vs. C-rate curve for $LiFe_{0.6}Co_{0.2}Mn_{0.2}PO_4$ (2 to 5.0V) illustrating high capacity to high charge/discharge rates. FIG. 6 is a voltage vs. discharge capacity plot for $LiFe_{0.6}Co_{0.2}Mn_{0.2}PO_4$ cycled 2-5.0V. The discharge plots show a plateau 600 at about 3.45 V, typical of $LiFePO_4$, a higher voltage plateau 610 that is indicative of the presence of $LiMnPO_4$, and a final high voltage steep curve rise 615 that is indicative of the presence of $LiCoPO_4$. The compound contained 20% by mole of Co in order to limit the state of charge to about 80% when the upper voltage limit is below about 4.8V (measured with respect to a lithium metal negative electrode). The inclusion of Mn provided a higher average voltage in the main energy storage voltage range.

Example 4

Synthesis and Testing of Compounds with High and Low Voltage Indicator

This example illustrates phosphate compositions prepared and tested vs. lithium metal negative electrodes according to the method of Examples 1-3, except that $Ti(OCH_3)_4 \cdot (CH_3OH)_2$, $Zr(OC_2H_5)_4$, and $NiC_2O_4 \cdot 2H_2O$ were used as the sources of titanium, zirconium, and nickel respectively. The compositions exhibited both an upper voltage indicator due to the addition of nickel, and a lower voltage step introduced by the addition of Zr or Ti, useful as SOC indicators at low SOC states or for overdischarge protection, e.g., protection against negative electrode current collector dissolution upon overdischarge or short-circuiting of a cell. In each case there was 10% by mole of Ni added to the composition in order to limit the state of charge to about 90% for an upper voltage limit below about 5.4V (measured with respect to a lithium metal negative electrode).

Figure 7:
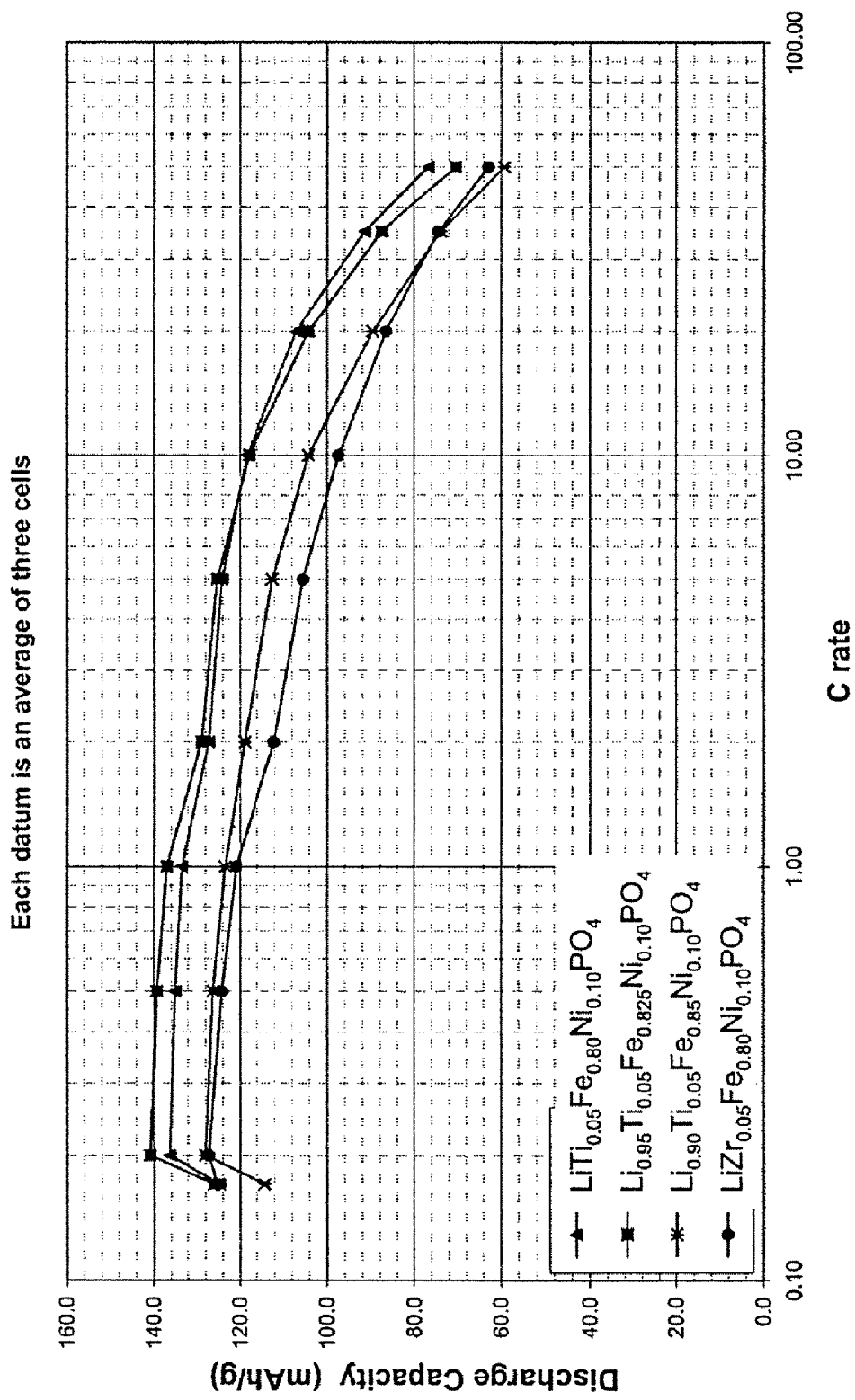
FIG. 7 is a plot of discharge capacity (mAh/g) vs. C-rate for Ti- or Zr-containing mixed metal phosphate cells.
Figure 8A:
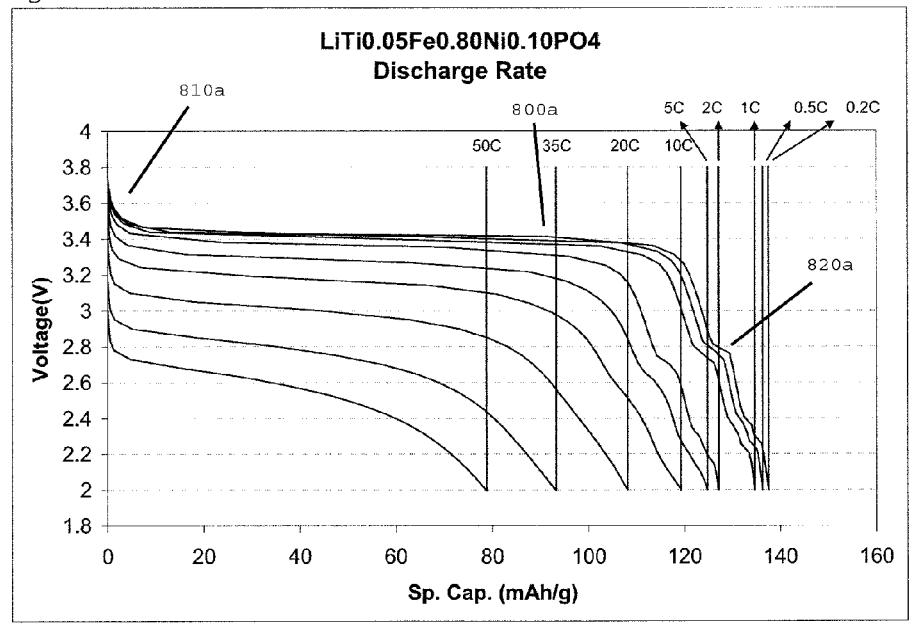
FIGS. 8A-8D are plots of voltage vs. discharge capacity (mAh/g) for cells with (8A) $LiTi_{0.05}Fe_{0.80}Ni_{0.10}PO_4$, (8B) $Li_{0.95}Ti_{0.05}Fe_{0.825}Ni_{0.10}PO_4$, (8C) $Li_{0.90}Ti_{0.10}Fe_{0.85}Ni_{0.10}PO_4$, and (8D) $LiZr_{0.05}Fe_{0.80}Ni_{0.10}PO_4$.
Figure 8B:
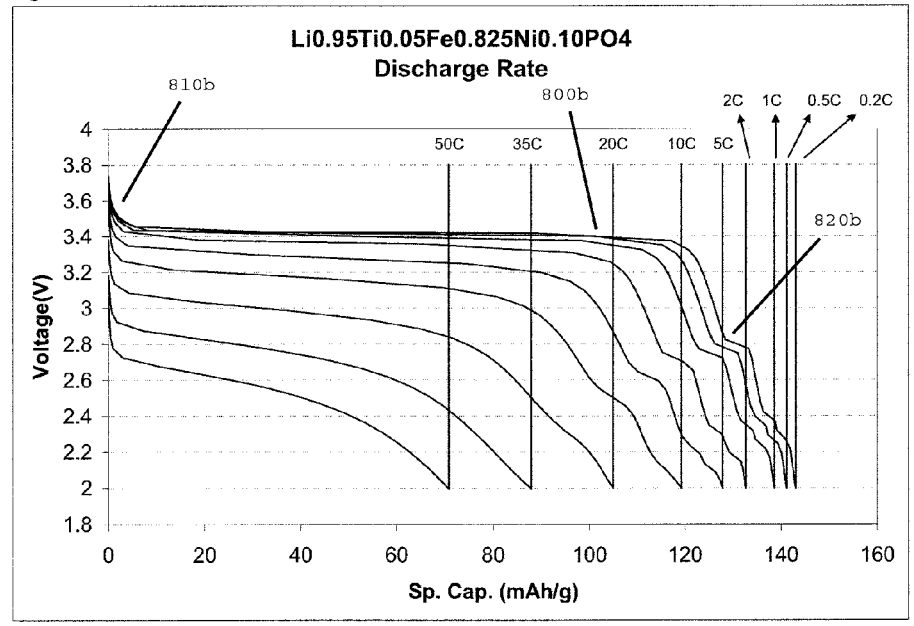
Figure 8C:
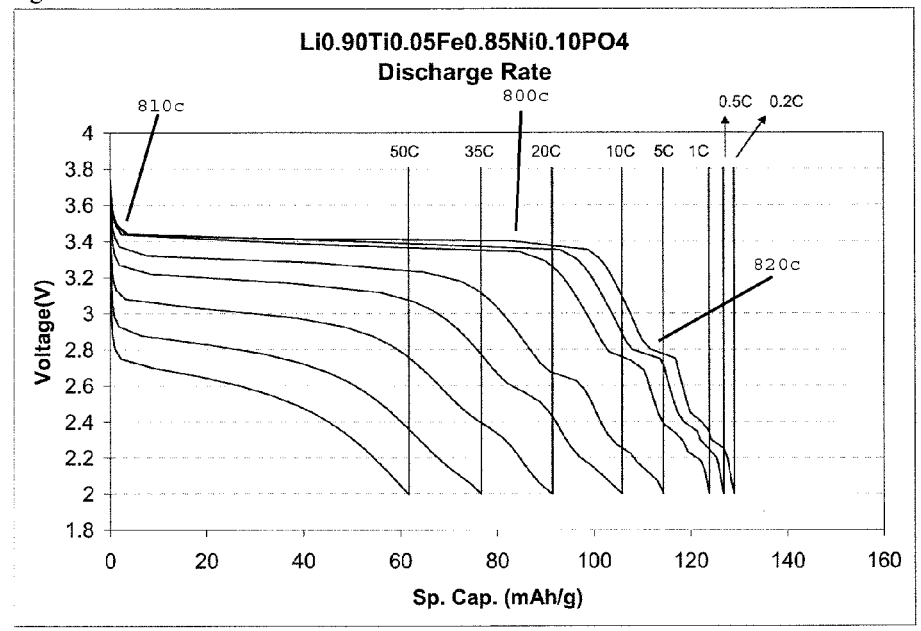
Figure 8D:
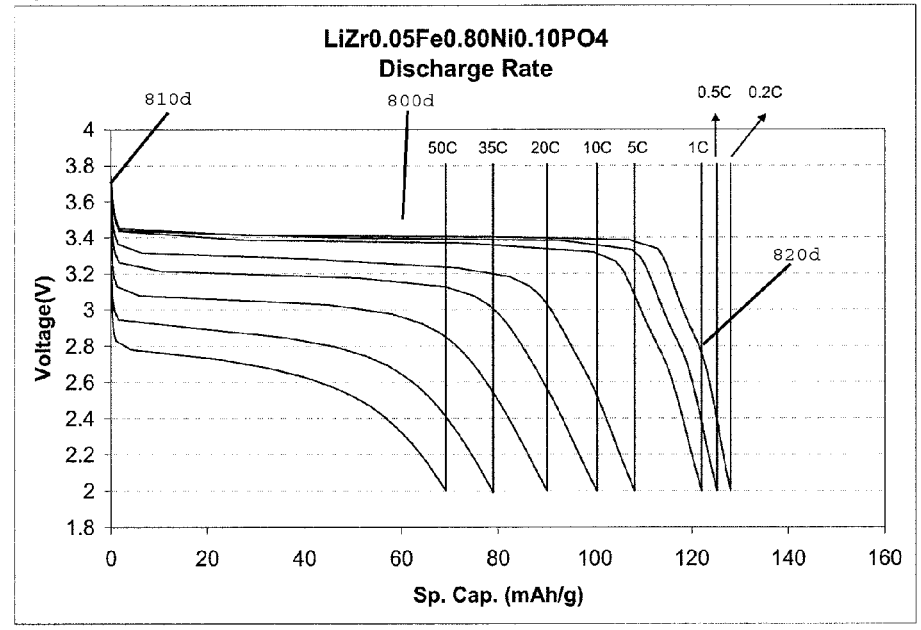

Materials having compositions $LiTi_{0.05}Fe_{0.80}Ni_{0.10}PO_4$, $Li_{0.95}Ti_{0.05}Fe_{0.825}Ni_{0.10}PO_4$, $Li_{0.90}Ti_{0.05}Fe_{0.85}Ni_{0.10}PO_4$, and $LiZr_{0.05}Fe_{0.80}Ni_{0.10}PO_4$ were prepared. The specific surface areas of the powders as analyzed by the BET method were 43.4, 44.8, 44.0, and 41.6 $m^2/g$ respectively. FIG. 7 shows that each of these compositions provided excellent capacity at high discharge current rates. In FIG. 7, the first data point at low rate for each curve represents the first charge capacity while the others are discharge capacities. FIGS. 8A-8D show that the lower voltage steps 820a, 820b, 820c, 820d (represented by an inflection point for 820d) for these Ti- and Zr-containing mixed metal phosphates were prominent, therefore demonstrating that these compounds provide for SOC indication at lower states of charge (i.e., approaching the discharge limit of the cell), at rates as high as 20 C. High voltage curve rises 810a, 810b, 810c, 810d and plateaus 800a, 800b, 800c, 800d associated with the primary electroactive material were also observed.

Example 5

Synthesis of Compositions with High and Low Voltage Indicators

This example illustrates phosphate compositions prepared and tested vs. lithium metal negative electrodes according to the method of Examples 1-4, and which exhibit both an upper voltage indicator due to the addition of cobalt, and a lower voltage step introduced by the use of certain dopants, useful as state of discharge (SOD) indicators or overdischarge protection. In each case 10% by mole of Co was added to the composition in order to limit the state of charge to about 90% for an upper voltage limit below about 4.8V (measured with respect to a lithium metal negative electrode).

Figure 9:
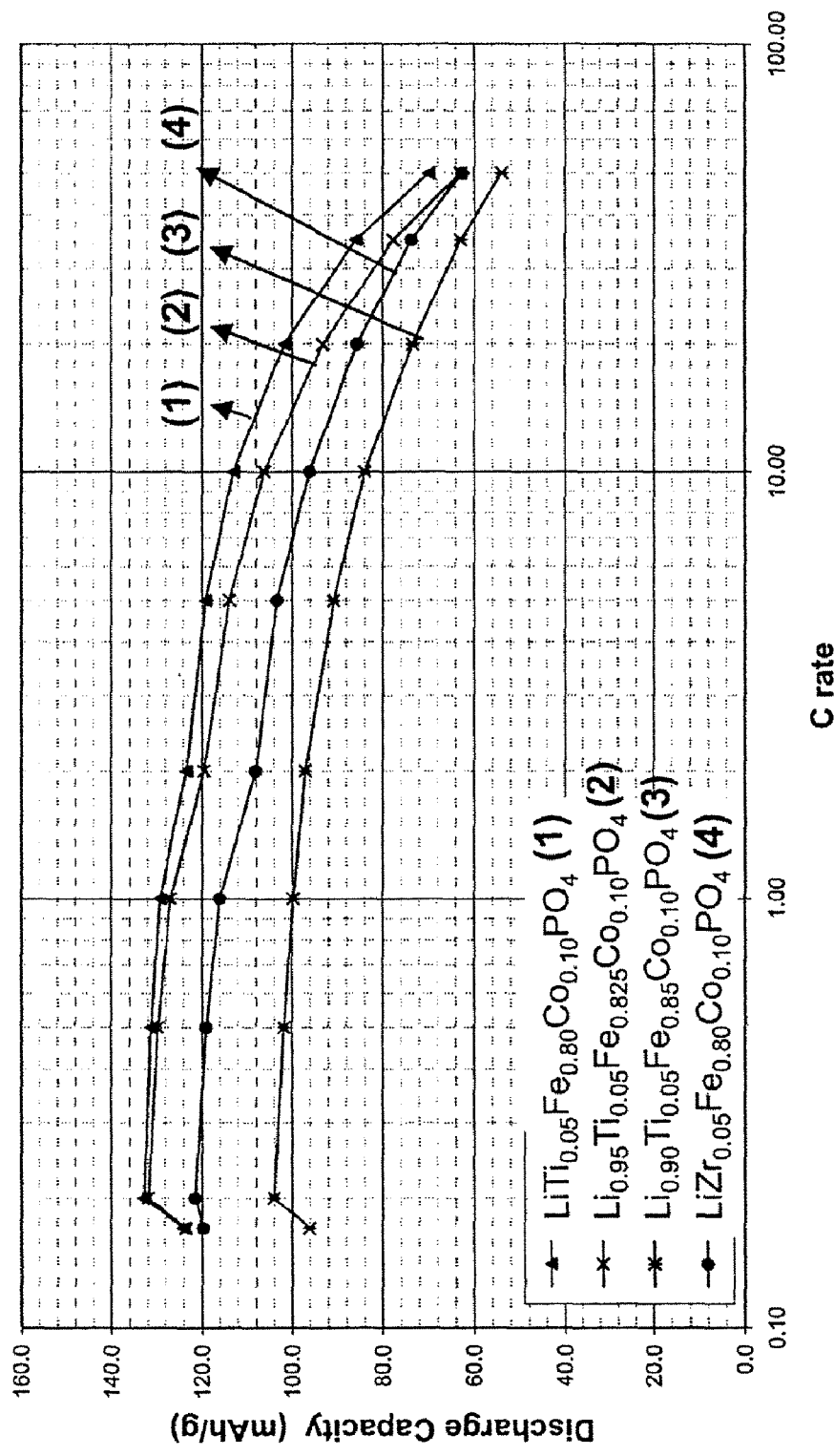
FIG. 9 is a plot of discharge capacity (mAh/g) vs. C-rate for Ti- or Zr-containing mixed metal phosphate cells.
Figure 10A:
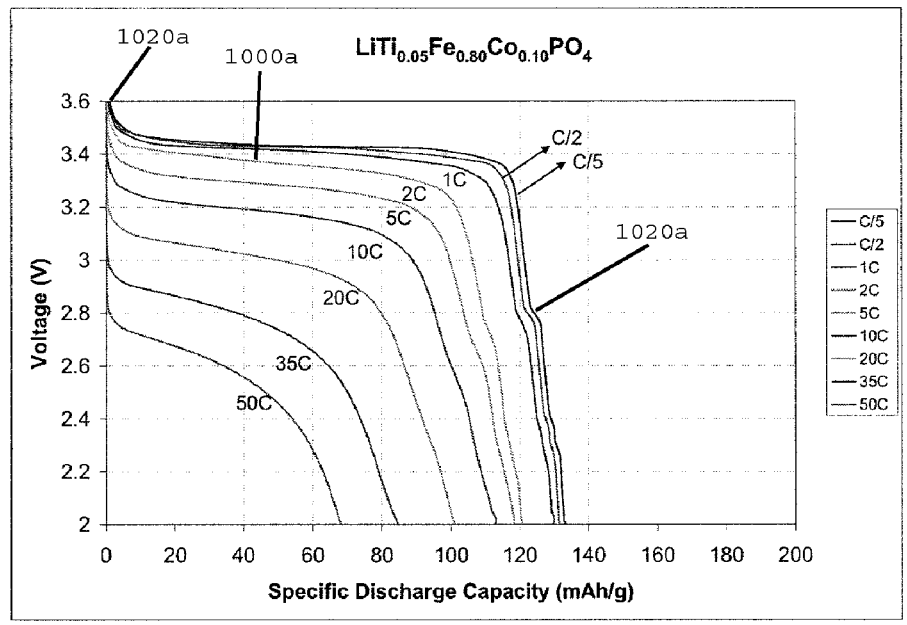
FIGS. 10A-10D are plots of voltage vs. discharge capacity (mAh/g) for cells with (10A) $LiTi_{0.05}Fe_{0.80}Co_{0.10}PO_4$, (10B) $LiZr_{0.05}Fe_{0.80}Co_{0.10}PO_4$, (10C) $Li_{0.90}Ti_{0.05}Fe_{0.85}Co_{0.10}PO_4$, and (10D) $Li_{0.95}Ti_{0.05}Fe_{0.825}Co_{0.10}PO_4$.
Figure 10B:
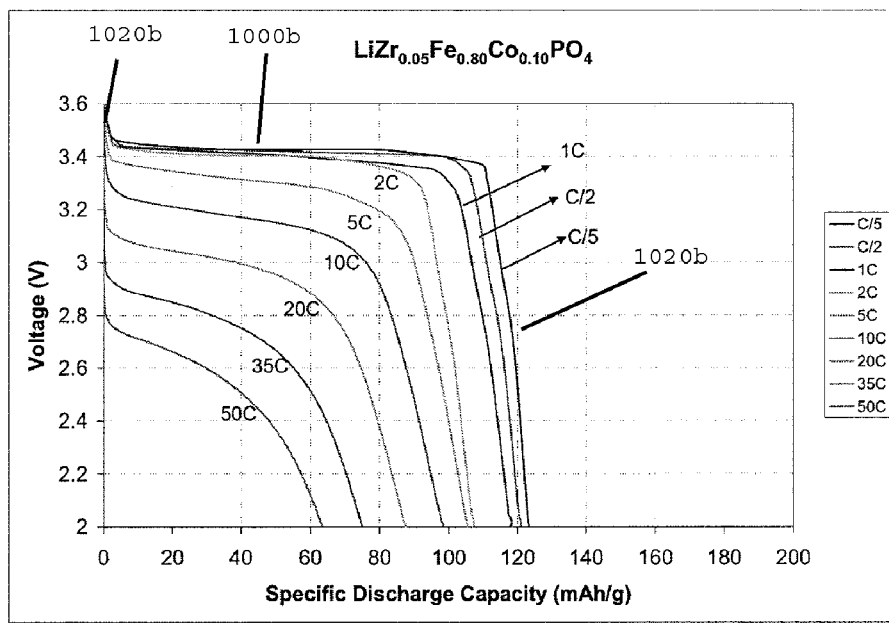
Figure 10C:
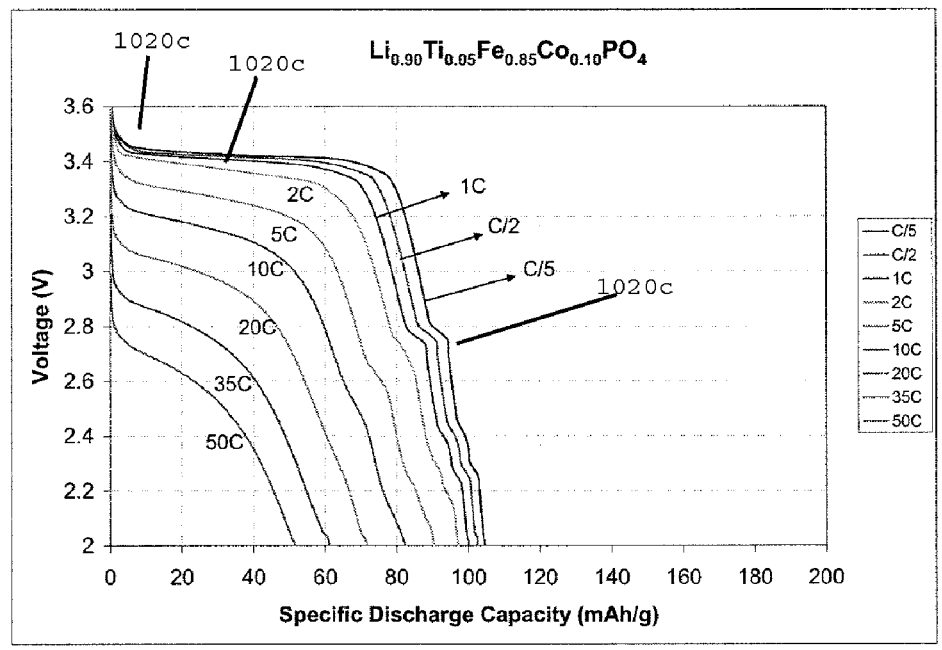
Figure 10D:
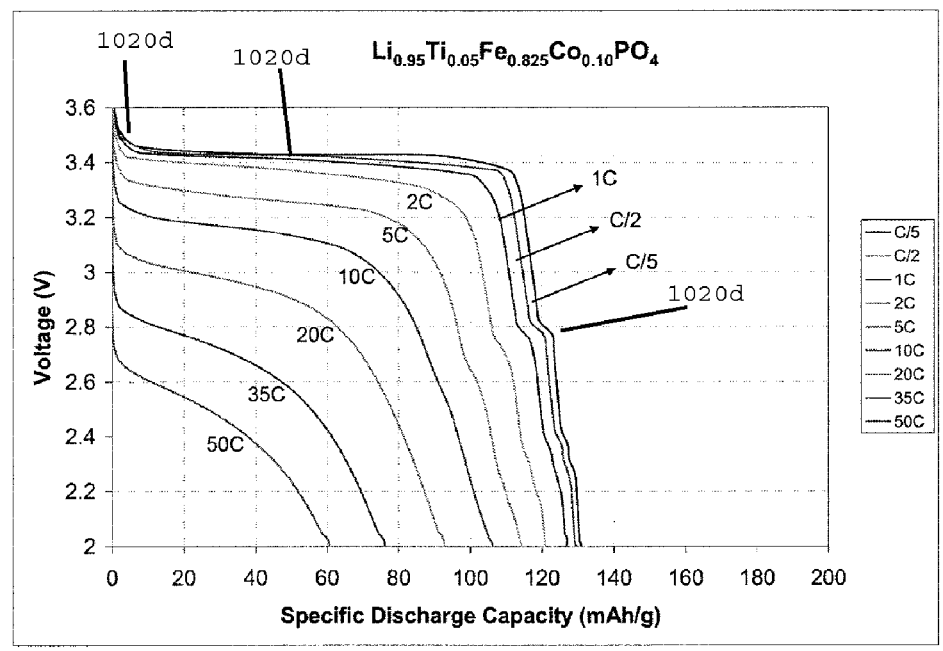

Materials having compositions $LiTi_{0.05}Fe_{0.80}Co_{0.10}PO_4$, $Li_{0.95}Ti_{0.05}Fe_{0.825}Co_{0.10}PO_4$, $Li_{0.90}Ti_{0.10}Fe_{0.85}Co_{0.10}PO_4$, and $LiZr_{0.05}Fe_{0.80}Co_{0.10}PO_4$ were prepared. The specific surface areas of the powders as analyzed by the BET method were 34.6, 40.6, 39.8 and 38.4 $m^2/g$ respectively. FIG. 9 shows that each of these compositions provided excellent capacity at high discharge current rates. In FIG. 9, the first data point at low rate for each curve represents the first charge capacity while the others are discharge capacities. FIGS. 1A-10D show that the lower voltage steps 1020a, 1020b, 1020c, 1020d were prominent, therefore providing SOD indication, at rates as high as 20 C. High voltage curve rises 1010a, 1010b, 1010c, 1010d and plateaus 1000a, 1000b, 1000c, 1000d associated with the primary electroactive material were also observed.

Example 6

Synthesis of Compositions with Low Voltage Indicators

This example illustrates phosphate compositions prepared and tested vs. lithium metal negative electrodes according to the method of Examples 1-5, and which exhibit a lower voltage step introduced by the use of certain dopants, useful as SOD indicators or overdischarge protection. The compositions $LiMg_{0.05}FePO_4$, $LiZr_{0.05}Fe_{0.90}PO_4$, $LiTi_{0.05}Fe_{0.90}PO_4$, $Li_{0.95}Ti_{0.05}Fe_{0.925}PO_4$, and $Li_{0.90}Ti_{0.05}Fe_{0.95}PO_4$ were made and tested. The specific surface areas of these samples as measured by the BET method were, respectively, 36.2, 36.6, 38.0, 37.6, and 37.6 $m^2/g$. X-ray diffraction, presented in FIGS. 12A-12H, showed that each of these compositions was essentially a single-phase olivine, with the exception of the Zr-doped sample, which contained zirconium phosphate as a secondary phase. FIGS. 13A-13E (in which the three curves in each figure show results from 3 nominally identical assembled cells) show that each of these compositions provided excellent capacity at high discharge current rates. In FIGS. 13A-13E, the first data point at low rate for each curve represents the first charge capacity while the others are discharge capacities. FIGS. 14A-14E show charge-discharge curves measured at C/50 current rate and 25° C. for these compositions, respectively. It is seen that each composition provided a voltage curve with capacity at a lower voltage step which can be used for SOD indication or overdischarge protection. Note that the capacity measured on the lower voltage step in FIG. 14E in particular is a large fraction of the total capacity, well in excess of any detectable amount of secondary phase in the sample. This demonstrates that, according to certain embodiments herein, a solid solution olivine composition provides the low voltage capacity, or that electrochemical cycling produces in-situ a phase having capacity at the lower voltage.

Example 7

Figure 15A:
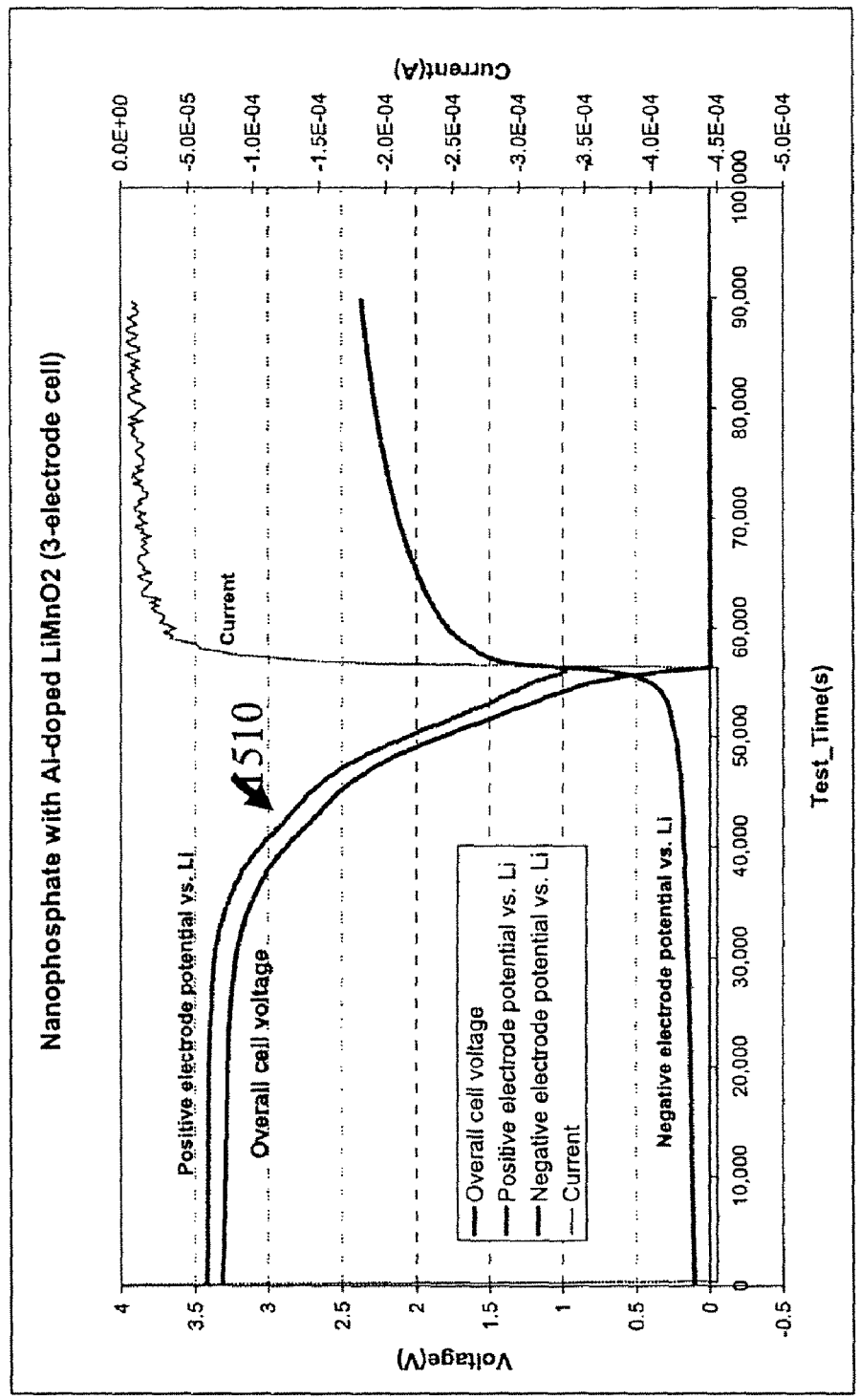
FIGS. 15A-15B are plots of overall cell voltage, positive electrode potential, and negative electrode potential of a 3-electrode cell, shown on two different time scales. The positive electrode was a physical mixture of nanoscale $Li_{0.99}Nb_{0.01}FePO_4$ and Al-doped $LiMnO_2$. The negative electrode was carbon (mesocarbon microbeads, MCMB), and the reference electrode was Li metal.
Figure 15B:
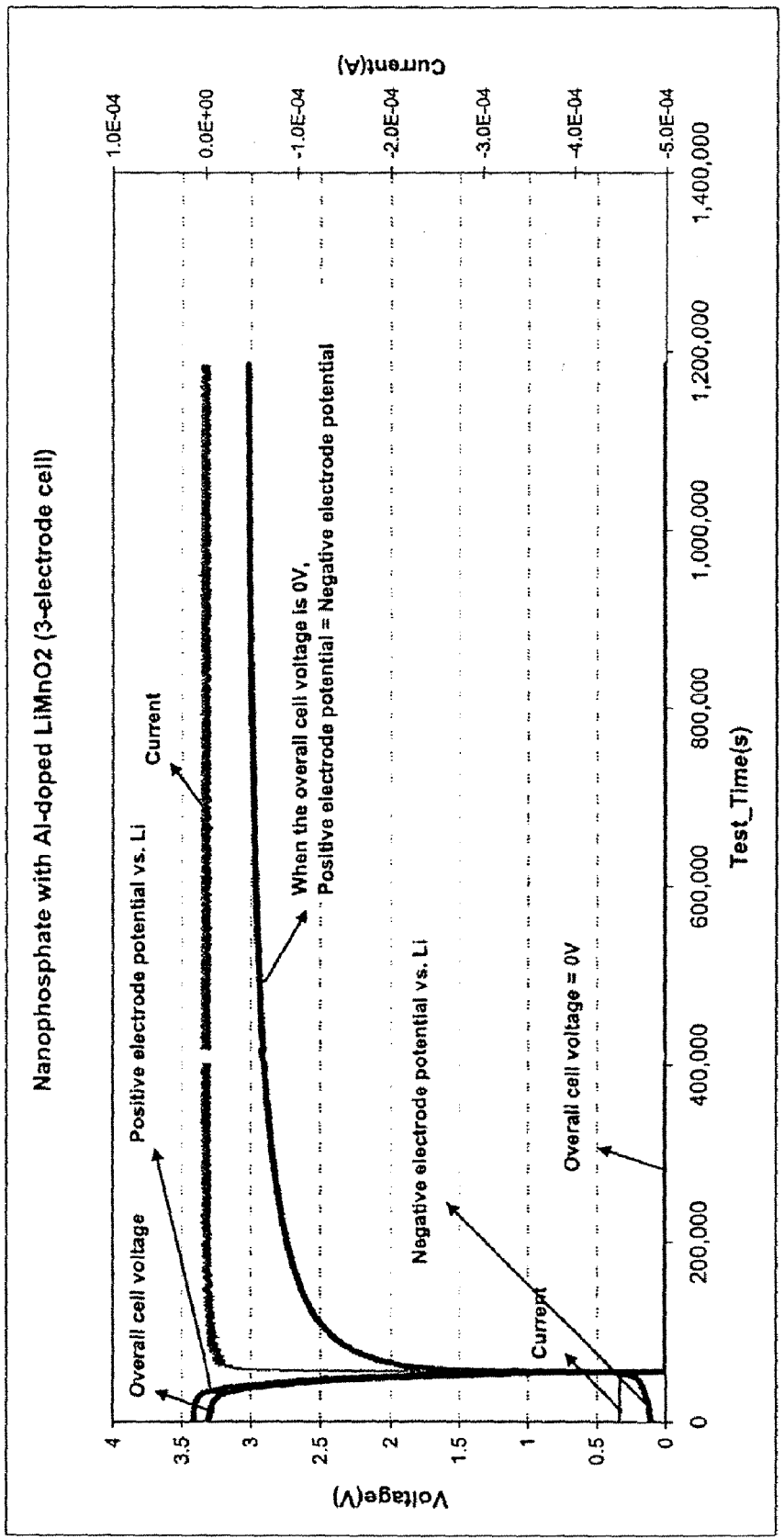

Physical Mixture of Nanoscale $Li_{0.99}Nb_{0.01}FePO_4$ and Low OCV Secondary Positive Electrode Materials This example illustrates a physical mixture of nanoscale $Li_{0.99}Nb_{0.01}FePO_4$ and lower voltage secondary positive electrode materials. The mixture exhibits a lower voltage step below 3.3V due to lithium insertion into the low voltage materials, which is useful as an overdischarge protection, e.g., protection against dissolution of a copper negative electrode current collector upon overdischarge or short-circuiting of a cell. A mixture of nanoscale $Li_{0.99}Nb_{0.01}FePO_4$ and Al-doped $LiMnO_2$ ($LiAl_{0.05}Mn_{0.95}O_2$) was made and tested as the positive electrode in 3-electrode lithium ion pouch cells. Lithium metal was used as the reference electrode, and MCMB carbon as the negative electrode. FIG. 15A shows the voltage profiles of the pouch cells. A kink in the cathode potential curve at about 3.0V (1510) was evidence of lithium insertion into Al-doped $LiMnO_2$ ($LiAl_{0.05}Mn_{0.95}O_2$) during discharge. When the cell was discharged to and kept at 0V, the negative electrode potential rose slowly to 3.0V (see FIG. 15B), which is the equilibrium redox potential of Al-doped $LiMnO_2$ ($LiAl_{0.05}Mn_{0.95}O_2$) after transformation to spinel $Li_xMn_2O_4$ (1<x<2). As the negative electrode potential measured with respect to $Li/Li^+$ stayed at 3.0V, dissolution of the copper negative current collector does not occur.

Figure 16:
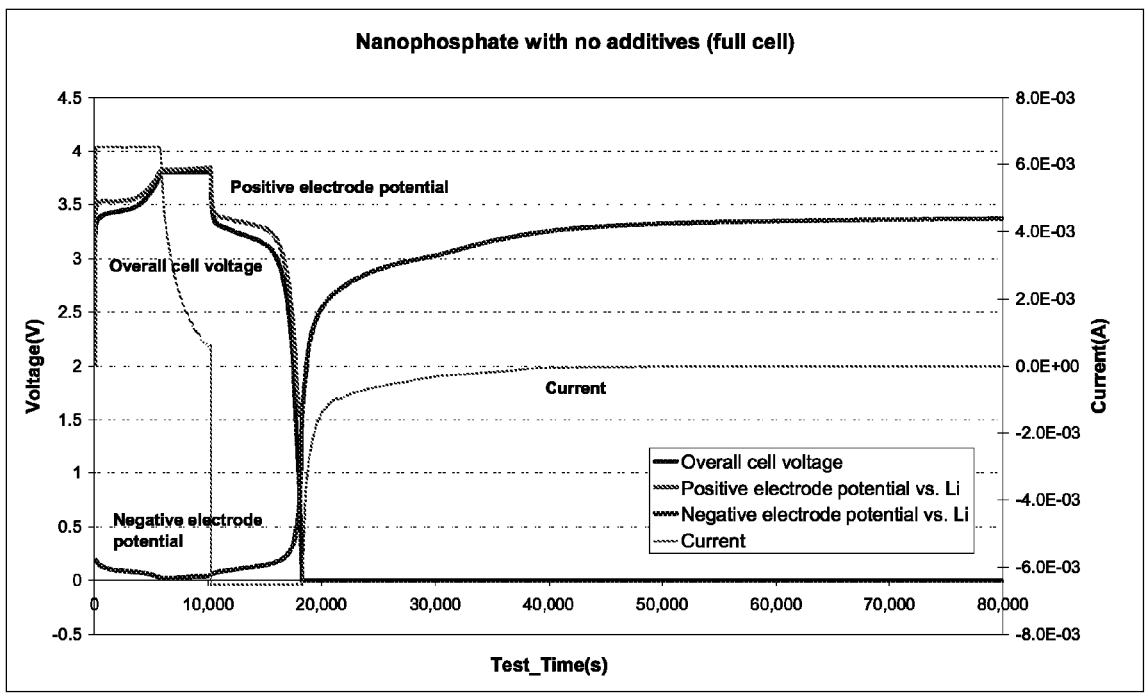
FIG. 16 is a plot of overall cell voltage, positive electrode potential, and negative electrode potential of a 3-electrode cell. The positive electrode was nanoscale $Li_{0.99}Nb_{0.01}FePO_4$ and the negative electrode was carbon (MCMB). Li metal was used as the reference electrode.

This behavior contrasts with the nanoscale $Li_{0.99}Nb_{0.01}FePO_4$ cathode with no secondary active materials (FIG. 16). The sample of FIG. 16 was a 3-electrode lithium ion pouch cell. The cathode was a mixture of nanoscale $Li_{0.99}Nb_{0.01}FePO_4$, made according to the method described in Example 1, and the anode was carbon (MCMB). Lithium metal was used as the reference electrode to measure the cathode and anode potentials with respect to Li/Li. FIG. 16 shows that at 0V, the negative electrode potential rose to 3.4V, which is the approximate OCV of a partially delithiated nanoscale $Li_{0.99}Nb_{0.01}FePO_4$ cathode. As the negative electrode potential is above the dissolution potential of copper negative current collector, dissolution of the copper negative current collector can occur in overdischarged cells. It should be noted that at the end of discharge of the cell, the nanoscale $Li_{0.99}Nb_{0.01}FePO_4$ cathode remains partially delithiated due to lithium loss, e.g. by formation of solid electrolyte interphase (SEI) layer during the first charge.

The match of positive and negative electrode capacities allows the lower voltage material to function as an overdischarge protection additive. The positive and negative electrode capacities are matched so that, after insertion into nanoscale $Li_{0.99}Nb_{0.01}FePO_4$ is completed, lithium is still available for insertion into the lower voltage positive electrode additive material. Otherwise, lithium insertion into the lower voltage material does not occur, and the individual electrode potentials will not be fixed at a value providing overdischarge protection.

Figure 17:
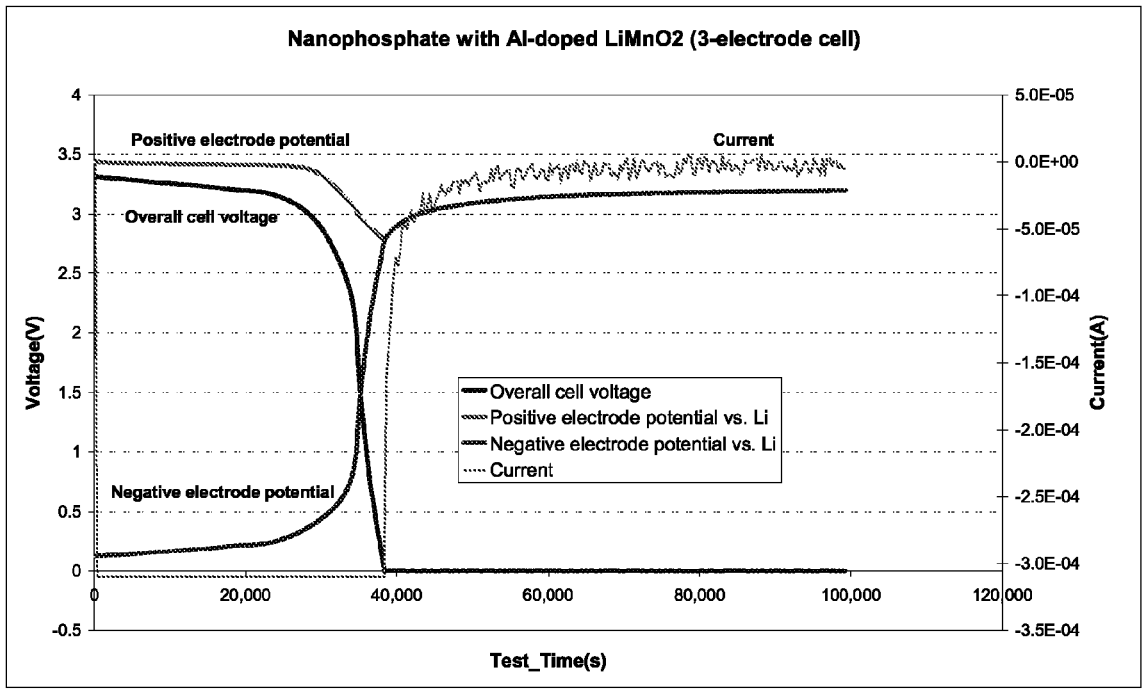
FIG. 17 is a plot of overall cell voltage, positive electrode potential, and negative electrode potential of a 3-electrode cell. The positive electrode was a physical mixture of nanoscale $Li_{0.99}Nb_{0.01}FePO_4$ and Al-doped $LiMnO_2$. The negative electrode was carbon (MCMB), and the reference electrode was Li metal. The positive and negative electrode capacities were poorly matched.

FIG. 17 shows the potential profiles of 3-electrode lithium ion pouch cells with a positive electrode made of a mixture of nanoscale $Li_{0.99}Nb_{0.01}FePO_4$ and Al-doped $LiMnO_2$ ($LiAl_{0.05}Mn_{0.95}O_2$). The materials of FIG. 17 were 3-electrode lithium ion pouch cells. The cathode was a mixture of nanoscale $Li_{0.99}Nb_{0.01}FePO_4$ doped with $LiMnO_2$ ($LiAl_{0.05}Mn_{0.95}O_2$), made according to the method described in Example 1, and the anode was carbon (MCMB). Lithium metal was used as the reference electrode. The ratio of cathode and anode capacities was deliberately selected to be less than 1, so that no lithium is available for insertion into Al-doped $LiMnO_2$ under overdischarge condition. The cell has a positive to negative electrode capacity ratio such that little lithium is available for insertion into Al-doped $LiMnO_2$ ($LiAl_{0.05}Mn_{0.95}O_2$). A kink in cathode potential at 3V was not observed. At 0V, the anode potential rose to 3.2V. While the anode potential is still lower than the copper dissolution potential (3.3V), it is higher than for FIG. 15B.

The composition of the Al-doped $LiMnO_2$ specified in Example 7 ($LiAl_{0.05}Mn_{0.95}O_2$) is a non-limiting example of Al-doped $LiMnO_2$ that can be used as a positive electrode additive for overdischarge protection. Jang et al., *Solid State Ionics* 130:53-59 (2000) showed that Al-doped $LiMnO_2$ ($LiAl_xMn_{1-x}O_2$) exists as a single phase in the orthorhombic structure for $0 \leq x < 0.05$ under certain synthesis conditions (for example, at temperature of 950° C. and oxygen partial pressure of $10^{-10}$ atm). Here, x=0 corresponds to $LiMnO_2$ without Al doping. The monoclinic structure becomes stable over the orthorhombic structure for $x \geq 0.05$.

Both the orthorhombic and monoclinic polymorphs of Al-doped $LiMnO_2$ or undoped $LiMnO_2$ irreversibly transform to $Li_yMn_2O_4$ spinel-like structures upon extraction of lithium, and have an OCV of about 3.0V in the composition range of 1<y<2. Furthermore, the initial charge capacity of Al-doped $LiMnO_2$ (and $LiMnO_2$ without Al doping) can be nearly completely recovered by repeated cycling, which renders the irreversible capacity loss (that is, loss of lithium to the negative electrode) less than 5%. For example, Jang et al., *J. Electrochem. Soc.* 146:3217-3223 (1999) showed that $LiMnO_2$ without Al doping delivers discharge capacity that is 95% of the theoretical capacity of $LiMnO_2$, indicating that the irreversible capacity loss of this material is less than 5%.

Therefore, both the orthorhombic and monoclinic polymorphs of Al-doped $LiMnO_2$ can be used as a positive electrode additive for overdischarge protection. The Al content (x) of Al-doped $LiMnO_2$ ($LiAl_xMn_{1-x}O_2$) can be either $0 \leq x < 0.05$ (including $LiMnO_2$ without Al doping) or $x \geq 0.05$ for this compound to function as an overdischarge protection additive, and the Al content is not limited to $0.05 \leq x \leq 0.50$.

Example 8

Synthesis of $Li_3Ti(PO_4)_3$ by Chemical Lithiation

This example illustrates the synthesis of low OCV additive materials (to be added to the positive or negative electrode) in a lithiated state by chemical lithiation of delithiated forms. Chemical lithiation can be performed using a lithium source as the reducing agent, for example n-butyllithium diluted with hexane. The reaction is maintained under constant stirring at ambient or elevated temperature in inert atmosphere. The lithiated products are then washed with hexane before drying, for example in vacuum.

Figure 18:
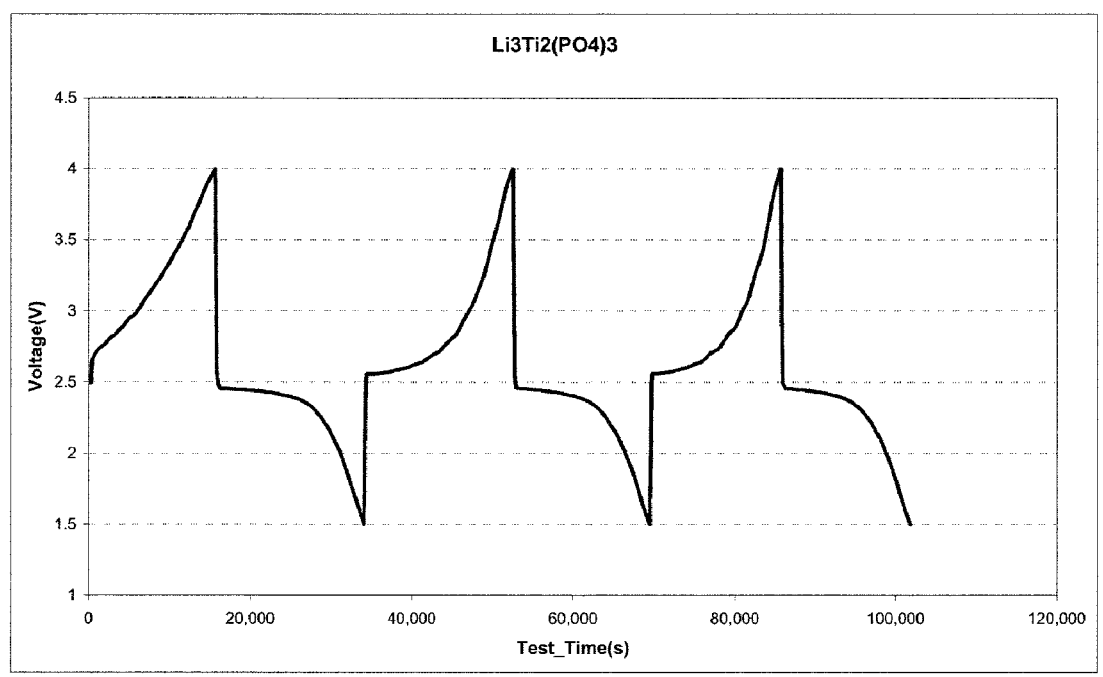
FIG. 18 is a plot of charge-discharge curves of $Li_3Ti_2(PO_4)_3$ prepared by chemical lithiation of $LiTi_2(PO_4)_3$ using n-butyllithium.

$Li_3Ti_2(PO_4)_3$ is an example of an additive material synthesized by chemical lithiation of less lithiated forms. In this example, $LiTi_2(PO4)_3$ was synthesized by a solid state reaction of $Li_2CO_3$, $TiO_2$ (anatase), and $NH_4H_2PO_4$ at 800° C. in air. A NASICON compound $LiTi_2(PO_4)_3$ was obtained, which does not have extractable Li with the Ti in the 4+ state. Chemical lithiation of $LiTi_2(PO_4)_3$ using n-butyllithium (1.6M) diluted in hexane at ambient temperature produced a lithiated NASICON compound $Li_3Ti_2(PO_4)_3$. The lithiated NASICON compound has extractable Li as the Ti is in the 3+ state. FIG. 18 shows the charge-discharge curves of $Li_3Ti_2(PO_4)_3$ during the first 3 cycles in a Li half cell. The presence of initial charge capacity indicates that the chemically lithiated NASICON phase had extractable Li. The theoretical capacity of $Li_3Ti_2(PO_4)_3$ is 134 mAh/g at about 2.5V, which is useful for both lower-voltage indication and overdischarge protection.

Example 9

Synthesis of $Li_7Ti_5O_{12}$ by Chemical Lithiation

This prophetic example also illustrates the synthesis of low OCV additive materials (to be added to the positive or negative electrode) in a lithiated state by chemical lithiation of delithiated forms. As above, chemical lithiation can be performed using a lithium source as the reducing agent, for example n-butyllithium diluted with hexane. The reaction is maintained under constant stirring at ambient or elevated temperature in inert atmosphere. The lithiated products are then washed with hexane before drying, for example in vacuum.

Lithiated spinel $Li_7Ti_5O_{12}$ is synthesized by chemical lithiation of a less lithiated form using n-butyllithium diluted in hexane. The spinel compound $Li_4Ti_5O_{12}$ is usually prepared in a form that does not have extractable Li with the Ti in the 4+ state, but the chemically lithiated spinel $Li_7Ti_5O_{12}$ has extractable Li with the Ti in the 3+/4+ state. The theoretical capacity of $Li_7Ti_5O_{12}$ is 168 mAh/g at 1.5V with regard to Li/Li+. With the OCV of 1.5V, $Li_7Ti_5O_{12}$ is useful for both lower-voltage indication and overdischarge protection.

Example 10

Synthesis of Low OCV Additive Materials in a Lithiated State by Solid State Lithiation This prophetic example illustrates the synthesis of low OCV additive materials (to be added to the positive or negative electrode) in a lithiated state by solid state lithiation of less lithiated forms. Solid state lithiation is performed by solid state reaction of the less lithiated compound with a lithium source at a high temperature in a controlled atmosphere. For example, the lithiated (tetragonal) lithium manganese spinel $Li_2Mn_2O_4$ can be synthesized by the solid state reaction of the cubic spinel $LiMn_2O_4$ with a lithium salt such as $Li_2O$ or $Li_2CO_3$ in a reducing atmosphere. Here the starting spinel $LiMn_2O_4$ is used as a seeding compound to obtain the tetragonal spinel rather than the orthorhombic or monoclinic polymorphs of $LiMnO_2$. The procedures to synthesize the $Li_2Mn_2O_4$ compound are the following. First, the spinel compound $LiMn_2O_4$ is mixed with $Li_2CO_3$ or $Li_2O$ in a desired ratio, including but not limited to the stoichiometric proportion ($LiMn_2O_4$:$Li_2CO_3$ or $Li_2O$=2:1) by ball-milling. Second, heat treatment of the mixed powder is performed at 700-900° C. in inert (nitrogen or argon) or reducing atmosphere (oxygen partial pressure of $10^{-4}$ to $10^{-8}$ atm) for 2-20 hours. The $Li_2Mn_2O_4$ phase can also be prepared by solid state reaction of a manganese salt such as $MnCO_3$ or manganese oxides such as MnO or $Mn_3O_4$. A specific condition to obtain $Li_2Mn_2O_4$ is $MnCO_3$:$Li_2CO_3$=1:0.05-0.17, heat treatment at 850° C. in nitrogen atmosphere for 16 hours.

Example 11A

Synthesis of $Li_2FeSiO_4$ for Low OCV Electrode Additive Material

Figure 26:
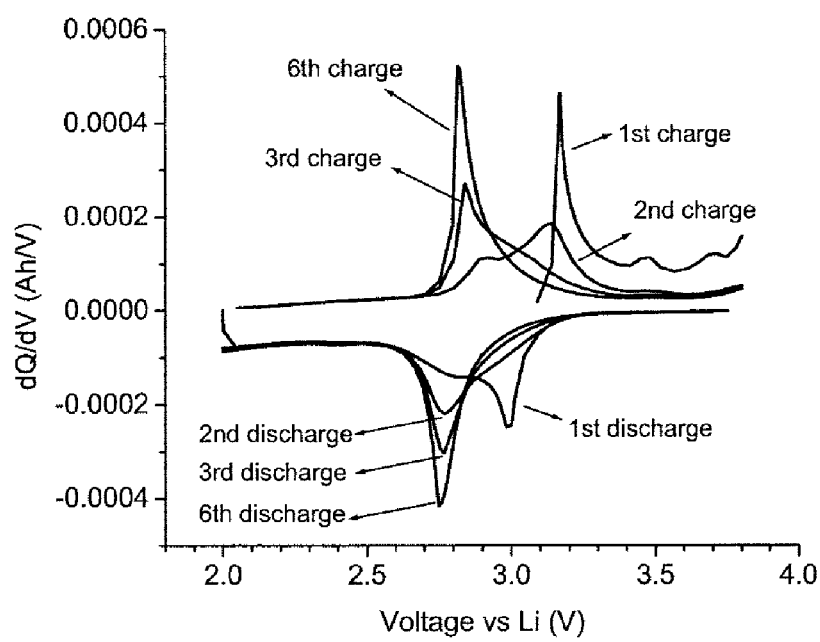
FIG. 26 is a plot of differential capacity (Ah/V) of $Li_2FeSiO_4$ in Li half cells during the first 6 cycles at 60° C.

This example illustrates the synthesis of low OCV additive materials in a lithiated state by solid state reaction. $Li_2FeSiO_4$ is an example of additive materials synthesized by solid state reaction. In this example, $Li_2FeSiO_4$ was synthesized by a solid state reaction of $Li_2SiO_3$ and $FeC_2O_4 \cdot 2H_2O$ at 700° C. in inert atmosphere (Ar). FIG. 26 shows the differential capacity plots of $Li_2FeSiO_4$ in Li half cells during the first 6 cycles at 60° C. A peak in the differential capacity plot corresponds to a plateau in voltage vs. time curve. The initial charge occurs mainly at 3.16V vs. Li. After the initial two cycles, the charge and discharge potentials are 2.81 and 2.76V vs. Li, respectively.

$Li_2FeSiO_4$ is useful as a positive or negative electrode additive. A positive electrode additive for overdischarge protection has extractable Li in the as-synthesized form, with a redox potential lower than the dissolution potential of a negative electrode current collector. A negative electrode additive for overdischarge protection has these characteristics and also has a delithiation potential that is lower than the positive electrode potential. Otherwise, delithiation of the additive does not occur under overdischarge conditions down to 0V. For example, in the case of a $Li_{0.99}Nb_{0.01}FePO_4$ positive electrode, the delithiation potential of the negative electrode additive is lower than 3.4V vs. Li. $Li_2FeSiO_4$ is an example of a material that provides the aforementioned characteristics of both positive and negative electrode additives for overdischarge protection.

Example 11B $Li_2FeSiO_4$ as Low OCV Negative Electrode Additive Material

A prophetic example illustrates utilization of $Li_2FeSiO_4$ as a negative electrode additive. In this example, a mixture of carbon (MCMB) and $Li_7Ti_5O_{12}$ is used as the negative electrode, and $LiFePO_4$ or nanoscale $Li_{0.99}Nb_{0.01}FePO_4$ as the positive electrode. Under normal discharge conditions, the $Li_2FeSiO_4$ phase does not participate in Li insertion and extraction in the negative electrode. However, upon overdischarge, the Li that is extracted from the $Li_2FeSiO_4$ completely lithiates the $LiFePO_4$ positive electrode. When the cell is discharged to and kept at 0V, the negative electrode potential stays at 2.8V, which is the OCV of $Li_{2-x}FeSiO_4$.

In some instances, using an overdischarge protection additive at the negative electrode as opposed to the positive electrode provides certain advantages. These are made apparent by comparing the operation of a cell in which the same compound, for example $Li_2FeSiO_4$, is added to the positive versus the negative electrode. When the compound is added to the positive electrode, it is delithiated upon charging. It is added in a quantity that provides a capacity in excess of the irreversible capacity of the cell, so that during discharge it is possible to discharge the cell down to the lower voltage capacity of the additive. During initial cycling of the lithium ion cell, lithium is irreversibly consumed by SEI formation and other side reactions. Often this irreversible capacity is in the range of 5% to 20% of the total cell capacity. The amount of overdischarge additive is sufficient to provide at least this capacity, and as such can detract from the energy density of the cell.

In contrast, the same overdischarge additive, when added to the negative electrode, is not utilized until the cell is overdischarged. Upon first charging of the cell, the additive compound remains lithiated, and the lithium consumed by irreversible capacity loss comes from the positive electrode. If the cell is not overdischarged, lithium is reversibly cycled between the positive and negative electrode active compounds only. Only when the cell is overdischarged is the additive compound delithiated. When this occurs, the delithiated additive compound then pins the potential at the negative electrode at a low enough value to prevent negative current collector dissolution. The amount of additive determines the duration of overdischarge protection. When the additive is fully delithiated, the negative electrode potential rises beyond the redox potential of the additive. If the complete delithiation of additive occurs before the positive electrode potential drops below the dissolution potential of the negative electrode current collector, the negative electrode potential will rise above the dissolution potential of the negative current collector. Therefore, the additive could be included in a quantity that provides a capacity in excess of the irreversible capacity of the cell if the cell were to be stored in overdischarged state for an extended period of time. However, in practice, the amount of negative electrode additive can be much less to provide a limited duration of overdischarge protection. The duration of overdischarge protection can be tailored by the amount of additive. For example, the amount of additive can be a quantity that provides lithium equal to between 0.1% to 10% of the capacity of the cell.

Example 12

Physical Mixture of Carbon and Negative Electrode Additive Materials

This prophetic example illustrates a physical mixture of carbon and a negative electrode additive material that has an OCV less than 3.3V vs. Li for overdischarge protection. For example, lithiated spinel $Li_7Ti_5O_{12}$ synthesized by chemical lithiation of $Li_4Ti_5O_{12}$ can be utilized to practice this example. The redox potential of $Li_7Ti_5O_{12}$ is 1.5V vs. Li, useful for overdischarge protection. A mixture of carbon (MCMB) and $Li_7Ti_5O_{12}$ is used as the negative electrode, and $LiFePO_4$ or nanoscale $Li_{0.99}Nb_{0.01}FePO_4$ as the positive electrode. Under normal discharge conditions, the $Li_7Ti_5O_{12}$ phase does not participate in Li insertion and extraction in the anode. However, upon overdischarge, the Li that is extracted from the $Li_7Ti_5O_{12}$ completely lithiates the $LiFePO_4$ positive electrode. When the cell is discharged to and kept at 0V, the negative electrode potential stays at 1.5V, which is the OCV of $Li_{4+x}Ti_4O_{12}$.

The matching of positive and negative electrode capacities allows the negative electrode additive to function as an overdischarge protection agent. The positive and negative electrode capacities are matched so that, after the lithium is fully extracted from carbon during discharge, the lithium extractable from the additive can fully lithiate the positive electrode. When the positive electrode is fully lithiated while the negative electrode additive remains partially lithiated under the overdischarge condition, the negative electrode potential stays at the OCV of the additive compound $Li_{4+x}Ti_5O_{12}$. As the OCV is 1.5V, below the dissolution potential of the copper negative current collector (3.3V), overdischarge protection is achieved. If the lithium extractable from the additive does not fully lithiate the positive electrode under the overdischarge condition, the additive will eventually be completely delithiated while the positive electrode remains partially delithiated. In such case, the negative electrode potential rises to the OCV of the positive electrode material, which is above 3.3V, and the dissolution of copper negative current collector can occur.

Example 13

Nanoscale $Li_{1-x}Co_zFe_{1-z}PO_4$ with Extended Lithium Solid Solution

Figure 19:
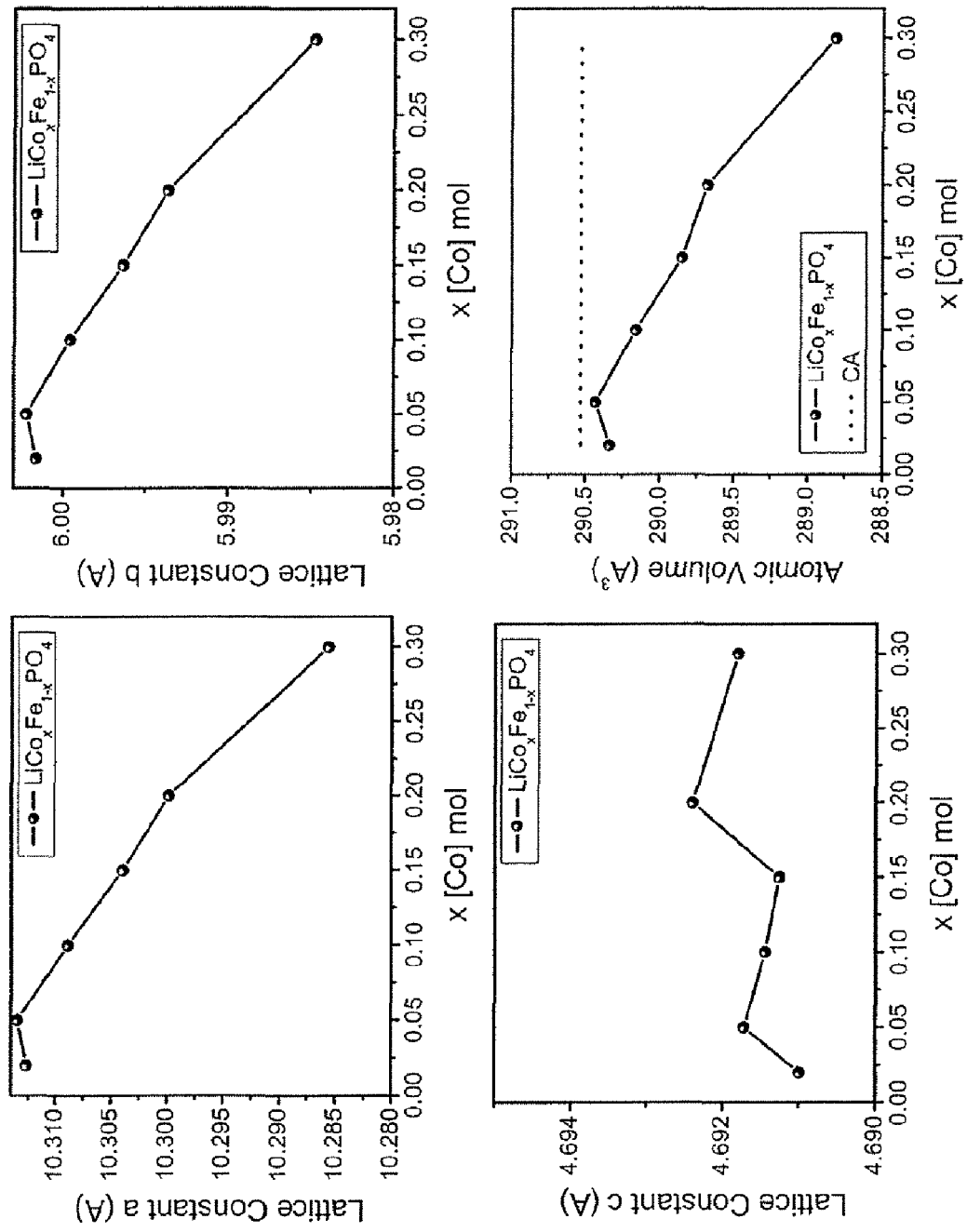
FIG. 19 shows plots of unit cell parameters of the starting olivine phase obtained by Rietveld refinement for nanoscale $Li_{1-x}Co_zFe_{1-z}PO_4$ compositions prepared as described in Example 13.
Figure 20A:
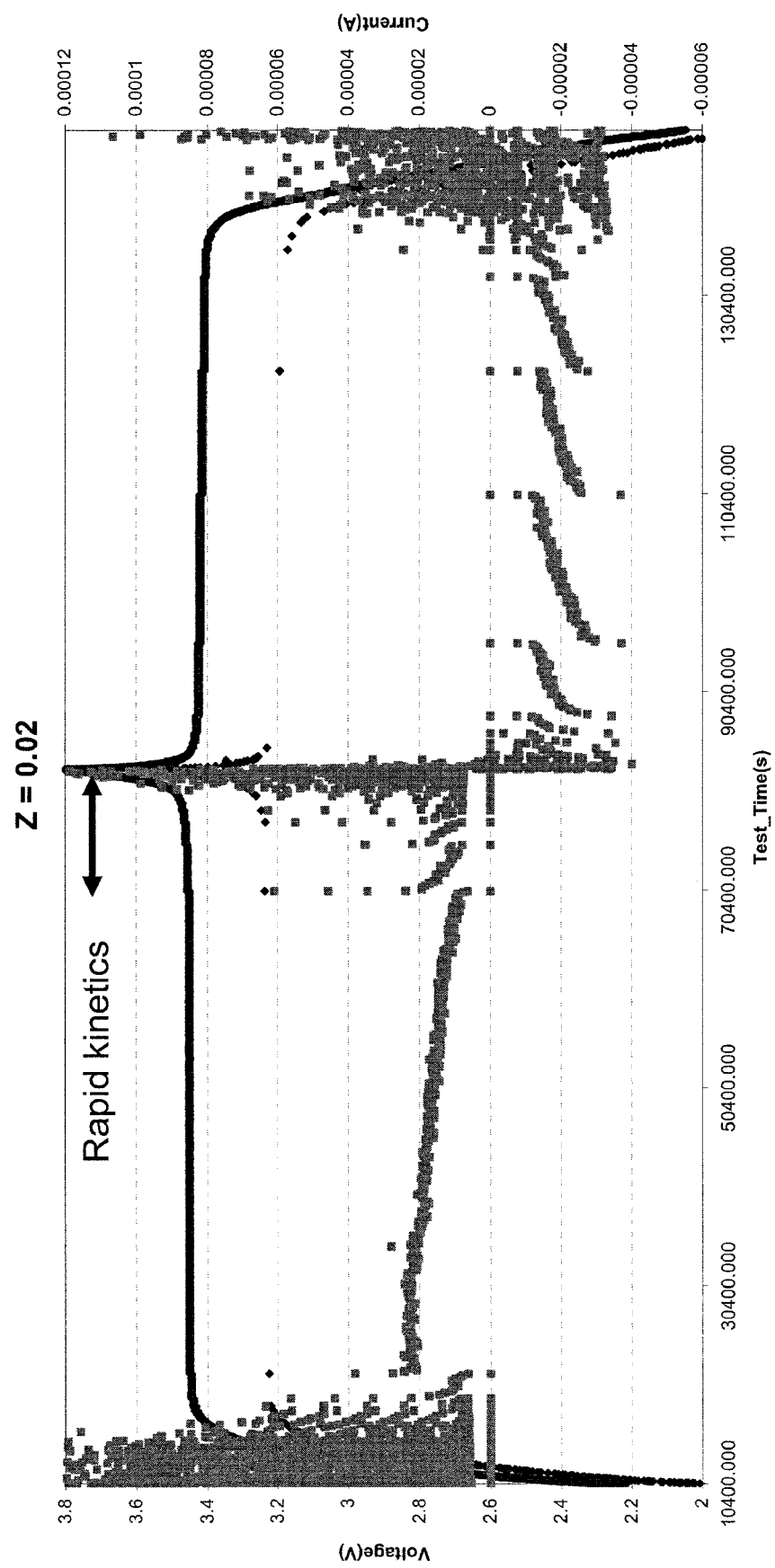
FIGS. 20A-E show results of potentiostatic intermittent titration tests (PITT), as plots of voltage during charging and discharging vs. time of the experiment and current flow during each constant voltage hold. The tests were performed on lithium half-cells produced using nanoscale $Li_{1-x}Co_zFe_{1-z}PO_4$ electrodes prepared as described in Example 13.
Figure 20B:
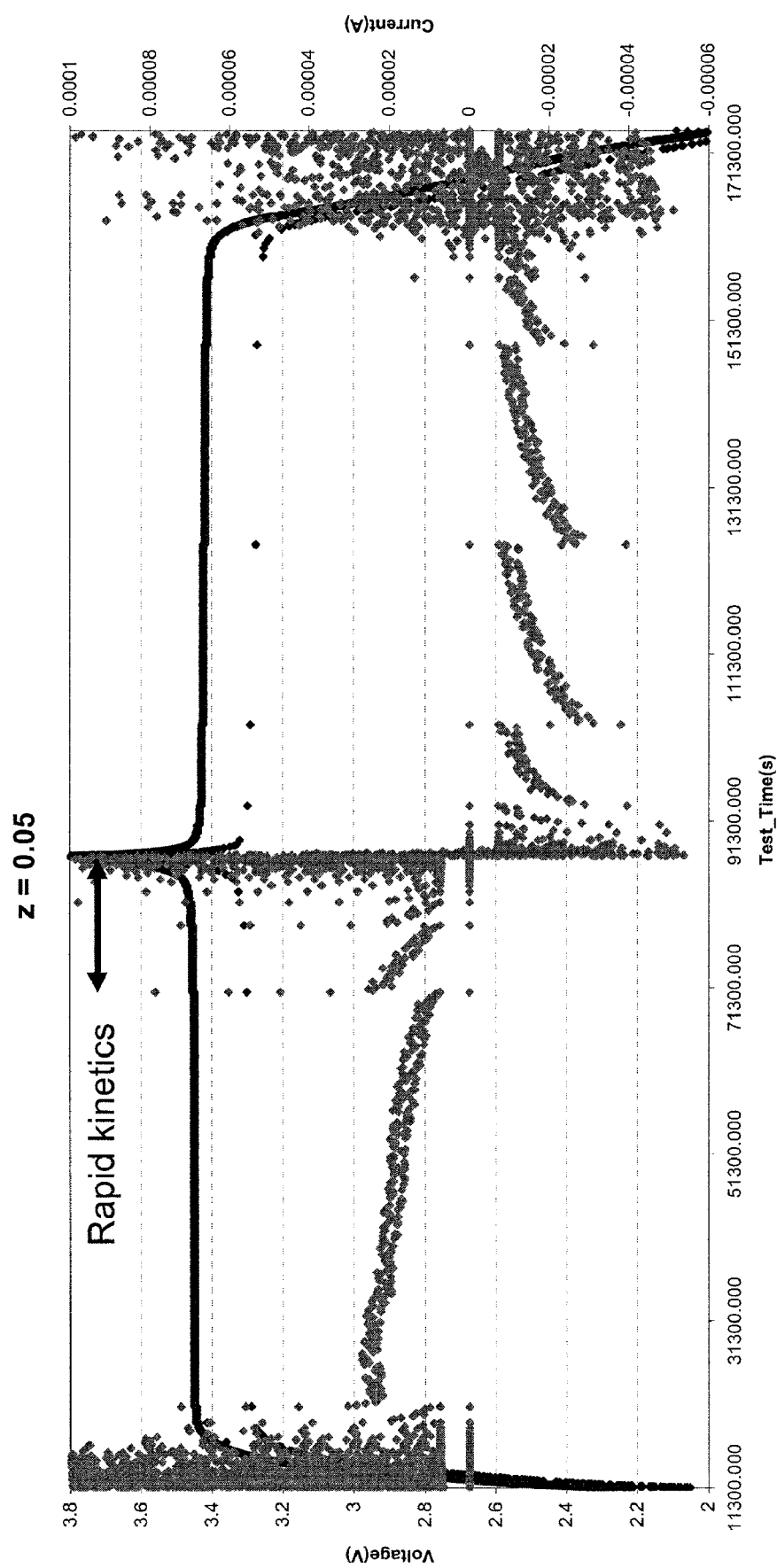
Figure 20C:
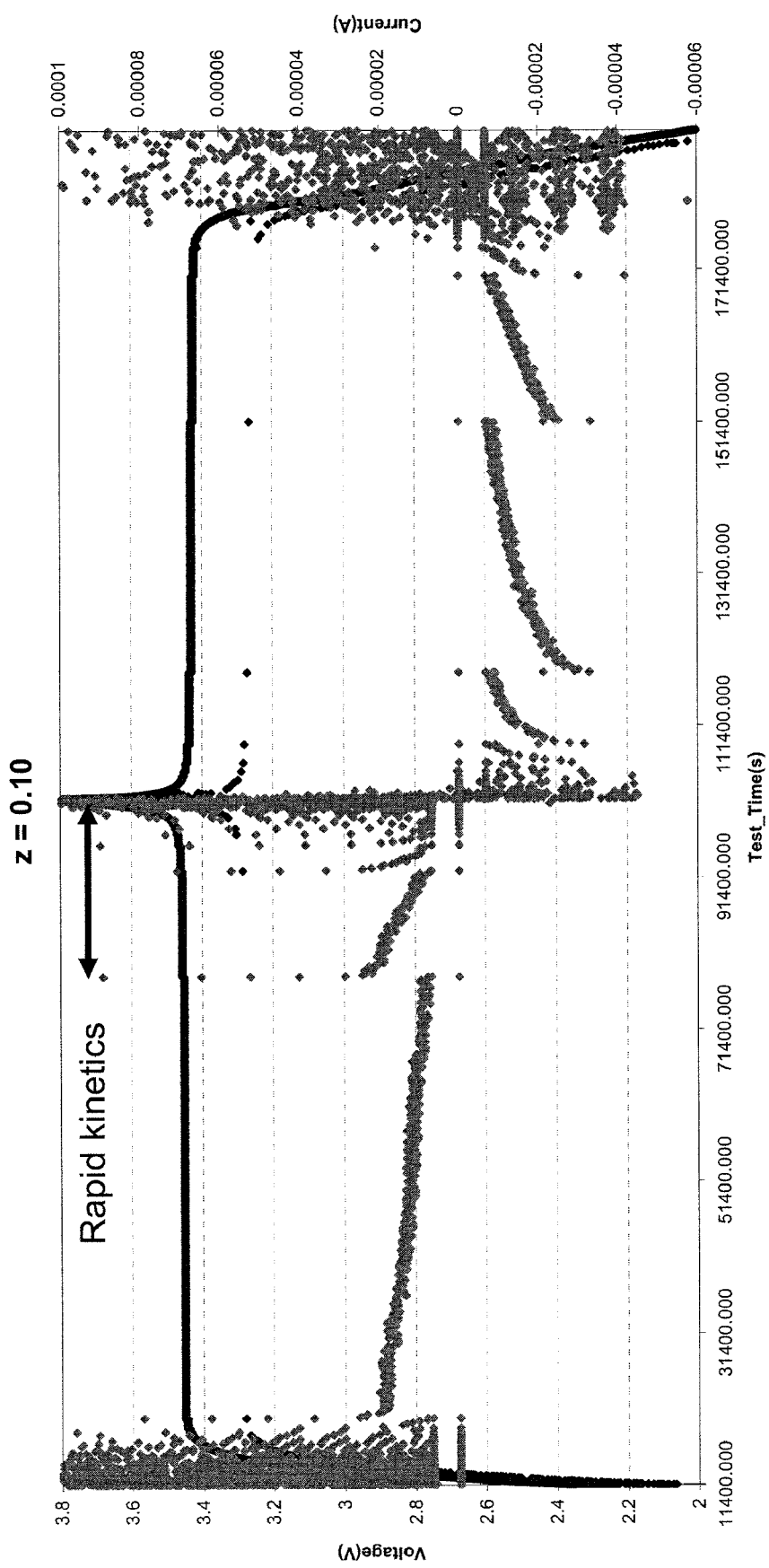
Figure 20D:
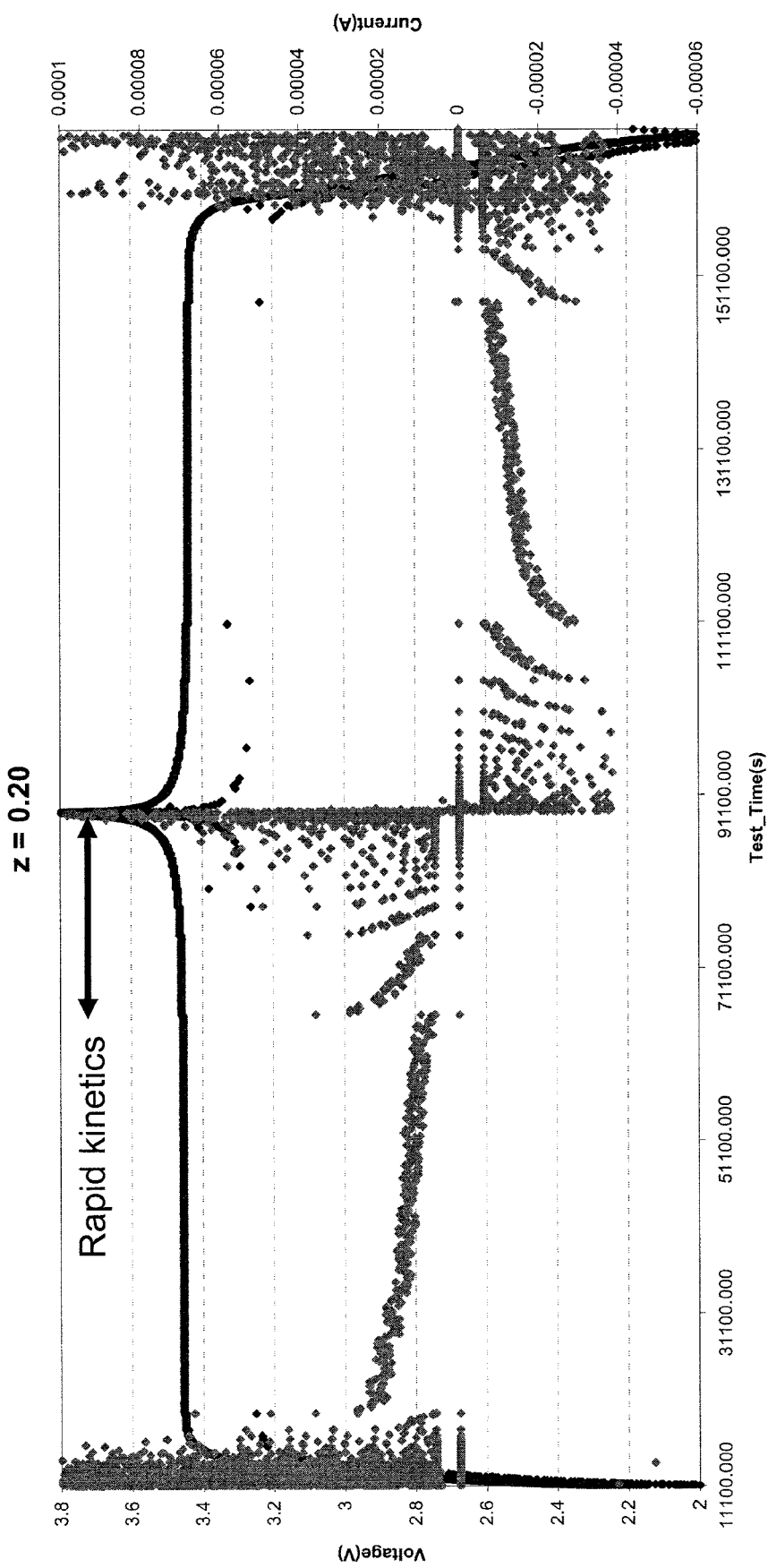
Figure 20E:
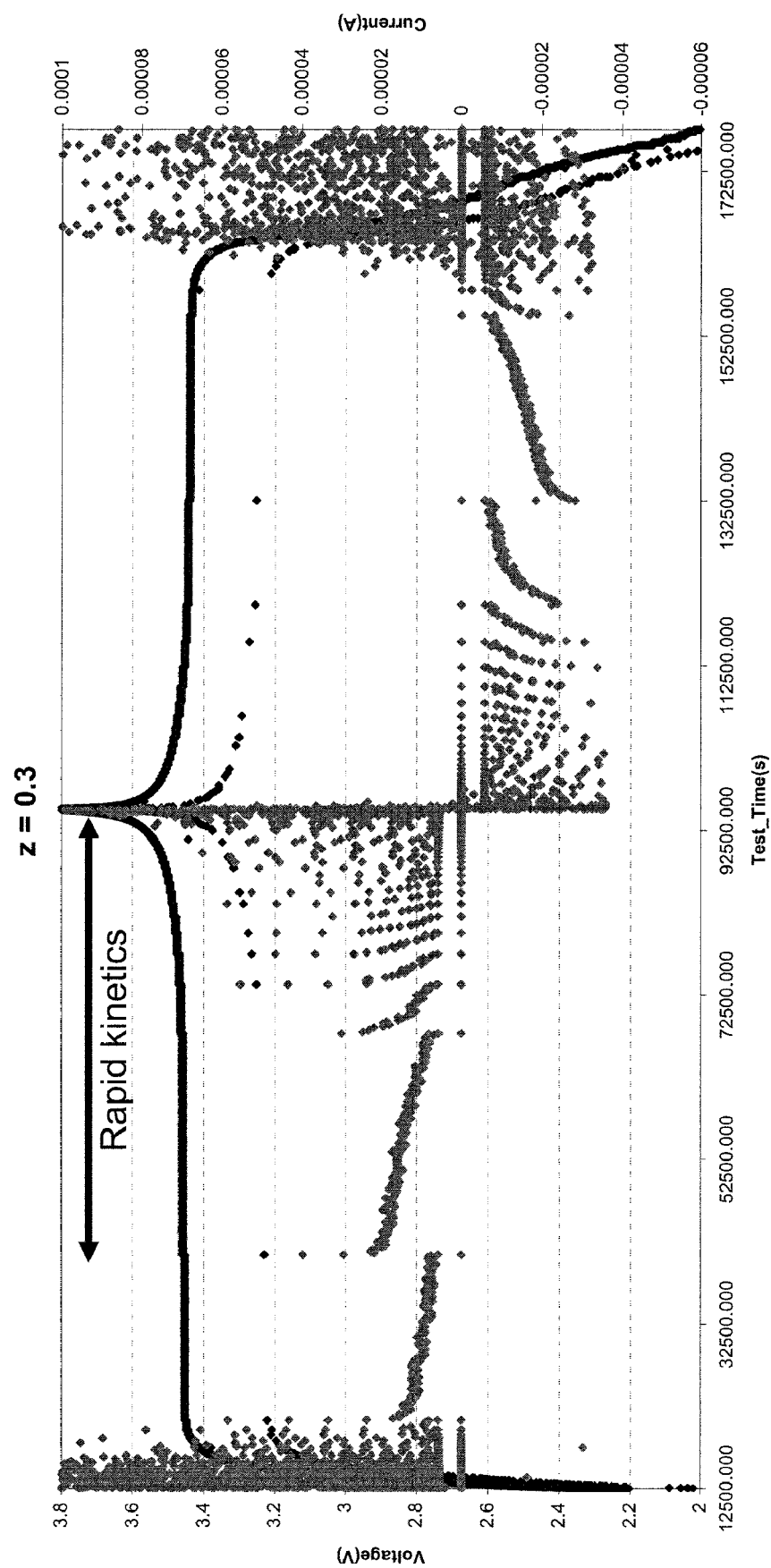

Compositions $Li_{1-x}Co_zFe_{1-z}PO_4$ where in the as-prepared state x=0 and z has values of 0.02, 0.05, 0.1, 0.15, 0.2, and 0.3 were prepared from accurately assayed and weighed proportions of the materials $Li_2CO_3$, iron (II) oxalate, $CoC_2O_4 \cdot 2H_2O$, and ammonium phosphate. The dry components were weighed and mixed with a sufficient quantity of high purity acetone to create a free-flowing suspension, and the mixture was roller-milled in a sealed polypropylene jar using zirconia milling media for 24 hours, obtaining a homogeneous and finely-divided precursor suspension. The precursor was thoroughly dried and then heat treated in a tube furnace under flowing argon gas (grade 5.0), first at 350° C. for 10 h and then at 700° C. for 5 h. The specific surface area of the powders as measured by the BET method for z=0.02, 0.05, 0.1, 0.15, 0.2, and 0.3, respectively, were 40.4, 40.1, 44.6, 43.7, 38.0, and 30.2 $m^2/g$, showing that the powder had nanoscale dimensions. The residual carbon content was 3.23, 3.27, 3.03, 2.80, 2.78, and 2.45% respectively. Powder X-ray diffraction was conducted on each of the compositions, and the unit cell parameters of the starting olivine phase were obtained by Rietveld refinement, and are shown in FIG. 19. The unit cell volume was observed to vary nearly linearly with z, showing that the Co formed a solid solution with the Fe in the olivine structure.

The fired powder was formulated into electrodes having the following composition:
  Cathode-active powder: 3.95 g
  Super P carbon: 0.50 g
  Kynar 2801 binder: 0.55 g
  γ-butyrolactone (solvent): 28.5 g
and mixed to create a free flowing suspension, then cast in a uniform layer onto aluminum foil. The coating was dried in vacuum at 100-110° C., after which it was measured to have a thickness of about 100 micrometers, and punched into discs of 1-2 cm diameter as appropriate to fit Swagelok or coin cells. The electrode coatings were assembled into lithium half-cells using Swagelok or coin cell hardware, using a microporous polymer separator, lithium foil as the negative electrode (total lithium content at least ten times greater than the theoretical storage capacity of the positive electrode), and a conventional nonaqueous lithium ion battery electrolyte containing $LiPF_6$ as the lithium salt.

The compositions showed high storage capacities and retained high capacities to high current rates. For example, for z=0.02, 0.05, 0.1, 0.15, 0.2, and 0.3, respectively, at a C/5 discharge rate the capacity was 151, 132, 123, 130, and 107 mAh/g, at 10 C discharge rate the capacity was 122, 106, 99, 100, 99 and 82 mAh/g, and at 50 C discharge rate the capacity was 78, 72, 69, 69, 72, and 56 mAh/g.

Potentiostatic intermittent titration tests (PITT) were performed to determine the limits of lithium solid solution and the kinetics of charging and discharging of the compounds. First, the lithium half-cells were galvanostatically cycled twice at a C/10 rate between 2.0 and 3.8V to determine the cell capacity. Then, the cells were taken to a 50% state of charge (SOC) and the open-circuit voltage (OCV) measured after holding to allow the voltage to relax to a stable value. The 50% SOC point for each composition lies on a flat or nearly flat portion of the voltage vs. capacity curve. The OCV at 50% SOC increased monotonically with Co concentration, being for z=0.02, 0.05, 0.1, 0.15, 0.2, and 0.3, respectively, 3.431, 3.433, 3.438, 3.442, 3.445 and 3.449V. As shown in the PITT tests, the OCV increased continuously with SOC in the higher SOC regime. PITT tests were initiated from the discharged state at 2.0V, with voltage steps of 5 mV followed by holding until the current relaxed to a C/50 rate. The total capacity (current×time) at each voltage step was obtained.

The PITT results are shown in FIGS. 20A-E as plots of the voltage during charging and discharging vs. the time of the experiment, and the current flow during each constant voltage hold. FIGS. 20A-E, respectively, show results for z=0.02, 0.05, 0.1, 0.2, and 0.3. At a given constant-voltage step, the absolute value of current starts at a maximum value and decays, with varying rates of decay. A faster rate of decay of the current corresponds to more rapid lithium exchange. As one example of improved functionality, it is noted that the current flow upon charging is typically slower than that during discharging, showing that for a given composition the energy obtained at a given C-rate upon charge is likely less than the energy obtained upon discharge at the same C-rate. With increasing z, it was seen that the composition regime over which rapid kinetics were obtained on charge grew systematically. This regime lies towards higher SOC values. Thus, in some embodiments operation of a battery may use this SOC range to allow better SOC detection, higher charge rates, higher charge and discharge power, or longer life.

Figure 21A:
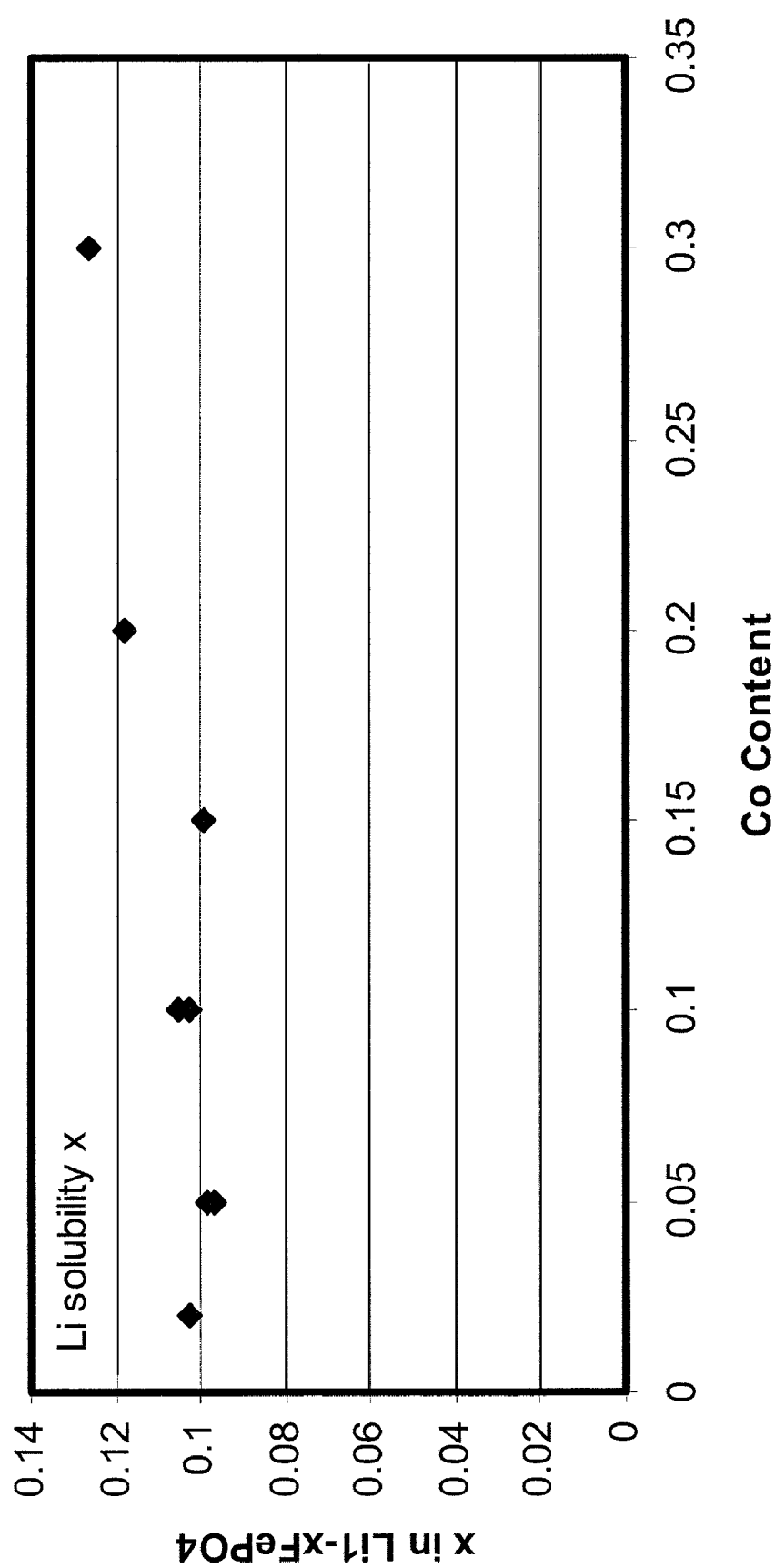
FIGS. 21A-B are plots of lithium solubility versus Co content for nanoscale $Li_{1-x}Co_zFe_{1-z}PO_4$ compositions prepared as described in Example 13.
Figure 21B:
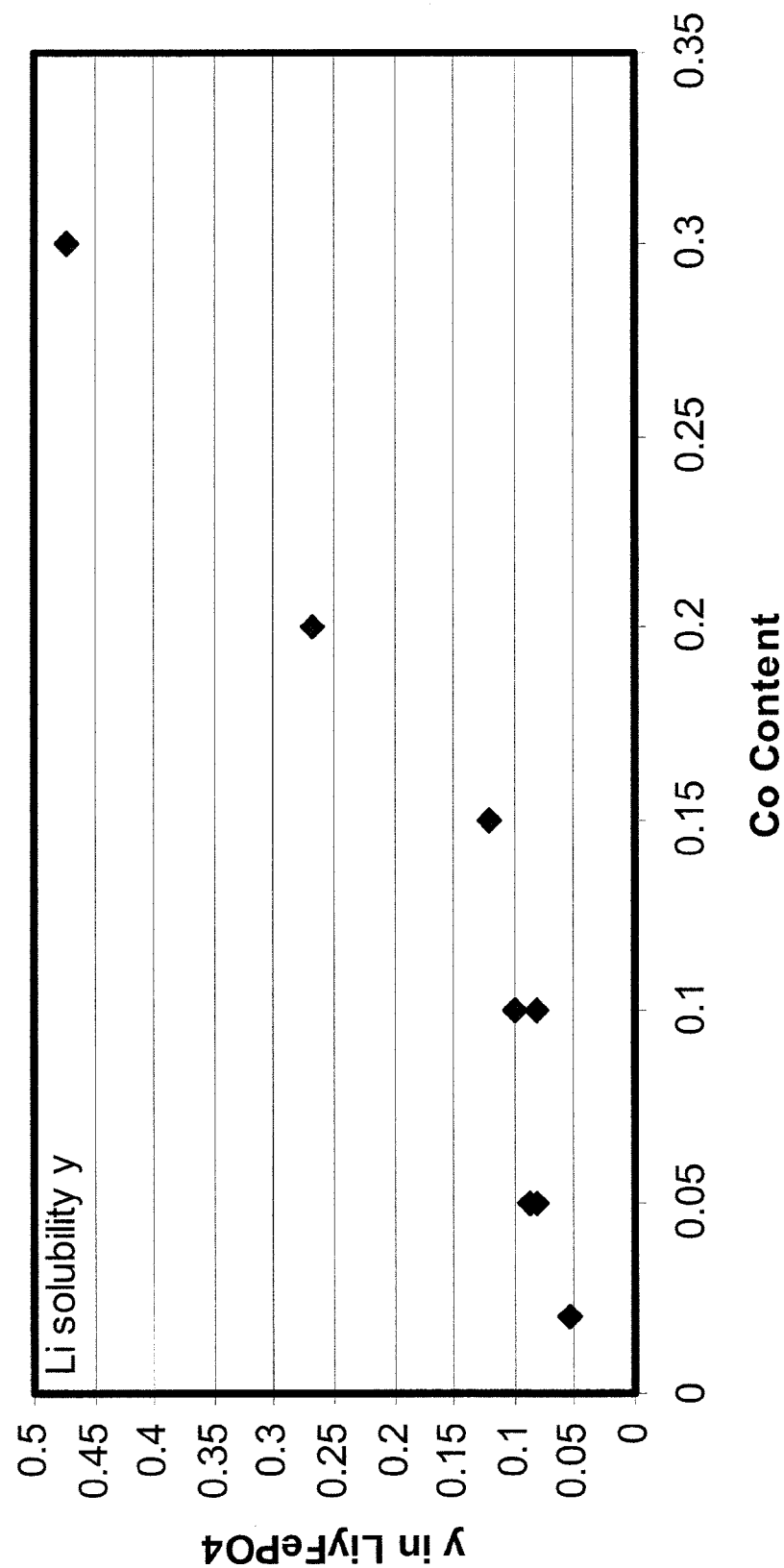

The PITT data can be analyzed to obtain the limits of lithium solid solution. Using the OCV values measured at about 50% SOC, where two phases coexist, to demark the voltage for the two-phase reaction, the total capacity accumulated below the OCV upon charging indicates the extent of solid solution x in $Li_{1-x}Co_zFe_{1-z}PO_4$. Upon discharge, the total capacity accumulated above the OCV indicates the extent of solid solution for the delithiated phase, which we will denote as y in $Li_yCo_zFe_{1-z}PO_4$ following the convention used in Meethong et al., *Adv. Funct. Mater.* 17:1115-1123 (2007). FIGS. 21A-B show that the solid solution regions x and y both grew systematically with Co concentration z, with y growing especially dramatically so that by z=0.3, the phase boundary was at nearly 50% Li concentration.

Figure 22:
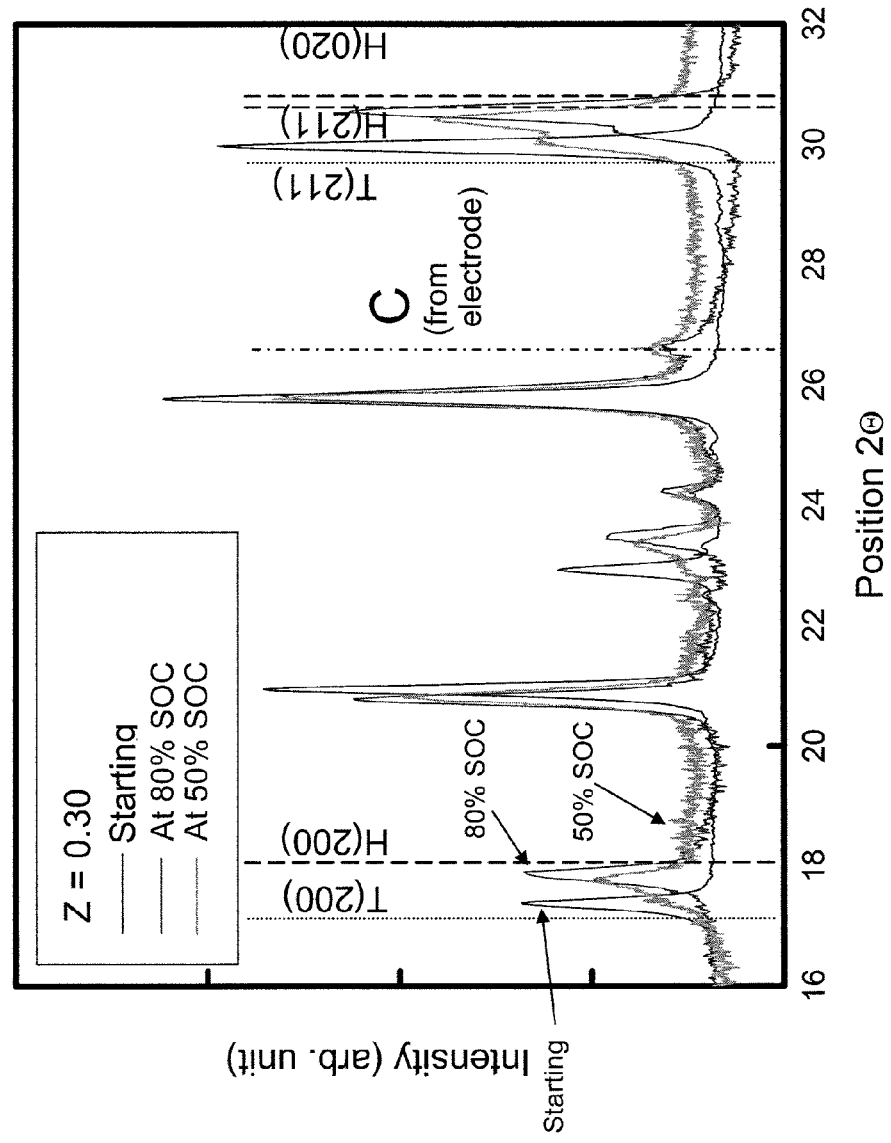
FIG. 22 shows X-ray diffraction patterns for $Li_{1-x}Co_zFe_{1-z}PO_4$ electrodes prepared as described in Example 13 with z=0.3, for electrodes at starting and taken to 50% and 80% SOC.

In composition z=0.3, X-ray diffraction was also conducted on electrodes taken to 50% and 80% SOC, to confirm the existence of a solid solution by observing the lattice constants of the olivine phase(s). It was observed, as shown in FIG. 22, that the olivine diffraction peaks varied monotonically with SOC rather than remaining constant as for a two phase mixture in which the two phases have a constant composition. Thus the diffraction data also support the existence of a very wide range of solid solution with respect to lithium concentration.

It is noted that the z values given here are overall compositions. Scanning transmission electron microscopy (STEM) performed on these samples showed that the amount in solid solution was less than the overall composition, showing that these effects were obtained at lower Co concentration than the nominal values. For example, in the powders of z=0.05, 0.15, and 0.30 composition, analysis of a large number of individual crystallites showed that the average amount in solid solution was 0.019, 0.085, and 0.221, respectively.

The principle demonstrated by these results can naturally be extended to other composition systems, and using the methods disclosed here, one of skill in the art can readily determine other compositions for which there is an extended Li solid solution. This can facilitate better SOC monitoring due to the sloping voltage curve, faster charge or discharge kinetics, longer cycle life, and/or lower hysteresis due to the lower misfit strain, which also helps with SOC monitoring. In particular, compositions $LiMPO_4$ in which M is a combination of the first-row transition metals Mn, Fe, Co and Ni can readily be utilized according to the present disclosure. Without being bound by any particular scientific interpretation, the additional mixing of transition metals produces atomic disorder in the compound that broadens the range of lithium solid solutions. For example, additions of Mn or Ni to the compositions of Example 13 could allow extended lithium solid solutions to be produced with much lower Co content, which is advantageous since Co is a relatively expensive metallic constituent.

Example 14

Nanoscale Li with Extended Lithium Solid Solution

For conventional materials in the $Li_{1-x}Fe_{1-y}Mn_yPO_4$ composition system, it is well-known to those skilled in the art that a limited lithium solid solution is possible in the lithiated and delithiated endmembers, and that the extent of lithium solid solution varies with the value of y. However, across most of the composition field there is immiscibility of lithiated and delithiated phases (see, e.g., Yamada et al., *J. Electrochem. Soc.* 148(10):A1153 (2001). We have surprisingly found that a complete or nearly complete lithium solid solution is present at room temperature in materials of a wide range of compositions y, when such materials are prepared with nanoscale crystallite sizes. Starting compositions $LiFe_{1-y}Mn_yPO_4$, wherein y=0.1, 0.2, 0.4, 0.6 and 0.8, were made according to the following method.

Each composition $LiFe_{1-y}Mn_yPO_4$ was prepared from accurately assayed and weighed proportions of the materials $Li_2CO_3$, iron (II) oxalate, manganese (II) carbonate, and ammonium phosphate. The dry components were weighed and mixed with a sufficient quantity of high purity acetone to create a free-flowing suspension, and the mixture was roller-milled in a sealed polypropylene jar using zirconia milling media for 24 hours, to obtain a homogeneous and finely-divided precursor suspension. The precursor was thoroughly dried and then heat treated in a tube furnace under flowing argon gas (grade 5.0), first at 350° C. for 10 h and then at 700° C. for 5 h. The specific surface areas of the powders were measured by the BET method to be 34.8, 32.6, 30.9 and 29.4 $m^2/g$, for y=0.1, 0.2, 0.4 and 0.6, respectively, showing that the crystallites had dimensions of several nanometers.

These powders were fabricated into lithium half-cells using the following methods. The fired powder was formulated into an electrode having the following composition:

Cathode-active powder: 3.95 g
Super P carbon: 0.50 g
Kynar 2801 binder: 0.55 g
γ-butyrolactone (solvent): 28.5 g and mixed to create a free flowing suspension, then cast in a uniform layer onto aluminum foil. The coating was dried in vacuum at 100-110° C., after which it was measured to have a thickness of about 100 micrometers, and punched into discs of 1-2 cm diameter as appropriate to fit Swagelok or coin cells. The electrode coatings were assembled into lithium half-cells using Swagelok or coin cell hardware, using a microporous polymer separator, lithium foil as the negative electrode (total lithium content at least ten times greater than the theoretical storage capacity of the positive electrode), and a conventional nonaqueous lithium ion battery electrolyte containing $LiPF_6$ as the lithium salt.

Figure 23:
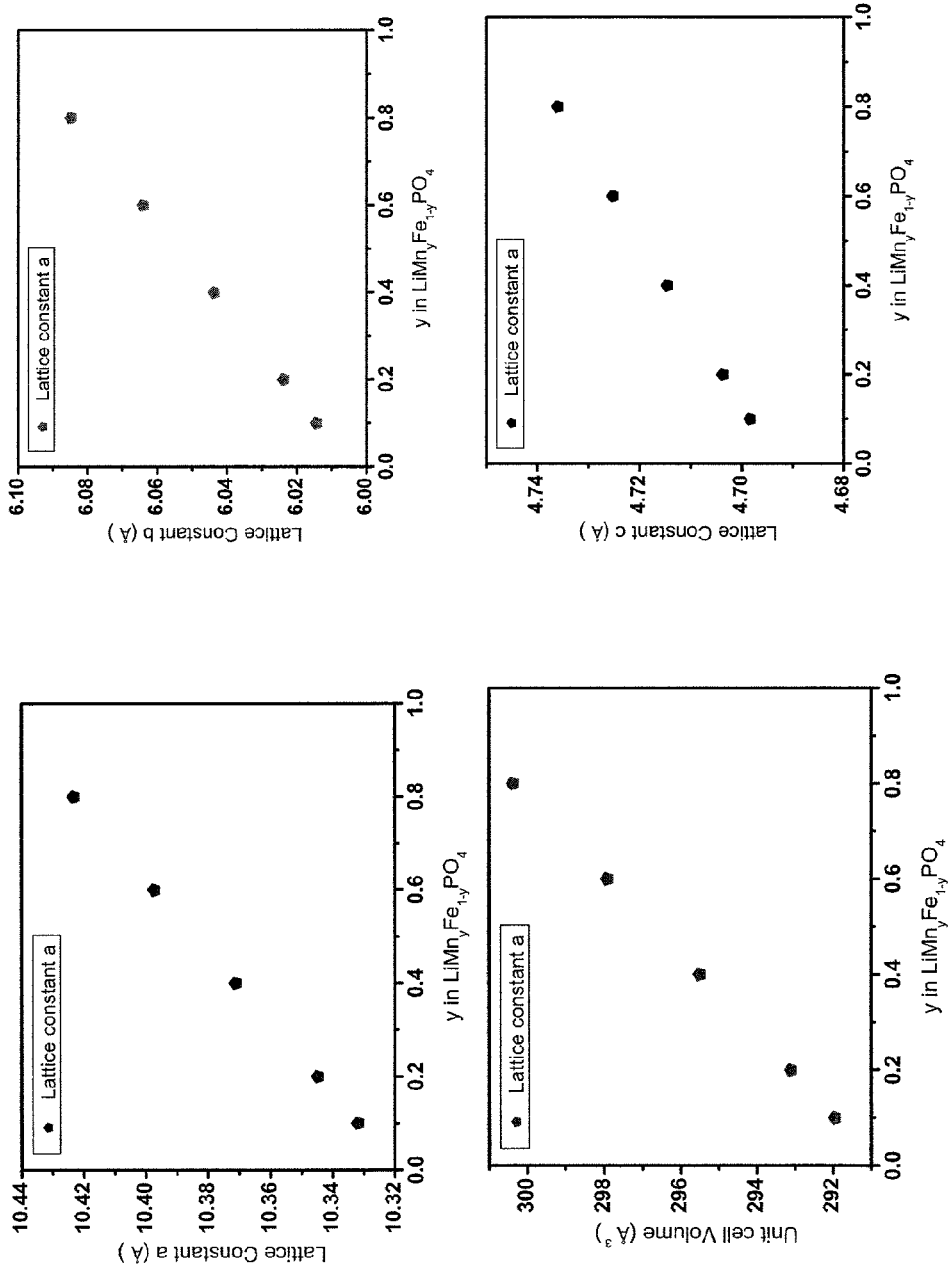
FIG. 23 shows plots of unit cell parameters of the olivine phase obtained by Rietveld refinement of powder X-ray diffraction spectra for nanoscale $Li_{1-x}Fe_{1-y}Mn_yPO_4$ compositions prepared as described in Example 14.

The unit cell parameters of the olivine phase were determined by Rietveld refinement of powder X-ray diffraction spectra, and showed a linear variation of the lattice parameters and unit cell volume with y, indicating a solid solution of the Mn and Fe, as shown in FIG. 23. Electrochemical tests showed high capacities and excellent retention of capacity at high current rates. For example, upon charging to 4.2V, at a 10 C discharge current rate between 4.2-2.0V the discharge capacity was 131, 130, 134, 117 and 62 mAh/g for y=0.1, 0.2, 0.4, 0.6 and 0.8, respectively.

Figure 24:
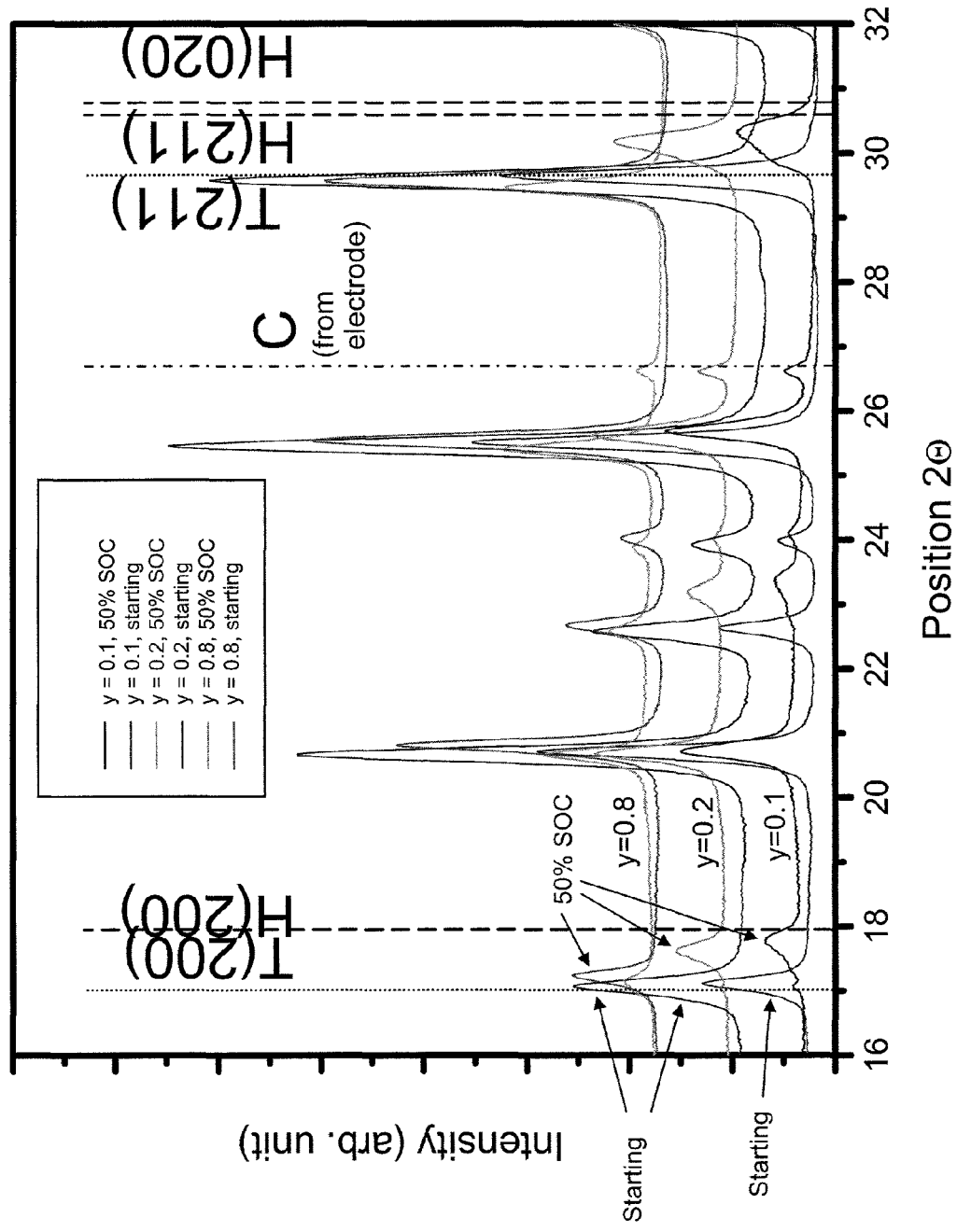
FIG. 24 shows X-ray diffraction patterns for nanoscale $Li_{1-x}Fe_{1-y}Mn_yPO_4$ electrodes prepared as described in Example 14 at starting and after charging or discharging to various SOC.
Figure 25:
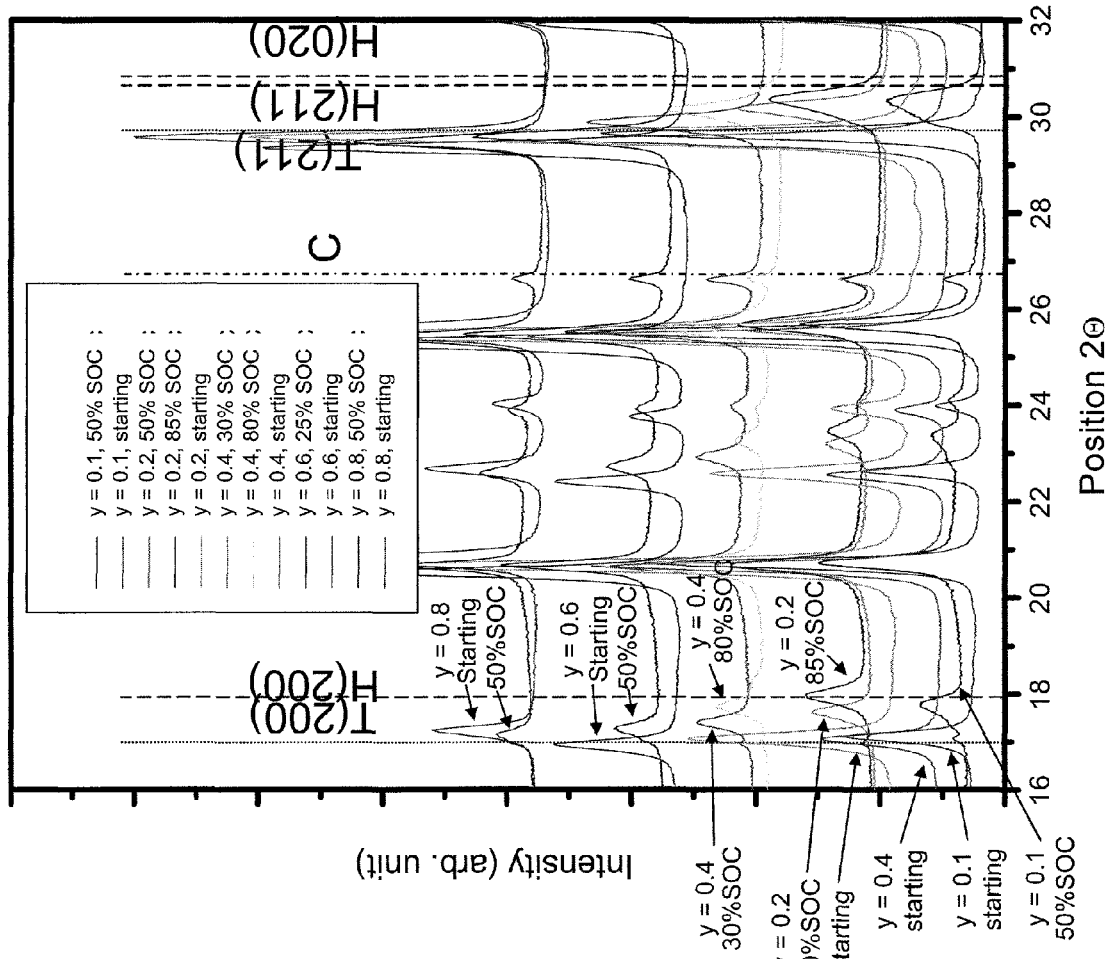
FIG. 25 shows X-ray diffraction patterns for nanoscale $Li_{1-x}Fe_{1-y}Mn_yPO_4$ electrodes prepared as described in Example 14 at starting and after charging or discharging to various SOC.

X-ray diffraction was conducted on the electrodes after charging or discharging to various SOC, and results are shown in FIGS. 24-25. It was surprisingly found that all of the compositions examined exhibited a single-phase reaction as the SOC varied, rather than the formation of distinct lithiated and delithiated phases. In FIGS. 24-25, the peak labeled "C" is due to the carbon used in the electrode formulation. The peaks labeled "T" correspond to the positions of the ideal fully lithiated $LiFePO_4$ phase. The peaks labeled "H" correspond to the ideal fully delithiated $FePO_4$ phase. Compositions that undergo a two-phase reaction are known to show a diminishing intensity of the peaks for one phase as the other phase increases in its peak intensity, with little or no shift in the positions of the peaks. Here, it was instead observed that the peaks for samples at partial states of charge were at intermediate positions, and shifted systematically with the SOC, showing that a continuous solid solution was obtained with respect to the lithium concentration x. Thus, such materials can provide advantages as herein described when used as storage electrodes in rechargeable lithium batteries.

From Examples 13 and 14, it is readily seen that mixtures of transition metals M, where M=Mn, Fe, Ni and Co, combined optionally with nanoscaling of the crystallite size, can modify the phase diagram with respect to the lithium concentration x, including the provision of materials with complete solid solutions at room temperature and below.

As will be apparent to one of ordinary skill in the art from a reading of this disclosure, the present invention can be embodied in forms other than those specifically disclosed above. The particular embodiments described above are, therefore, to be considered as illustrative and not restrictive. The scope of the invention is as set forth in the appended claims, rather than being limited to the examples contained in the foregoing description.

What is claimed is:

1. A method for monitoring and maintaining the performance of an electrochemical cell, comprising:
   providing an electrochemical cell having a positive electrode and negative electrode separated by an electrolyte, the composition of electroactive materials of the positive electrode, the negative electrode, or both selected to provide a cell having a plurality of open circuit voltages at different states of charge, said composition selected to provide a change in voltage of the cell at a pre-selected state of charge;
   monitoring the cell to detect a change in cell voltage; and
   changing a current or power into or out of the cell in response to the detected change in voltage.

2. The method of claim 1, wherein the positive electrode electroactive materials are selected to provide a cell having a plurality of open circuit voltages at different states of charge.

3. The method of claim 1, wherein the negative electrode electroactive materials are selected to provide a cell having a plurality of open circuit voltages at different states of charge.

4. The method of claim 1, wherein the positive electrode and negative electrode electroactive materials are selected to provide a cell having a plurality of open circuit voltages at different states of charge.

5. The method of claim 1, wherein the positive electrode electroactive material comprises a primary electroactive material and a high voltage indicator, said high voltage indicator having an equilibrium potential that results in a cell voltage that is close to but below a first pre-selected voltage threshold.

6. The method of claim 5, wherein the negative electrode electroactive material comprises a primary electroactive material and a low voltage indicator, said low voltage indicator having an equilibrium potential that results in a cell voltage that is close to but above a second pre-selected voltage threshold.

7. The method of claim 6, wherein the low voltage indicator is subjected to lithiation prior to being added to the electrode.

8. The method of claim 1, wherein the positive electrode electroactive material comprises a primary electroactive material and a low voltage indicator, said low voltage indicator having an equilibrium potential that results in a cell voltage that is close to but above a pre-selected voltage threshold.

9. The method of claim 8, wherein the low voltage indicator is subjected to lithiation prior to being added to the electrode.

10. The method of claim 8, wherein the primary electroactive material comprises a lithium metal phosphate and the low voltage indicator comprises a lithium metal oxide.

11. The method of claim 10, wherein the low voltage indicator comprises $LiAl_xMn_{1-x}O_2$ where $0 \leq x < 0.05$.

12. The method of claim 8, wherein the low voltage indicator comprises $Li_2FeSiO_4$.

13. The method of claim 8, wherein the primary electroactive material comprises a lithium metal phosphate and the low voltage indicator comprises lithium Ti, Mg or Zr phosphate.

14. The method of claim 1, wherein the positive electrode electroactive material comprises a primary electroactive material; a high voltage indicator, said high voltage indicator having an equilibrium potential that results in a cell voltage that is close to but below an upper limiting voltage of the cell; and a low voltage indicator, said low voltage indicator having an equilibrium potential that results in a cell voltage that is close to but above a lower limiting voltage of the cell.

15. The method of claim 14, wherein the low voltage indicator is subjected to lithiation prior to being added to the electrode.

16. The method of claim 1, wherein the negative electrode electroactive material comprises a primary electroactive material and a low voltage indicator, said low voltage indicator having an equilibrium potential that results in a cell voltage that is close to but above a lower limiting voltage of the cell.

17. The method of claim 16, wherein the low voltage indicator is subjected to lithiation prior to being added to the electrode.

18. The method of claim 1, wherein the positive electrode electroactive material comprises lithium metal phosphate.

19. The method of claim 1, wherein the positive electrode electroactive material comprises
   about 60-95 molar % of a first primary electroactive material, wherein the first primary electroactive material is a lithium metal phosphate;
   about 0-50 molar % of a second primary electroactive material;
   about 1-30 molar % of a high voltage indicator material having an open-circuit potential greater than each of the first and second primary electroactive materials; and
   about 1-30 molar % of a low voltage indicator material having an open-circuit potential less than each of the first and second primary electroactive materials.

20. The method of claim 1, wherein the positive electrode electroactive material comprises an olivine lithium metal phosphate material having the formula $Li_xM'_yM''_zM'''_wPO_4$, wherein
   M' is one or more of Mn and Fe;
   M" is one or more of Mn, Co and Ni;
   M'" is one or more of Ti, Zr and Mg;
   M' is not the same as M";
   $0 \leq x \leq 1.2$; $0.5 \leq y \leq 0.95$; $0.025 \leq z \leq 0.5$; $0.025 \leq w \leq 0.25$; and
   $0.8 \leq y+z+w \leq 1.2$.

21. The method of claim 1, wherein monitoring the cell to detect a change in voltage comprises measuring the voltage or monitoring the first or second derivative of the voltage with respect to time or capacity.

22. The method of claim 21, wherein impedance compensation is employed in measuring the voltage.

23. The method of claim 1, wherein the current is changed by limiting the charge or discharge current into the cell.

24. The method of claim 1, wherein the current is changed by decreasing the rate of charge or discharge.

25. The method of claim 1, wherein the current is changed by terminating charge or discharge.

26. The method of claim 1, wherein the current is changed by switching from a charging state to a discharging state.

27. The method of claim 1, wherein the current is changed by switching from a discharging state to a charging state.

28. The method of claim 8, wherein the low voltage indicator comprises $Li_7Ti_5O_{12}$.

* * * * *